United States Patent
Sayour et al.

(10) Patent No.: US 12,514,930 B2
(45) Date of Patent: Jan. 6, 2026

(54) METHODS OF SENSITIZING TUMORS TO TREATMENT WITH IMMUNE CHECKPOINT INHIBITORS

(71) Applicant: UNIVERSITY OF FLORIDA RESEARCH FOUNDATION, INC., Gainesville, FL (US)

(72) Inventors: Elias Sayour, Gainesville, FL (US); Duane Mitchell, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 863 days.

(21) Appl. No.: 17/268,408

(22) PCT Filed: Aug. 15, 2019

(86) PCT No.: PCT/US2019/046618
§ 371 (c)(1),
(2) Date: Feb. 12, 2021

(87) PCT Pub. No.: WO2020/037102
PCT Pub. Date: Feb. 20, 2020

(65) Prior Publication Data
US 2021/0170005 A1 Jun. 10, 2021

Related U.S. Application Data

(60) Provisional application No. 62/764,935, filed on Aug. 15, 2018.

(51) Int. Cl.
*A61K 47/69* (2017.01)
*A61K 9/00* (2006.01)
*A61K 9/127* (2025.01)
*A61K 35/15* (2025.01)
*A61K 39/00* (2006.01)
*A61K 39/395* (2006.01)
*A61K 40/19* (2025.01)
*A61K 40/24* (2025.01)
*A61K 40/42* (2025.01)
*A61K 47/18* (2017.01)
*A61P 35/00* (2006.01)
*C12N 5/0784* (2010.01)

(52) U.S. Cl.
CPC ........ *A61K 47/6911* (2017.08); *A61K 9/0019* (2013.01); *A61K 9/127* (2013.01); *A61K 35/15* (2013.01); *A61K 39/0011* (2013.01); *A61K 39/3955* (2013.01); *A61K 40/19* (2025.01); *A61K 40/24* (2025.01); *A61K 40/42* (2025.01); *A61K 40/421* (2025.01); *A61K 47/186* (2013.01); *A61P 35/00* (2018.01); *C12N 5/0639* (2013.01); *A61K 2039/53* (2013.01); *A61K 2039/54* (2013.01); *A61K 2039/55555* (2013.01)

(58) Field of Classification Search
CPC ........ A61K 39/001193; A61K 47/6911; A61K 9/0019; A61K 9/127; A61K 35/15; A61K 39/3955; A61K 47/186; A61P 35/00; C12N 5/0639
See application file for complete search history.

(56) References Cited

U.S. PATENT DOCUMENTS

| | | |
|---|---|---|
| 2010/0324120 A1 | 12/2010 | Chen et al. |
| 2012/0178702 A1 | 7/2012 | Huang et al. |
| 2013/0150625 A1 | 6/2013 | Budzik et al. |
| 2015/0273033 A1* | 10/2015 | Bosch ................ A61K 38/2086 424/144.1 |
| 2018/0169230 A1* | 6/2018 | Adams ................. A61K 39/395 |
| 2019/0160115 A1* | 5/2019 | Falb ..................... C07K 14/245 |

FOREIGN PATENT DOCUMENTS

| | | |
|---|---|---|
| WO | 2013/143555 A1 | 10/2013 |
| WO | 2014/127917 A1 | 8/2014 |
| WO | WO-2017/201350 A1 | 11/2017 |

(Continued)

OTHER PUBLICATIONS

Shields, B.D., Mahmoud, F., Taylor, E.M. et al. Indicators of responsiveness to immune checkpoint inhibitors. Sci Rep 7, 807 (2017). (Year: 2017).*
Podesta, Jennifer E, and Kostas Kostarelos. "Chapter 17—Engineering cationic liposome siRNA complexes for in vitro and in vivo delivery." Methods in enzymology vol. 464 (2009): 343-54. (Year: 2009).*
Fujio K, Watanabe M, Ueki H, Li S, Kinoshita R, Ochiai K, Futami J, Watanabe T, Nasu Y, Kumon H, Kumon H, et al: A vaccine strategy with multiple prostatic acid phosphatase-fused cytokines for prostate cancer treatment. Oncol Rep 33: 1585-1592, 2015 (Year: 2015).*
Anassi E, Ndefo UA. Sipuleucel-T (provenge) injection: the first immunotherapy agent (vaccine) for hormone-refractory prostate cancer. P T. Apr. 2011;36(4):197-202. (Year: 2011).*

(Continued)

*Primary Examiner* — Ekaterina Poliakova-Georgantas
*Assistant Examiner* — John Charles McKillop
(74) *Attorney, Agent, or Firm* — MARSHALL, GERSTEIN & BORUN LLP

(57) ABSTRACT

The present disclosure provides methods of increasing sensitivity of a tumor to treatment with an immune checkpoint inhibitor (ICI) in a subject and methods of treating a subject with an immune checkpoint inhibitor (ICI)-resistant tumor. The methods comprise administering to the subject a composition comprising a liposome comprising a cationic lipid and mRNA molecules, wherein the liposome is systemically administered to the subject. Also provided are methods of increasing the number of activated plasmacytoid dendritic cells (pDCs) in a subject in need thereof, comprising administering to the subject a composition comprising a liposome comprising a cationic lipid and mRNA molecules, wherein the liposome is systemically administered to the subject. Combination therapy with anti-PD-L1mAb. Related methods of treatment and methods of preparing a dendritic cell vaccine are additionally provided.

13 Claims, 30 Drawing Sheets

(56) References Cited

FOREIGN PATENT DOCUMENTS

| WO | 2018/078053 A1 | 5/2018 | |
|---|---|---|---|
| WO | WO-2018140826 A1 * | 8/2018 | ......... A61K 39/0011 |
| WO | 2019/217593 A1 | 11/2019 | |

OTHER PUBLICATIONS

Ansell et al., PD-1 blockade with nivolumab in relapsed or refractory Hodgkin's lymphoma, The New England journal of medicine, 372(4):311-319 (2015).
Bader et al., The therapeutic potential of microRNAs, Innovations in Pharmaceutical Technology, 52-55 (2011).
Badoual et al., PD-1-expressing tumor-infiltrating T cells are a favorable prognostic biomarker in HPV-associated head and neck cancer, Cancer Research, 73(1):128-138 (2013).
Bernstein et al., Role for a bidentate ribonuclease in the initiation step of RNA interference, Nature, 409:363-366 (2001).
Bloch et al., Gliomas promote immunosuppression through induction of B7-H1 expression in tumor-associated macrophages, Clinical cancer research, 19(12):3165-3175 (2013).
Borghaei et al., Nivolumab versus docetaxel in advanced nonsquamous non-small-cell lung cancer, The New England Journal of medicine, 373(17):1627-1639 (2015).
Brahmer et al., Safety and activity of anti-PD-L1 antibody in patients with advanced cancer, The New England journal of medicine, 366(26):2455-2465 (2012).
Broos et al., Particle-mediated intravenous delivery of antigen mRNA results in strong antigen-specific T-cell responses despite the induction of Type I interferon, Mol. Ther. Nucleic Acids, 5(6):e326 (2016).
Burg et al., Vaccines for established cancer: overcoming the challenges posed by immune evasion, Nat. Rev. Cancer, 16(4):219-233 (2016).
Caplen et al., dsRNA-mediated gene silencing in cultured *Drosophila* cells: a tissue culture model for the analysis of RNA interference, Gene., 252:95-105 (2000).
Elbashir et al., Duplexes of 21-nucleotide RNAs mediate RNA interference in cultured mammalian cells, Nature, 411:494-498 (2001).
Elbashir et al., RNA interference is mediated by 21- and 22-nucleotide RNAs, Genes Dev., 15:188-200 (2001).
Fiedler et al., mRNA Cancer Vaccines, Rece. Resu. Canc. Res., 209:61-85 (2016).
Filley et al., Recurrent glioma clinical trial, CheckMate-143: the game is not over yet, Oncotarget., 8(53):91779-91794 (2017).
Fire et al., Potent and specific genetic interference by double-stranded RNA in caenorhabditis elegans, Nature, 391:806-811 (1998).
Flores et al., Novel role of hematopoietic stem cells in immunologic rejection of malignant gliomas, Oncoinununology, 4(3):e994374 (2015).
Gaillard et al., The role of immune checkpoint inhibition in the treatment of ovarian cancer, Gynecol. Oncol. Res. Pract., 3:11 (2016).
Gros et al., PD-1 identifies the patient-specific CD8? tumor-reactive repertoire infiltrating human tumors, The Journal of clinical investigation, 124(5):2246-2259 (2014).
Hammond et al., An RNA-directed nuclease mediates post-transcriptional gene silencing in *Drosophila* cells, Nature, 404:293-296 (2000).
Heyes et al., Cationic lipid saturation influences intracellular delivery of encapsulated nucleic acids, J. Controlled Release, 107(2):276-287 (2005).
Hinrichs, Exploiting the curative potential of adoptive T-cell therapy for cancer, Immunological reviews, 257(1):56-71 (2014).
Hutvagner et al., RNAi: nature abhors a double-strand, Curr. Opin. Genet. Dev., 12(2):225-232 (2002).
International Application No. PCT/US19/46618, International Search Report and Written Opinion, mailed Nov. 29, 2019.

Jensen et al., Tumor volume in subcutaneous mouse xenografts measured by microCT is more accurate and reproducible than determined by 18F-FDG-microPET or external caliper, BMC medical imaging, 8:16 (2008).
Kleponis et al., Fueling the engine and releasing the break: combinational therapy of cancer vaccines and immune checkpoint inhibitors, Cancer Biol. Med., 12(3):201-218 (2015).
Kranz et al., Systemic RNA delivery to dendritic cells exploits antiviral defence for cancer immunotherapy, Nat., 534(7607):396-401 (2016).
Landen et al., Intraperitoneal delivery of liposomal siRNA for therapy of advanced ovarian cancer, Cancer Biology & Therapy, 5(12):1708-1713 (2006).
Lechner et al., Immunogenicity of murine solid tumor models as a defining feature of in vivo behavior and response to immunotherapy, J. Immunother., 36(9):477-489 (2013).
Mahjub et al., Recent advances in applying nanotechnologies for cancer immunotherapy, J. Contr. Rel., 288:239-263 (2018).
Meng et al., Predictive biomarkers in PD-1/PD-L1 checkpoint blockade immunotherapy, Cancer Treat. Rev., 41(10):868-876 (2015).
Nykanen et al., ATP requirements and small interfering RNA structure in the RNA interference pathway, Cell, 107(3):309-321 (2001).
Oberli et al., Lipid nanoparticle assisted mrna delivery for potent cancer immunotherapy, Nano Lett., 17(3):1326-1335 (2017).
Pardoll, The blockade of immune checkpoints in cancer immunotherapy, Nature Rev. Cancer, 12(4):252-264 (2012).
Pyzer et al., Clinical trials of dendritic cell-based cancer vaccines in hematologic malignancies, Hum. Vaccin. Immunother., 10(11):3125-3131 (2014).
Rosenberg et al., Cancer regression in patients with metastatic melanoma after the transfer of autologous antitumor lymphocytes, Proceedings of the National Academy of Sciences of the United States of America, 101(Suppl 2):14639-14645 (2004).
Rosenberg, Raising the bar: the curative potential of human cancer immunotherapy, Science translational medicine, 4(127):127ps8 (2012).
Sayour et al., Personalized Tumor RNA Loaded Lipid-Nanoparticles Prime the Systemic and Intratumoral Milieu for Response to Cancer Immunotherapy, Nano Lett., 18(10):6195-6206 (2018).
Sayour et al., Systemic activation of antigen-presenting cells via RNA-loaded nanoparticles, Onco., 6(1):e1256527 (2016).
Scheetz et al., Engineering patient-specific cancer immunotherapies, Nat. Bio. Eng., 3(10):768-782 (2019).
Sharp, RNA interference-2001, Genes Dev., 15(5):485-490 (2001).
Shimamoto et al., Peptibodies: A flexible alternative format to antibodies, mAbs, 4(5):586-591 (2012).
Sonabend et al., Medulloblasoma: challenges for effective immunotherapy, Journal of neurooncology, 108(1):1-10 (2012).
Spiess et al., Alternative molecular formats and therapeutic applications for bispecific antibodies, Molecular Immunology, 67(2 Part A):95-106 (2015).
Tang et al., PD-L1 on host cells is essential for PD-L1 blockade-mediated tumor regression, The Journal of clinical investigation, 128(2):580-588 (2018).
Ui-Tei et al., Sensitive assay of RNA interference in *Drosophila* and chinese hamster cultured cells using firefly luciferase gene as target, FEES Lett., 479(3):79-82 (2000).
Wei et al., Fundamental mechanisms of immune checkpoint blockade therapy, Cancer Discovery, 8(9):1069-1086 (2018).
Weller et al., Rindopepimut with temozolomide for patients with newly diagnosed, EGFRvIII-expressing glioblastoma (Act IV): a randomised, double-blind, international phase 3 trial, The lancet oncology, 18(10):1373-1385 (2017).
Zamore et al., RNAi: double-stranded RNA directs the ATP-dependent cleavage of mRNA at 21 to 23 nucleotide intervals, Cell, 101(1):25-33 (2000).
Zaretsky et al., Mutations associated with acquired resistance to pd-1 blockade in melanoma, The New England journal of medicine, 375(9):819-829 (2016).

(56) References Cited

OTHER PUBLICATIONS

Zitvogel et al., Cancer despite immunosurveillance: immunoselection and immunosubversion, Nature reviews Immunology, 6(10):715-727 (2006).

* cited by examiner

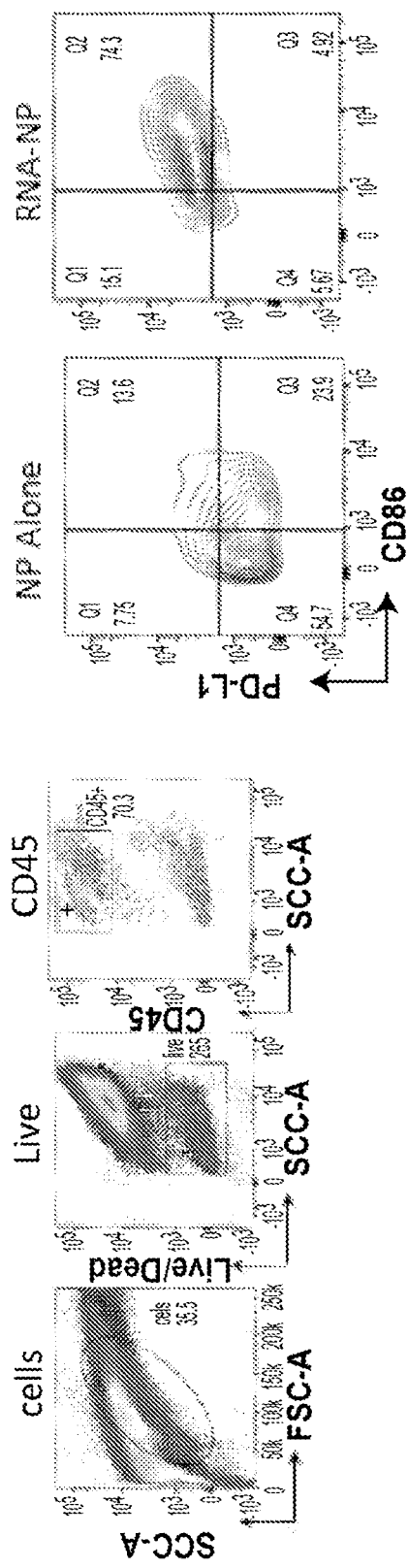
FIG. 1J
FIG. 1K
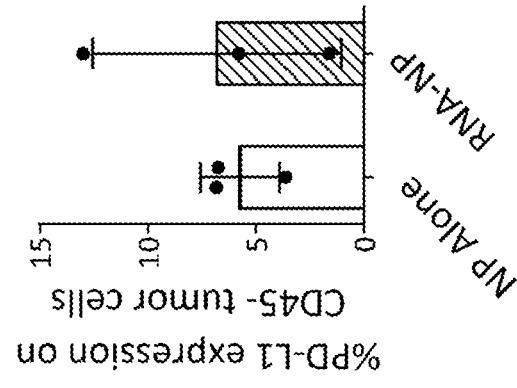
FIG. 1L
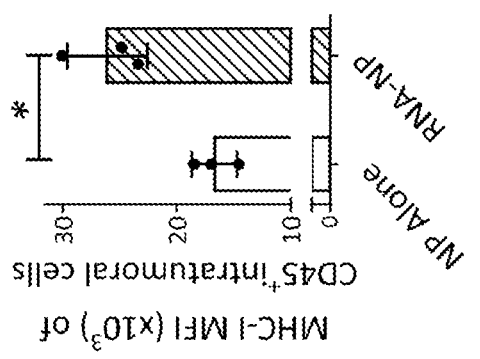
FIG. 1M
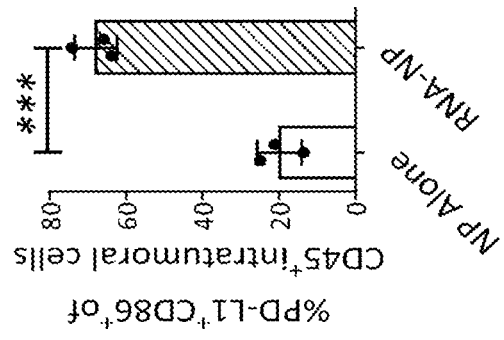
FIG. 1N

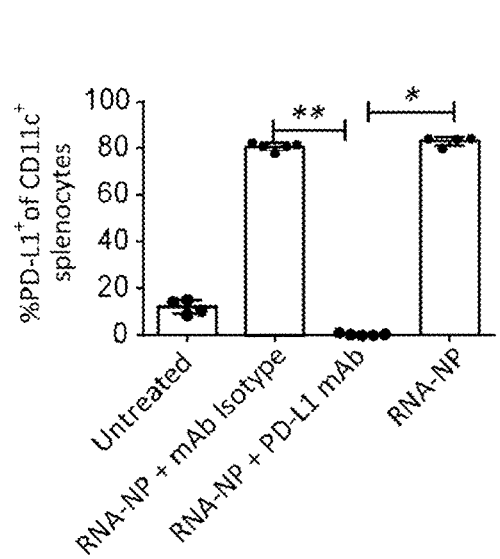
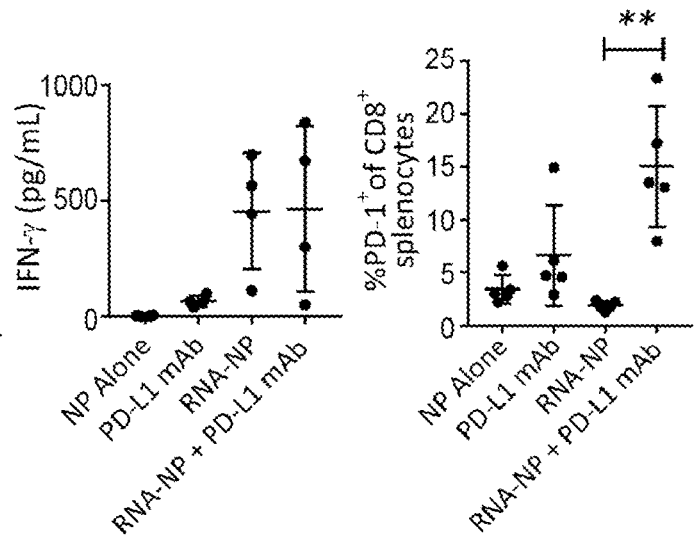
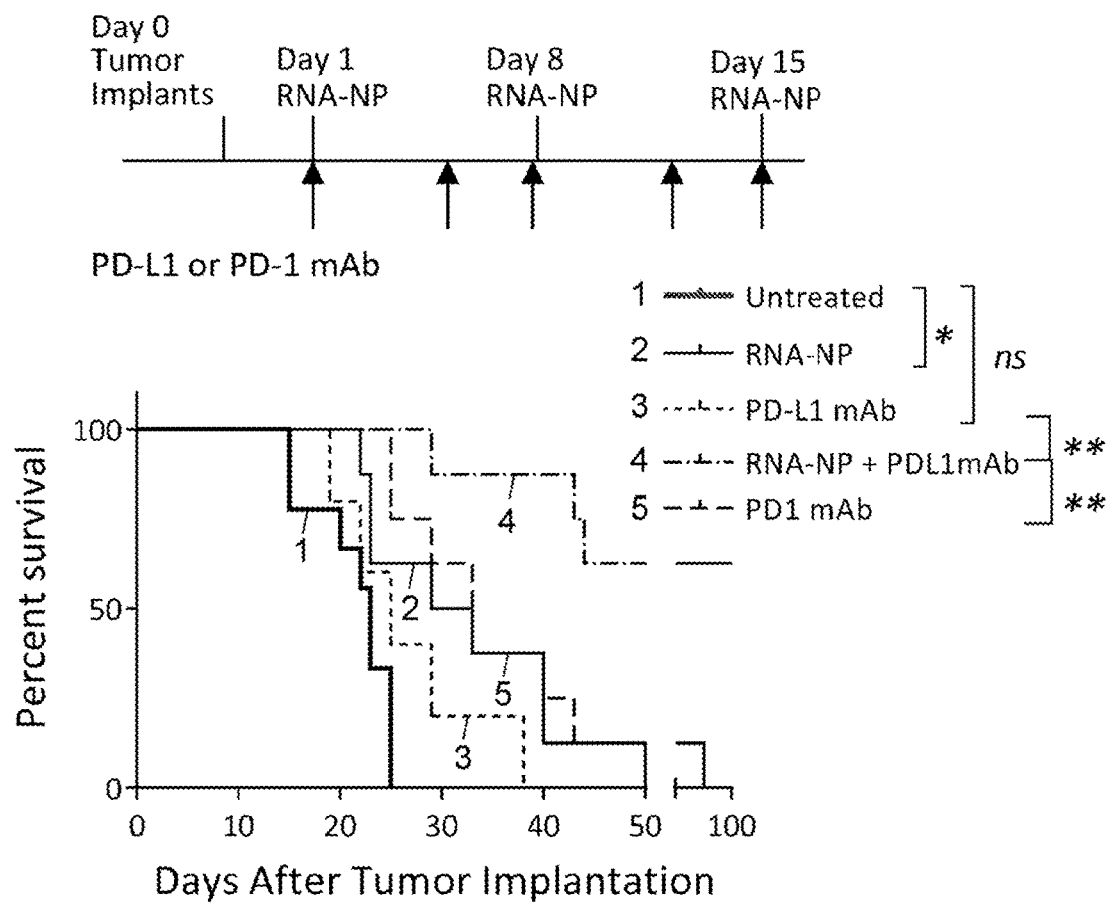

METHODS OF SENSITIZING TUMORS TO TREATMENT WITH IMMUNE CHECKPOINT INHIBITORS

CROSS REFERENCE TO RELATED APPLICATIONS

This application is a U.S. national phase application pursuant to 35 U.S.C. § 371 of International Patent Application No. PCT/US2019/046618, filed Aug. 15, 2019, which claims priority to U.S. Provisional Application No. 62/764,935, filed on Aug. 15, 2018, the contents of which are incorporated herein by reference.

GRANT FUNDING DISCLOSURE

This invention was made with government support under Grant Nos. K08 CA199224, R0I CA195563 and TR001428 awarded by the National Institutes of Health, and Grant No. W81XWH-17-1-0510 awarded by the U.S. Army Medical Research Acquisition. The government has certain rights in the invention.

BACKGROUND

Cancer immunotherapy with immune checkpoint inhibitors (ICIs) has shown significant promise against malignancies with immunologically active ('hot') microenvironments, however, this therapy has failed in clinical trials for patients with immunologically inactive ('cold') tumors.[1-4] Response to ICIs appears to be predicated on the presence of intratumoral CD8+PD-1+ cells[5-6] and on activated PD-L1+ host-myeloid cells.[7] These cell populations may be naturally increased in patients with high mutational burdens, but absent in those without response.[5-6]

Cancer vaccines may be used to de novo activate these cell populations against immunologically inactive tumors, but have lagged in part by their inability to incite expeditious and robust anti-tumor immunity.[8-12] RNA lipid-nanoparticle (NP) vaccines have multiple advantages over traditional vaccines (i.e. bypassing MHC class restriction, targeted localization, and immunogenic potential of RNA as a toll-like receptor agonist), and have shown promising preclinical results. By engineering RNA lipid-NPs to be anionic in composition, Kranz et al. and Broos et al showed preferential localization to the spleen after intravenous administration.[13-14] Similarly, Oberli et al developed RNA lipid-NPs optimized with cholesterol and PEG for preferential localization to regional lymph nodes after subcutaneous administration.[15] While these RNA lipid-NPs vaccines have focused on targeting tumor associated antigens or neoepitopes, and have been designed to target lymphoid organs of interest, they remain encumbered by the profound intratumoral and systemic immunosuppression that may stymie an activated T cell response.

In view of the foregoing, there is a need for improved RNA lipid-nanoparticle (NP) vaccines and methods of using these vaccines to treat a tumor or cancer in patients with an immune checkpoint inhibitor (ICI)-resistant tumor, as well as methods for increasing a response to immunotherapy for immunologically inactive ('cold') tumors.

SUMMARY

Presented here for the first time are data demonstrating that systemic localization of untargeted tumor mRNA lipid-NPs (derived from whole transcriptome), with excess positive charge, prime the peripheral and intratumoral milieu for response to immunotherapy. The data demonstrate that, in immunologically-resistant tumor settings, the RNA-NPs activate the preponderance of systemic and intratumoral myeloid cells (characterized by co-expression of PD-L1 and CD86) and that the addition of immune checkpoint inhibitors (ICIs) (to animals primed with the RNA-NPs) augments peripheral/intratumoral PD-1+CD8+ cells and mediates synergistic anti-tumor efficacy in settings where ICIs alone do not confer therapeutic benefit. These data show that synergistic effects are mediated by type I interferon released from plasmacytoid dendritic cells (pDCs) and that personalized mRNA-NPs were safe and active in a client-owned canine with a spontaneous malignant glioma. The data presented herein demonstrate widespread immune activation from tumor loaded RNA-NPs concomitant with inducible PD-L1 expression that can be therapeutically exploited. It is shown that, even though immunotherapy remains effective for only a subset of cancer patients, combination therapy with systemic immunomodulating RNA-NPs broaden its therapeutic potency.

Accordingly, the present disclosure provides a method of increasing sensitivity of a tumor to treatment with an immune checkpoint inhibitor (ICI) in a subject. In exemplary embodiments, the method comprises administering to the subject a composition comprising a liposome comprising a cationic lipid and nucleic acid molecules, wherein the liposome is systemically administered to the subject.

The present disclosure also provides methods of treating a subject with an immune checkpoint inhibitor (ICI)-resistant tumor. In exemplary embodiments, the method comprises administering to the subject (i) a composition comprising a liposome comprising a cationic lipid and nucleic acid molecules, and (ii) a PD-L1 inhibitor, wherein the liposome is systemically administered to the subject.

Further provided are methods of increasing the number of activated plasmacytoid dendritic cells (pDCs) in a subject in need thereof. In exemplary embodiments, the method comprises administering to the subject a composition comprising a liposome comprising a cationic lipid and nucleic acid molecules, wherein the liposome is systemically administered to the subject.

The present disclosure additionally provides methods of treating a subject with a tumor or cancer. In exemplary embodiments, the method comprises (i) increasing the number of activated plasmacytoid dendritic cells (pDCs) in the subject in accordance with a presently disclosed method of increasing the number of activated pDCs, (ii) isolating white blood cells (WBCs) from the subject, (iii) isolating dendritic cells (DCs) from the WBCs, (iv) contacting the DCs with a fusion protein comprising prostatic acid phosphatase (PAP) and GM-CSF, and (v) administering the DCs to subject.

Provided herein are methods of preparing a dendritic cell vaccine. In exemplary embodiments, the method comprises (i) increasing the number of activated plasmacytoid dendritic cells (pDCs) in the subject in accordance with a presently disclosed method of increasing the number of activated pDCs, (ii) isolating white blood cells (WBCs) from the subject, (iii) isolating dendritic cells (DCs) from the WBCs, and (iv) contacting the DCs with a fusion protein comprising prostatic acid phosphatase (PAP) and GM-CSF.

FIG. 5 demonstrates personalized mRNA-NPs are safe and active in a translational disease model for spontaneous canine glioma. (A) A 9 year old spayed female Boxer was diagnosed with a malignant glioma on a diagnostic MRI and enrolled to receive personalized mRNA-NPs per UFIACUC #2017087777. (B) mRNA was amplified from a cDNA library prepared from extracted total RNA material from the patient's biopsy. mRNA was sterilely complexed with DOTAP nanoliposomes, and drawn up from a vacutainer with a needle syringe. The RNA-NPs (~12 mL) were then administered via i.v. push over five minutes through an intravenous catheter placed in the patient's right front leg. (C-D) Nanoliposomes were generated for the canine patient and assessed for concentration and zeta potential over time with serial measurements (E) Temperatures were plotted over time during the patient's initial six hour observation period post-vaccination. (F) Interferon-α ELISA was performed in duplicate on serum from the canine at baseline, 3 and 6 hours post-vaccination. (G) Blood was drawn at baseline, 3 and 6 hours post-vaccination for assessment of PD-L1, MHCII, CD80, and CD86 on CD11c+ cells. Gating strategy is shown for canine CD11c+ cells and expression of PD-L1, CD80, CD86, and MHCII. (H) CD11c expression of PD-L1, MHC-II, PD-L1/CD80, and PD-L1/CD86 is plotted over time. (I) CD3+ cells were analyzed over time for percent CD4 and CD8 and these subsets were assessed for expression of FoxP3 and IFN-γ respectively.

Figure 6:
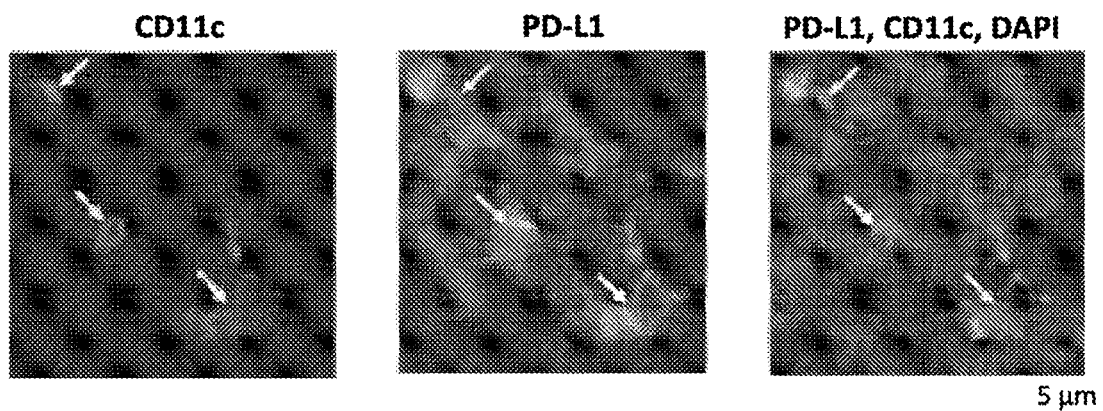

FIG. 6 demonstrates PD-L1 expression on CD11c+ cells post-RNA-NPs.

FIG. 7 demonstrates RNA-NPs increase PD-L1 expression on CD11c+ intratumoral cells FIG. 8 demonstrates antigen versus non-antigen specific PD-L1+APCs.

Figure 9A:
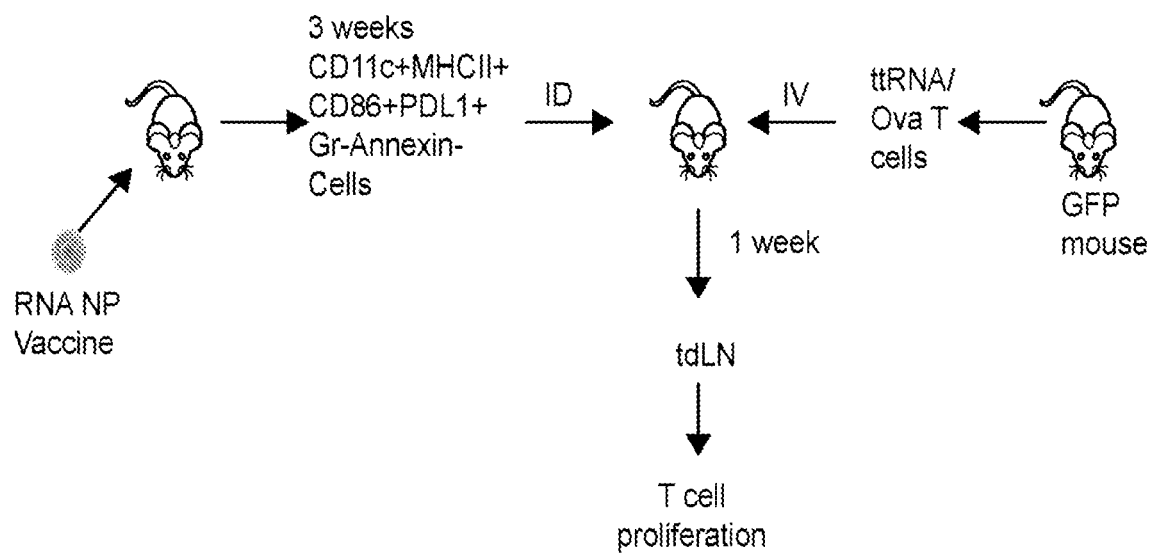
Figure 9B:
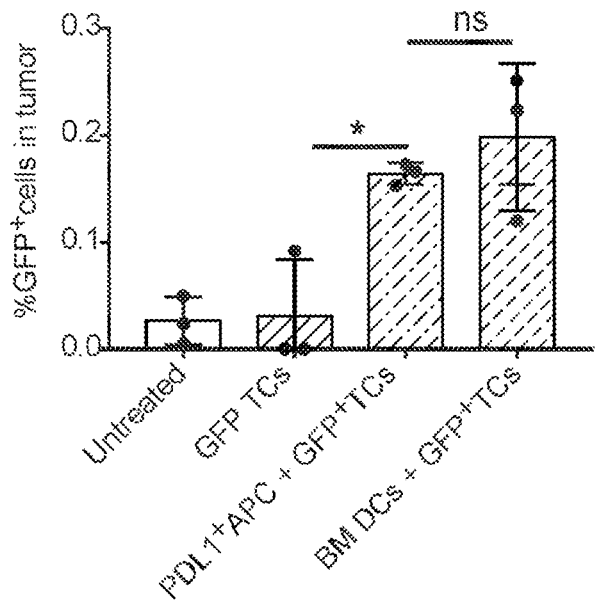
Figure 9C:
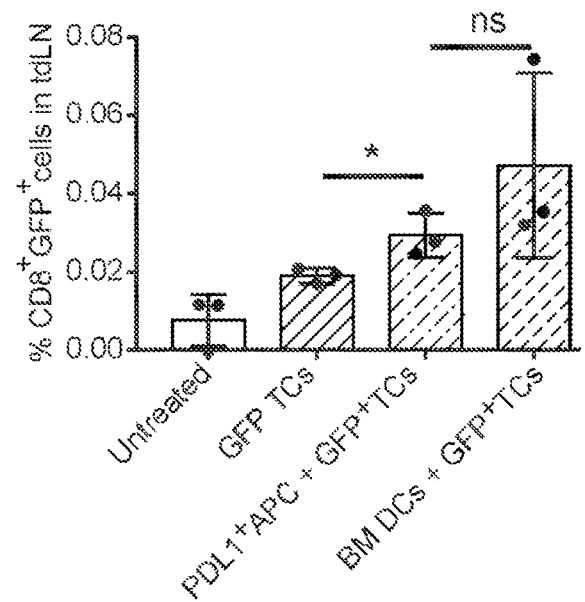

FIG. 9 demonstrates the expansion of antigen specific T cells from RNA-NP treated intratumoral PD-L1+ APCs.

Figure 10:
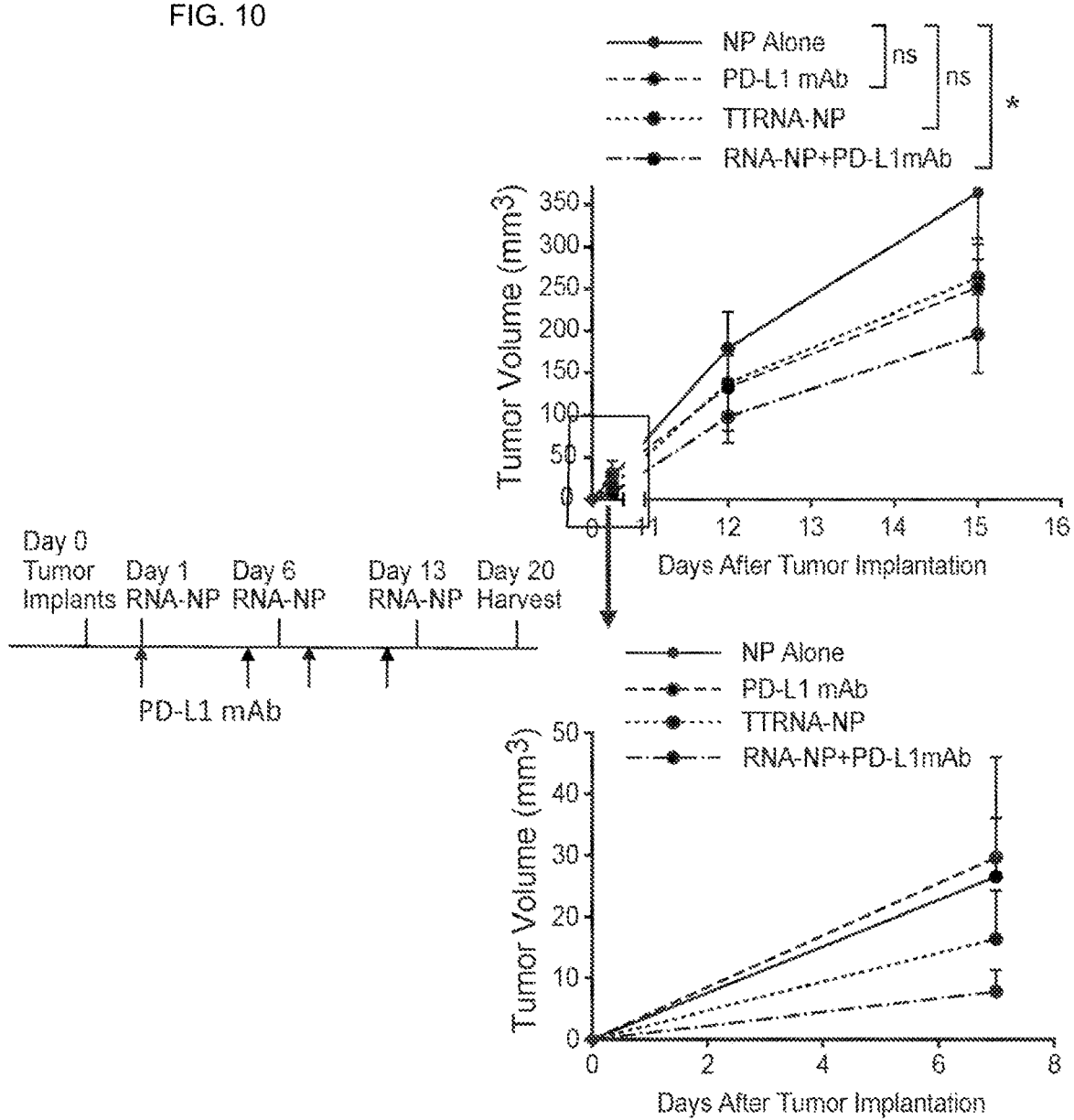

FIG. 10 demonstrates the anti-tumor efficacy of TTRNA-NPs and PD-L1 mAbs in a murine model for LLC.

Figure 11:
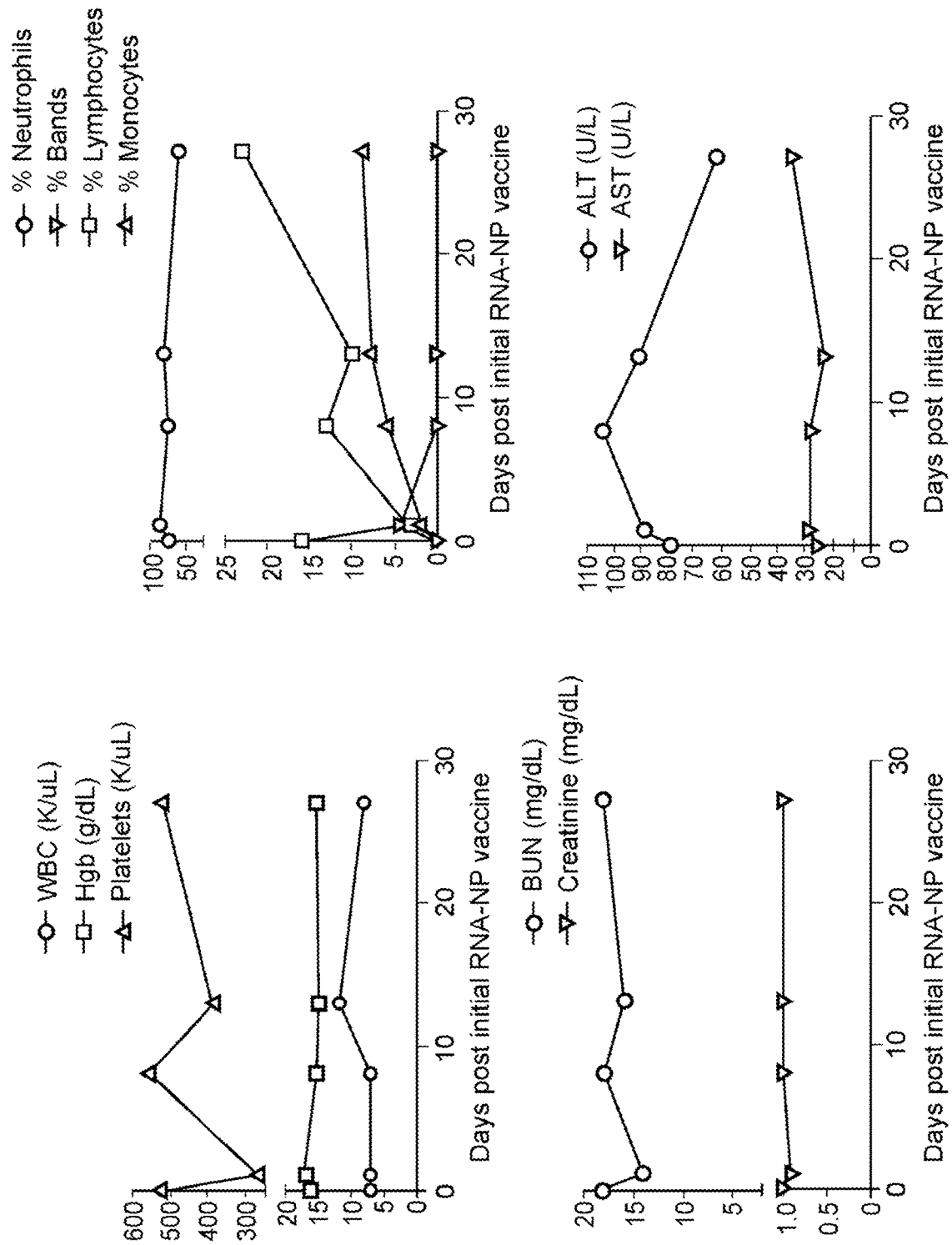

FIG. 11 demonstrates CBCs and organ function tests plotted over time in a client owned canine receiving personalized mRNA-NPs.

Figure 12A:
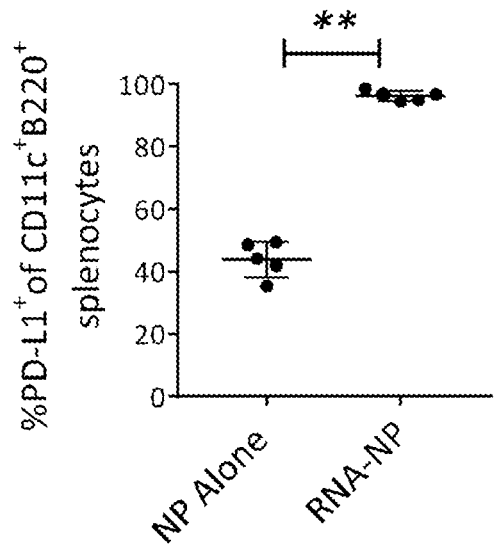
Figure 12B:
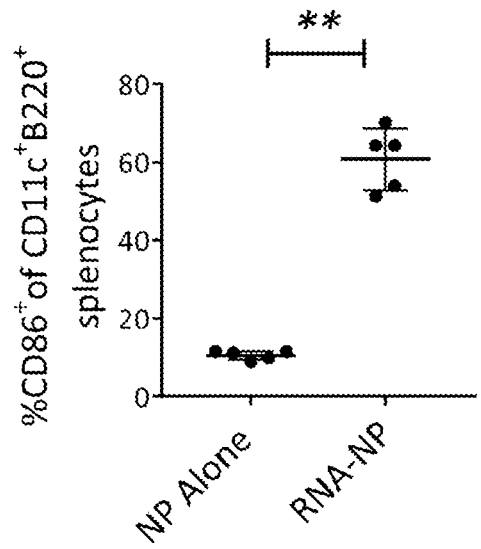
Figure 12C:
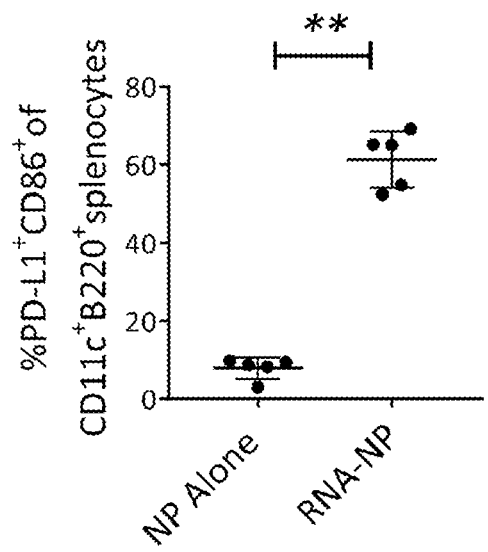
Figure 12D:
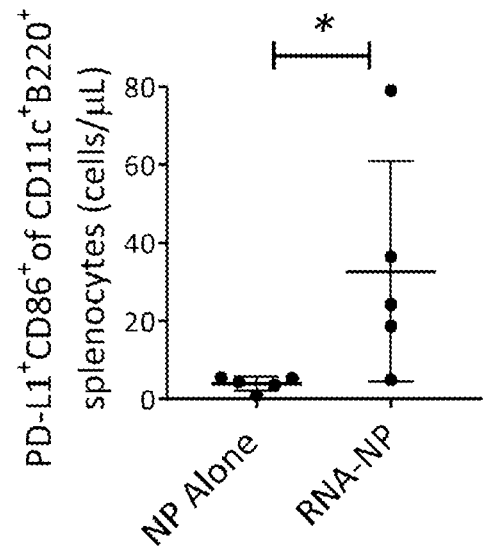

FIGS. 12A-12D represent a series of graphs showing that RNA-NP increase the number of activated pDCs. PD-L1/ CD86+ pDCs are identified by CD11c+B220+ staining. FIG. 12A represents % PD-L1+ of CD11c+B2220+ splenocytes from mice treated with NP alone or with RNA-NP. FIG. 12B represents the % CD86+ of CD11c+B2220+ splenocytes from mice treated with NP alone or with RNA-NP. FIG. 12C represents the % PD-L1+CD86+ of CD11c+B2220+ splenocytes from mice treated with NP alone or with RNA-NP. FIG. 12D is a graph of PD-L1+CD86+ of CD11c+B2220+ splenocytes (cells/μl).

Figure 13:
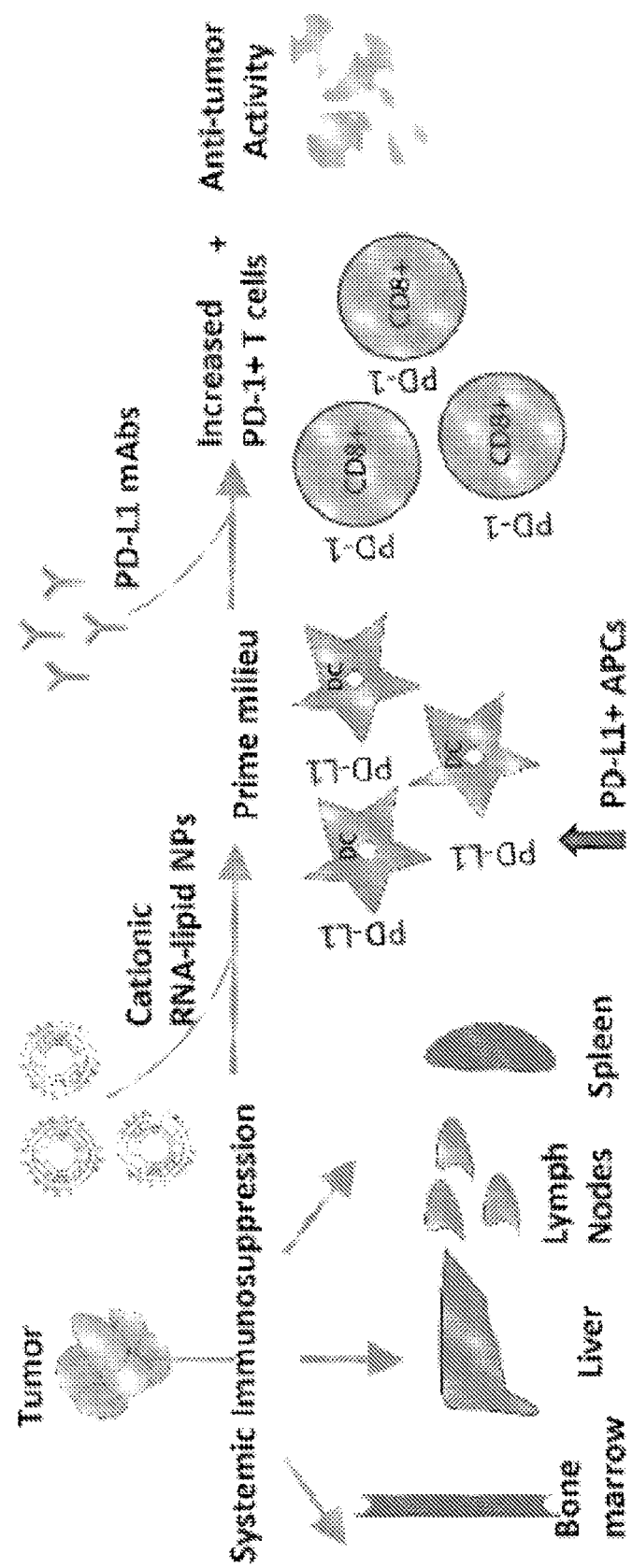
Figure 14:
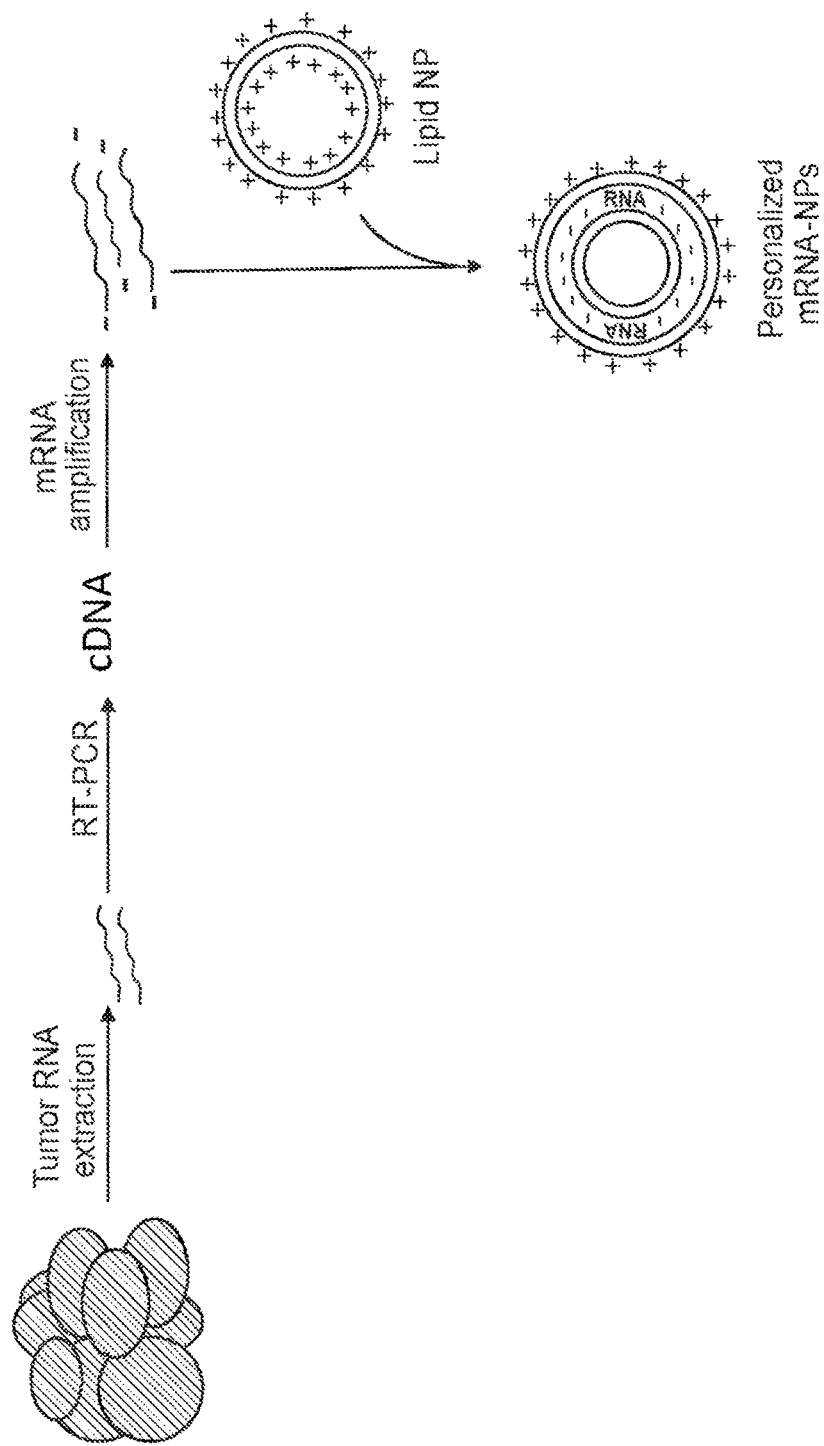

FIG. 13 is an illustration relating to the following: translation of nanoparticles (NPs) into human clinical trials for patients with refractory cancers has lagged due to unknown biologic reactivities of novel NP designs. To overcome these limitations, simple well-characterized mRNA lipid-NPs have been developed as cancer immunotherapeutic vaccines. While the preponderance of RNA lipid-NPs encoding for tumor-associated antigens or neoepitopes have been designed to target lymphoid organs, they remain encumbered by the profound intratumoral and systemic immunosuppression that may stymie an activated T cell response. Herein, we show that systemic localization of untargeted tumor RNA (derived from whole transcriptome) encapsulated in lipid-NPs, with excess positive charge, primes the peripheral and intratumoral milieu for response to immunotherapy. In immunologically resistant tumor models, these RNA-NPs activate the preponderance of systemic and intratumoral myeloid cells (characterized by coexpression of PD-L1 and CD86). Addition of immune checkpoint inhibitors (ICIs) (to animals primed with RNA-NPs) augments peripheral/intratumoral PD-1+CD8+ cells and mediates synergistic antitumor efficacy in settings where ICIs alone do not confer therapeutic benefit. These synergistic effects are mediated by type I interferon released from plasmacytoid dendritic cells (pDCs). In translational studies, personalized mRNA-NPs were safe and active in a client-owned canine with a spontaneous malignant glioma. In summary, we demonstrate widespread immune activation from tumor loaded RNA-NPs concomitant with inducible PD-L1 expression that can be therapeutically exploited. While immunotherapy remains effective for only a subset of cancer patients, combination therapy with systemic immunomodulating RNA-NPs may broaden its therapeutic potency FIG. 14 demonstrates the generation of personalized tumor mRNA NPs. From as few as 100-500 biopsied tumor cells, total RNA is extracted and a cDNA library is generated from which copious amounts of mRNA (representing a personalized tumor specific transcriptome) can be amplified. Negatively charged tumor mRNA is admixed with positively charged lipid-NPs. RNA is attracted to a lipid-NP by electrostatic interactions and coats its surface. The negative charge on the surface attracts other positively charged lipid-NPs, which result in the formation of a single layer of RNA entrapped between 2 lipid particles.

Figure 15C:
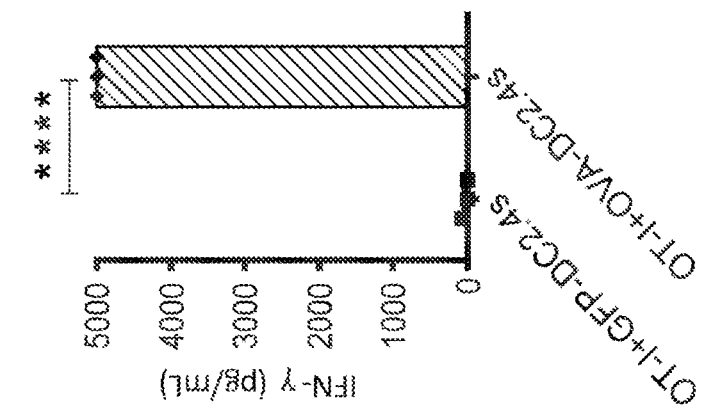
Figures 15A, 15B:
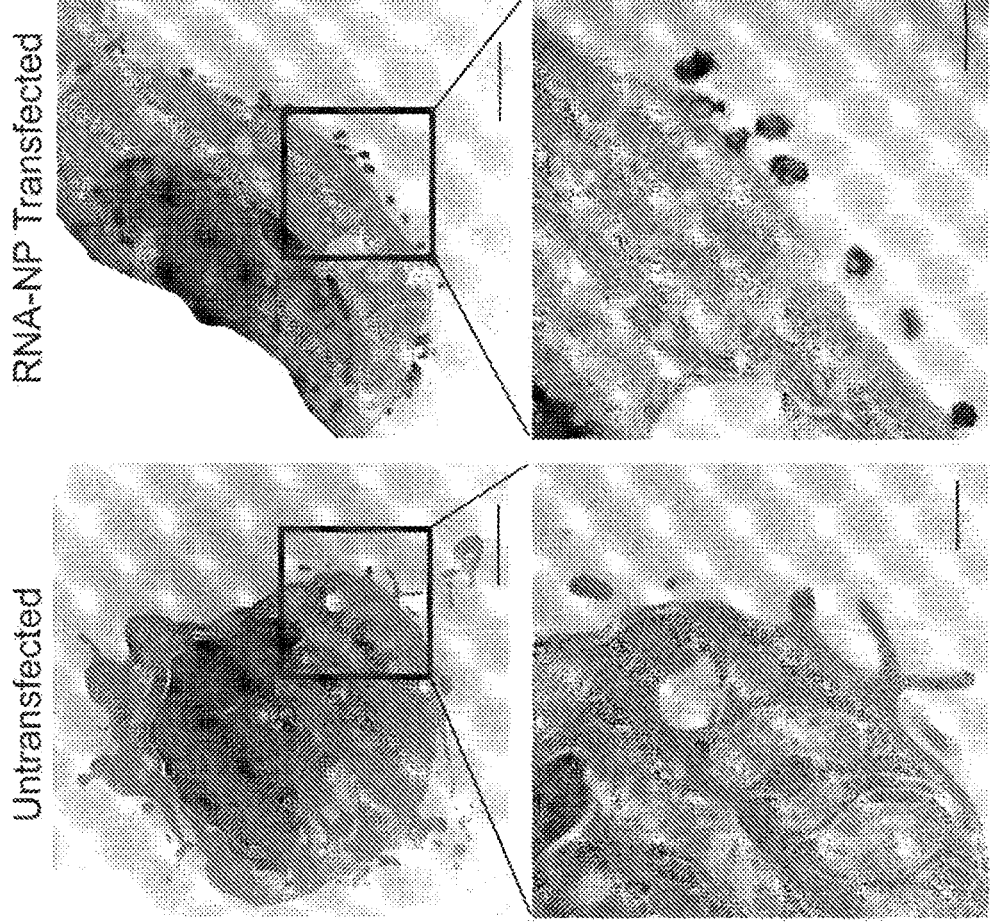

FIG. 15 shows electron microscopy of untransfected and transfected DC2.4s, and stimulation of antigen specific immunity from DC2.4s. Untransfected (A) and RNA-NP transfected (B) DC2.4s were harvested within 24 hrs of transfection and imaged by TEM. Insets are enlarged below. Scale bars=2 μm (upper panels), 500 nm (lower panels). (C) To ensure that DC2.4s could stimulate antigen specific immunity, we co-cultured ex vivo activated OTI cells with OVA mRNA electroporated DC2.4s and demonstrated potent stimulation of antigen specific immunity based on IFN-γ secretion (****p<0.0001, unpaired t test, overflow values assigned concentration of 5000 pg/mL).

FIG. 16 demonstrates that RNA-NPs mediate an increase in CD86/PD-L1 on CD45+ intratumoral cells and CD11c+ splenocytes that can be significantly decreased by administration of IFNAR1 mAbs or PDCA-1 mAbs. (A) CT-2A (transduced with GFP and luciferase) tumor cells were implanted subcutaneously into C57Bl/6 mice, and OVA RNA-NPs or RNA-NPs with IFNAR1 mAbs were administered. Tumors were harvested within 24 hrs for intratumoral assessment of MHC-I, CD45, CD86 and PD-L1 (*p<0.05, p<0.01, *p<0.001, unpaired t test). (B) B16F0 (50,000 cells) tumor cells were implanted into C57Bl/6 mice and luciferase RNA-NPs (iv) or RNA-NPs (iv) with PDCA-1 depleting antibodies (ip, 24 hrs prior) were administered. Serum was harvested at 6 hrs for analysis of IFN-α. Spleens were harvested one day later for analysis of PDCA-1/CD86 expression on $CD45^+CD11c^+$ cells by flow cytometry (**p<0.01, Mann Whitney test).

Figure 17:
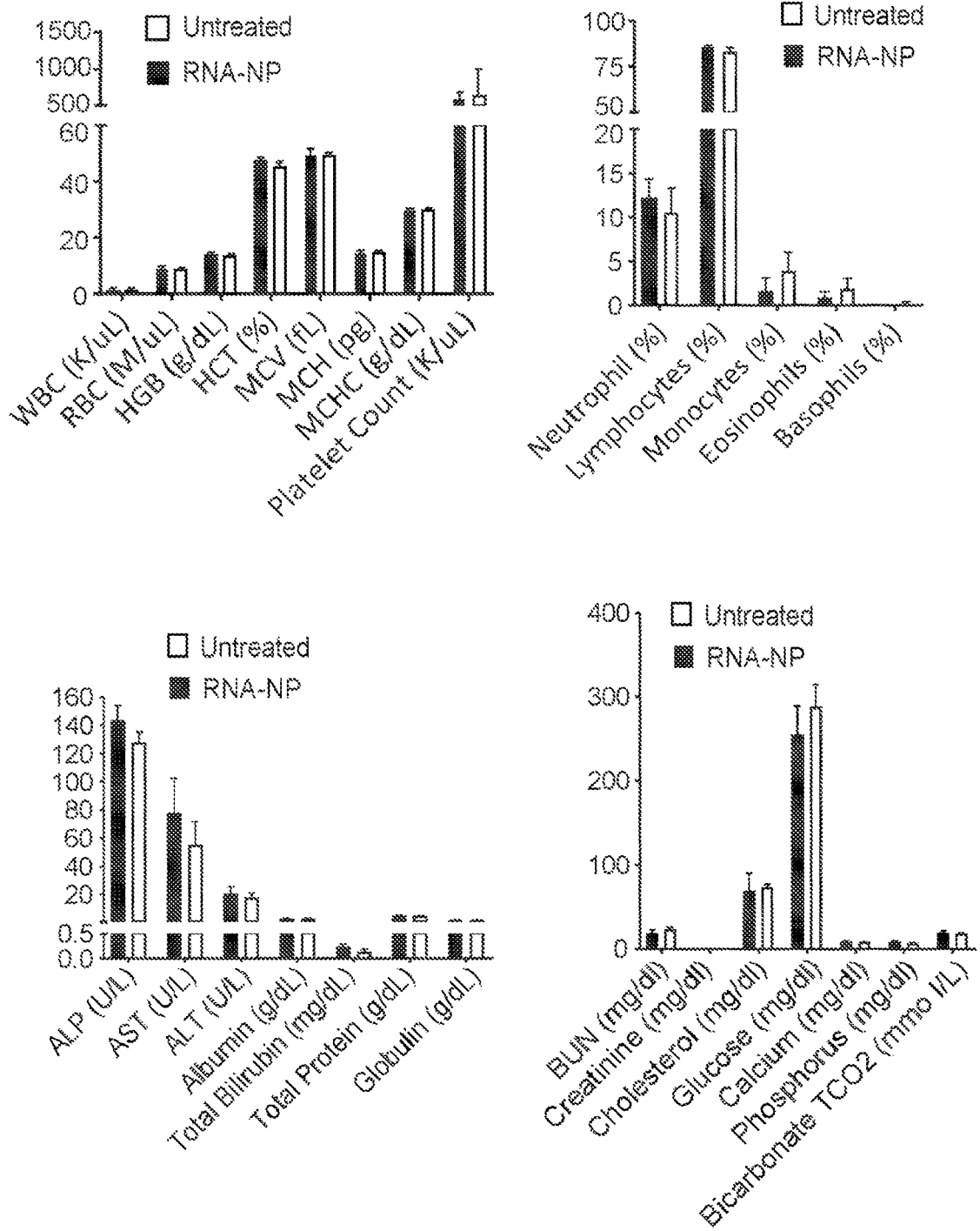

FIG. 17 relates to acute murine toxicity studies. Acute toxicity was assessed from three untreated and three RNA-NP treated (iv once weekly ×3) C57Bl/6 mice (30 days post initial vaccine) based on CBCs/differentials, chemistries, organ function tests and end-organ histology.

Figure 18:
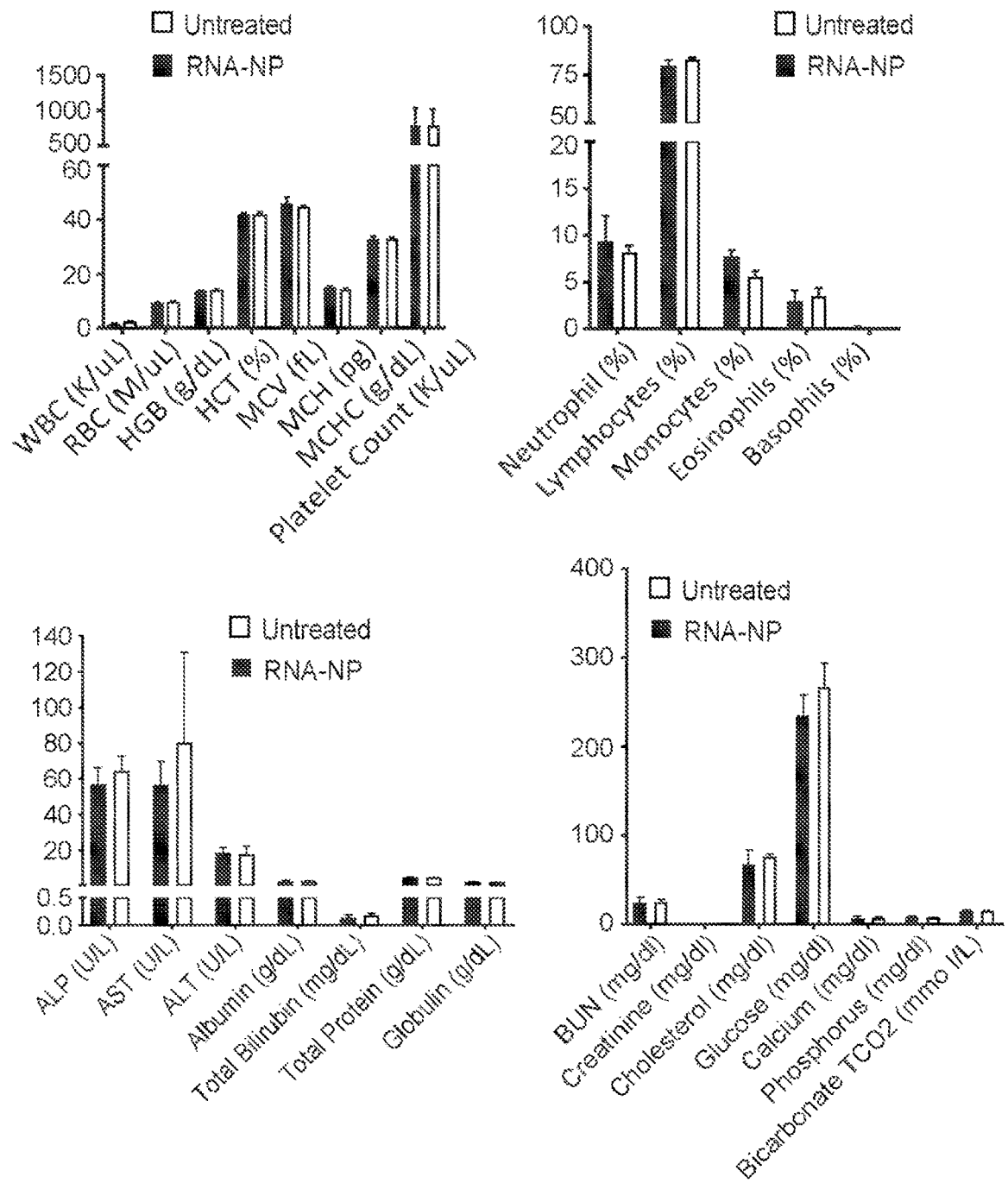
Figure 19:
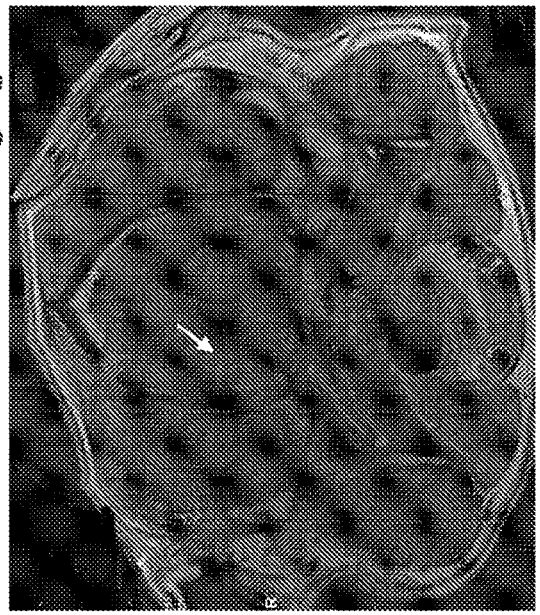
Figure 19:
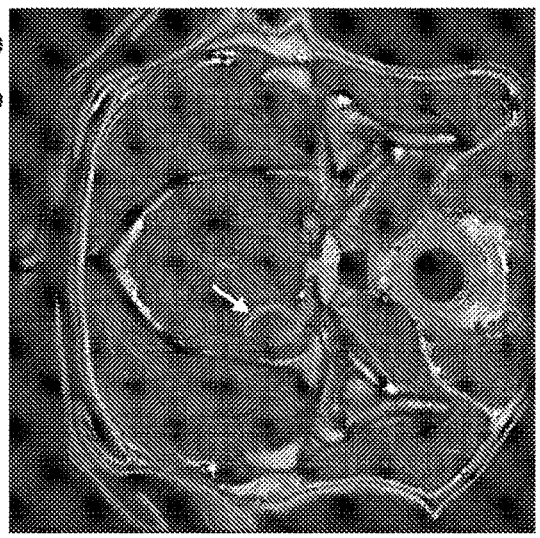

FIG. 18 relates to chronic murine toxicity studies. Chronic toxicity was assessed from untreated and RNA-NP treated (iv once weekly ×3) C57Bl/6 mice (100 days post initial vaccine) based on CBCs/differentials, chemistries, organ function tests and end-organ histology FIG. 19 demonstrates pre and post-vaccine MR imaging. MR imaging of a 9 y/o female Boxer with a spontaneous malignant glioma was obtained prior to vaccines and 2 weeks after weekly RNA-NPs (×3).

DETAILED DESCRIPTION

Immune checkpoint inhibitors (ICIs) have revolutionized treatment of multiple cancers and has bolstered interest in this treatment approach. While other approaches, e.g., cancer vaccines, adoptive immune cell therapies, have been developed for the treatment of cancer, the introduction of ICIs has caused a paradigm shift in cancer treatment. ICI therapies are now FDA-approved for a variety of cancers including melanoma, non-small cell lung cancer (NSCLC), renal cell carcinomas (RCC), bladder cancer, and classical Hodgkin lymphoma. Much enthusiasm stems from evidence of complete and long-lasting tumor regression in malignancies that are often refractory to chemotherapy. See, e.g., Gaillard et al., Gynecol Oncol Res Pract 3:11 (2016).

Despite the focus and energy on the research and development of ICIs, many patients still fail to respond to ICI therapy. For example, emerging clinical data demonstrate limited clinical efficacy of ICIs in ovarian cancer with objective response rates of 10-15% with some durable responses (Gaillard et al., 2016, supra). Many cancer patients failed to respond to the PD-1/PD-L1 checkpoint blockades (Meng et al., Cancer Treat Rev 41(10): 868-76 (2015)).

The present disclosure provides methods of increasing sensitivity of a tumor to treatment with an immune checkpoint inhibitor (ICI) in a subject. In exemplary embodiments, the method comprises administering to the subject a composition comprising a liposome comprising a cationic lipid and nucleic acid molecules, wherein the liposome is systemically administered to the subject.

The present disclosure also provides methods of treating a subject with an immune checkpoint inhibitor (ICI)-resistant tumor. In exemplary embodiments, the method comprises administering to the subject (i) a composition comprising a liposome comprising a cationic lipid and nucleic acid molecules, and (ii) a PD-L1 inhibitor, wherein the liposome is systemically administered to the subject.

Liposomes

The liposomes of the presently disclosed methods comprise a cationic lipid and nucleic acid molecules. In exemplary aspects, the liposome has a zeta potential of about 30 mV to about 60 mV. In other words, in certain aspects, the liposome has an overall surface net charge of about 30 mV to about 60 mV (e.g., about 30 mV to about 55 mV, about 30 mV to about 50 mV, 30 mV to about 45 mV, about 30 mV to about 40 mV, about 30 mV to about 35 mV, about 35 mV to about 60 mV, about 40 mV to about 60 mV, about 45 mV to about 60 mV, about 50 mV to about 60 mV, or about 55 mV to about 60 mV. In exemplary aspects, the liposome has an overall surface net charge of about 40 mV to about 50 mV.

In exemplary aspects, the liposome has a diameter between about 50 nm to about 500 nm, e.g., about 50 nm to about 450 nm, about 50 nm to about 400 nm, about 50 nm to about 350 nm, about 50 nm to about 300 nm, about 50 nm to about 250 nm, about 50 nm to about 200 nm, about 50 nm to about 150 nm, about 50 nm to about 100 nm, about 100 nm to about 500 nm, about 150 nm to about 500 nm, about 200 nm to about 500 nm, about 250 nm to about 500 nm, about 300 nm to about 500 nm, about 350 nm to about 500 nm, about 400 nm to about 500 nm. In exemplary aspects, the liposome has a diameter between about 50 nm to about 300 nm, e.g., about 100 nm to about 250 nm, about 110 nm±5 nm, about 115 nm±5 nm, about 120 nm±5 nm, about 125 nm±5 nm, about 130 nm±5 nm, about 135 nm±5 nm, about 140 nm±5 nm, about 145 nm±5 nm, about 150 nm±5 nm, about 155 nm±5 nm, about 160 nm±5 nm, about 165 nm±5 nm, about 170 nm±5 nm, about 175 nm±5 nm, about 180 nm±5 nm, about 190 nm±5 nm, about 200 nm±5 nm, about 210 nm±5 nm, about 220 nm±5 nm, about 230 nm±5 nm, about 240 nm±5 nm, about 250 nm±5 nm, about 260 nm±5 nm, about 270 nm±5 nm, about 280 nm±5 nm, about 290 nm±5 nm, about 300 nm±5 nm. In exemplary aspects, the liposome is about 50 nm to about 250 nm in diameter. In some aspects, the liposome is about 70 nm to about 200 nm in diameter.

In exemplary aspects, the cationic lipid is a cationic fatty acid, a cationic glycerolipid, a cationic glycerophospholipid, a cationic sphingolipid, a cationic sterol lipid, a cationic prenol lipid, a cationic saccharolipid, or a cationic polyketide. In exemplary aspects, the cationic lipid comprises two fatty acyl chains, each chain of which is independently saturated or unsaturated. In some instances, the cationic lipid is a diglyceride. For example, in some instances, the cationic lipid may be a cationic lipid of Formula I or Formula II:

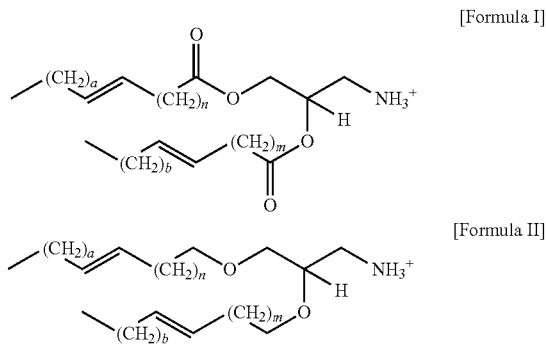

wherein each of a, b, n, and m is independently an integer between 2 and 12 (e.g., between 3 and 10). In some aspects, the cationic lipid is a cationic lipid of Formula I wherein each of a, b, n, and m is independently an integer selected from 3, 4, 5, 6, 7, 8, 9, and 10. In exemplary instances, the cationic lipid is DOTAP (1,2-dioleoyl-3-trimethylammonium-propane), or a derivative thereof. In exemplary instances, the cationic lipid is DOTMA (1,2-di-O-octadecenyl-3-trimethylammonium propane), or a derivative thereof.

In some embodiments, the nanoparticles comprise liposomes formed from 1,2-dioleyloxy-N,N-dimethylaminopropane (DODMA) liposomes, DiLa2 liposomes from Marina Biotech (Bothell, Wash.), 1,2-dilinoleyloxy-3-dimethylaminopropane (DLin-DMA), 2,2-dilinoleyl-4-(2-dimethylaminoethyl)-[1,3]-dioxolane (DLin-KC2-DMA), and MC3 (US20100324120; herein incorporated by reference in its entirety). In some embodiments, the nanoparticles comprise liposomes formed from the synthesis of stabilized plasmid-lipid particles (SPLP) or stabilized nucleic acid lipid particle (SNALP) that have been previously described and shown to be suitable for oligonucleotide delivery in vitro and in vivo. The nanoparticles in some aspects are composed of 3 to 4 lipid components in addition to the nucleic acid molecules. In exemplary aspects, the liposome comprises 55% cholesterol, 20% disteroylphosphatidyl choline (DSPC), 10% PEG-S-DSG, and 15% 1,2-dioleyloxy-N,N-dimethylaminopropane (DODMA), as described by Jeffs et al. In exemplary instances, the liposome comprises 48% cholesterol, 20% DSPC, 2% PEG-c-DMA, and 30% cationic lipid, where the cationic lipid can be 1,2-distearloxy-N,N-dimethylaminopropane (DSDMA), DODMA, DLin-DMA, or 1,2-dilinolenyloxy-3-dimethylaminopropane (DLenDMA), as described by Heyes et al.

In some embodiments, the liposomes comprise from about 25.0% cholesterol to about 40.0% cholesterol, from about 30.0% cholesterol to about 45.0% cholesterol, from about 35.0% cholesterol to about 50.0% cholesterol and/or from about 48.5% cholesterol to about 60% cholesterol. In some embodiments, the liposomes may comprise a percentage of cholesterol selected from the group consisting of 28.5%, 31.5%, 33.5%, 36.5%, 37.0%, 38.5%, 39.0% and 43.5%. In some embodiments, the liposomes may comprise from about 5.0% to about 10.0% DSPC and/or from about 7.0% to about 15.0% DSPC.

In some embodiments, the liposomes are DiLa2 liposomes (Marina Biotech, Bothell, Wash.), SMARTICLES® (Marina Biotech, Bothell, Wash.), neutral DOPC (1,2-dioleoyl-sn-glycero-3-phosphocholine) based liposomes (e.g., siRNA delivery for ovarian cancer (Landen et al. Cancer Biology & Therapy 2006 5(12)1708-1713); herein incorporated by reference in its entirety) and hyaluronan-coated liposomes (Quiet Therapeutics, Israel).

In various instances, the cationic lipid comprises 2,2-dilinoleyl-4-dimethylaminoethyl-[1,3]-dioxolane (DLin-KC2-DMA), dilinoleyl-methyl-4-dimethylaminobutyrate (DLin-MC3-DMA), or di((Z)-non-2-en-1-yl) 9-((4-(dimethylamino)butanoyl)oxy)heptadecanedioate (L319), and further comprise a neutral lipid, a sterol and a molecule capable of reducing particle aggregation, for example a PEG or PEG-modified lipid.

The liposome in various aspects comprises DLin-DMA, DLin-K-DMA, 98N12-5, C12-200, DLin-MC3-DMA, DLin-KC2-DMA, DODMA, PLGA, PEG, PEG-DMG, PEGylated lipids and amino alcohol lipids. In some aspects, the liposome comprises a cationic lipid such as, but not limited to, DLin-DMA, DLin-D-DMA, DLin-MC3-DMA, DLin-KC2-DMA, DODMA and amino alcohol lipids. The amino alcohol cationic lipid comprises in some aspects lipids described in and/or made by the methods described in U.S. Patent Publication No. US20130150625, herein incorporated by reference in its entirety. As a non-limiting example, the cationic lipid in certain aspects is 2-amino-3-[(9Z,12Z)-octadeca-9,12-dien-1-yloxy]-2-{[(9Z,2Z)-octadeca-9,12-dien-1-yloxy]methyl}propan-1-ol (Compound 1 in US20130150625); 2-amino-3-[(9Z)-octadec-9-en-1-yloxy]-2-{[(9Z)-octadec-9-en-1-yloxy]methyl}propan-1-ol (Compound 2 in US20130150625); 2-amino-3-[(9Z,12Z)-octadeca-9,12-dien-1-yloxy]-2-[(octyloxy)methyl]propan-1-ol (Compound 3 in US20130150625); and 2-(dimethylamino)-3-[(9Z,12Z)-octadeca-9,12-dien-1-yloxy]-2-{[(9Z,12Z)-octadeca-9,12-dien-1-yloxy]methyl}propan-1-ol (Compound 4 in US20130150625); or any pharmaceutically acceptable salt or stereoisomer thereof.

In various embodiments, the liposome comprises (i) at least one lipid selected from the group consisting of 2,2-dilinoleyl-4-dimethylaminoethyl-[1,3]-dioxolane (DLin-KC2-DMA), dilinoleyl-methyl-4-dimethylaminobutyrate (DLin-MC3-DMA), and di((Z)-non-2-en-1-yl) 9-((4-(dimethylamino)butanoyl)oxy)heptadecanedioate (L319); (ii) a neutral lipid selected from DSPC, DPPC, POPC, DOPE and SM; (iii) a sterol, e.g., cholesterol; and (iv) a PEG-lipid, e.g., PEG-DMG or PEG-cDMA, in a molar ratio of about 20-60% cationic lipid: 5-25% neutral lipid: 25-55% sterol; 0.5-15% PEG-lipid.

In some embodiments, the liposome comprises from about 25% to about 75% on a molar basis of a cationic lipid selected from 2,2-dilinoleyl-4-dimethylaminoethyl-[1,3]-dioxolane (DLin-KC2-DMA), dilinoleyl-methyl-4-dimethylaminobutyrate (DLin-MC3-DMA), and di((Z)-non-2-en-1-yl) 9-((4-(dimethylamino)butanoyl)oxy)heptadecanedioate (L319), e.g., from about 35 to about 65%, from about 45 to about 65%, about 60%, about 57.5%, about 50% or about 40% on a molar basis.

In some embodiments, the liposome comprises from about 0.5% to about 15% on a molar basis of the neutral lipid e.g., from about 3 to about 12%, from about 5 to about 10% or about 15%, about 10%, or about 7.5% on a molar basis. Examples of neutral lipids include, but are not limited to, DSPC, POPC, DPPC, DOPE and SM. In some embodiments, the formulation includes from about 5% to about 50% on a molar basis of the sterol (e.g., about 15 to about 45%, about 20 to about 40%, about 40%, about 38.5%, about 35%, or about 31% on a molar basis. An exemplary sterol is cholesterol. In some embodiments, the formulation includes from about 0.5% to about 20% on a molar basis of the PEG or PEG-modified lipid (e.g., about 0.5 to about 10%, about 0.5 to about 5%, about 1.5%, about 0.5%, about 1.5%, about 3.5%, or about 5% on a molar basis. In some embodiments, the PEG or PEG modified lipid comprises a PEG molecule of an average molecular weight of 2,000 Da. In other embodiments, the PEG or PEG modified lipid comprises a PEG molecule of an average molecular weight of less than 2,000, for example around 1,500 Da, around 1,000 Da, or around 500 Da. Examples of PEG-modified lipids include, but are not limited to, PEG-distearoyl glycerol (PEG-DMG) (also referred herein as PEG-C14 or C14-PEG), PEG-cDMA (further discussed in Reyes et al. J. Controlled Release, 107, 276-287 (2005) the contents of which are herein incorporated by reference in their entirety)

In exemplary aspects, the cationic lipid may be selected from (20Z,23Z)—N,N-dimethylnonacosa-20,23-dien-10-amine, (17Z,20Z)—N,N-dimemylhexacosa-17,20-dien-9-amine, (1Z,19Z)—N,N-dimethylpentacosa-1 6, 19-dien-8-amine, (13Z,16Z)—N,N-dimethyldocosa-13,16-dien-5-amine, (12Z,15Z)—N,N-dimethylhenicosa-12,15-dien-4-amine, (14Z,17Z)—N,N-dimethyltricosa-14,17-dien-6-amine, (15Z,18Z)—N,N-dimethyltetracosa-15,18-dien-7-amine, (18Z,21Z)—N,N-dimethylheptacosa-18,21-dien-10-amine, (15Z,18Z)—N,N-dimethyltetracosa-15,18-dien-5-amine, (14Z,17Z)—N,N-dimethyltricosa-14,17-dien-4- amine, (19Z,22Z)—N,N-dimeihyloctacosa-19,22-dien-9-amine, (18Z,21 Z)—N,N-dimethylheptacosa-18,21-dien-8-amine, (17Z,20Z)—N,N-dimethylhexacosa-17,20-dien-7-amine, (16Z,19Z)—N,N-dimethylpentacosa-16,19-dien-6-amine, (22Z,25Z)—N,N-dimethylhentriaconta-22,25-dien-10-amine, (21 Z,24Z)—N,N-dimethyltriaconta-21,24-dien-9-amine, (18Z)—N,N-dimetylheptacos-18-en-10-amine, (17Z)—N,N-dimethylhexacos-17-en-9-amine, (19Z,22Z)—N,N-dimethyloctacosa-19,22-dien-7-amine, N,N-dimethyl-heptacosan-10-amine, (20Z,23Z)—N-ethyl-N-methylnona-cosa-20,23-dien-10-amine, 1-[(11Z,14Z)-1-nonylicosa-11,14-dien-1-yl]pyrrolidine, (20Z)—N,N-dimethylheptacos-20-en-10-amine, (15Z)—N,N-dimethyl eptacos-15-en-10-amine, (14Z)—N,N-dimethylnonacos-14-en-10-amine, (17Z)—N,N-dimethylnonacos-17-en-10-amine, (24Z)—N,N-dimethyltritriacont-24-en-10-amine, (20Z)—N,N-dim-ethylnonacos-20-en-10-amine, (22Z)—N,N-dimethylhen-triacont-22-en-10-amine, (16Z)—N,N-dimethylpentacos-16-en-8-amine, (12Z,15Z)—N,N-dimethyl-2-nonylhenicosa-12,15-dien-1-amine, (13Z,16Z)—N,N-dimethyl-3-nonyldocosa-13,16-dien-1-amine, N,N-dimethyl-1-[(1S,2R)-2-octylcyclopropyl]eptadecan-8-amine, 1-[(1S,2R)-2-hexylcyclopropyl]-N,N-dimethylnonadecan-10-amine, N,N-dimethyl-1-[(1S,2R)-2-octylcyclopropyl]nonadecan-10-amine, N,N-dimethyl-21-[(1S,2R)-2-octylcyclopropyl]henicosan-10-amine, N,N-dimethyl-1-[(1S,2S)-2-{[(1R,2R)-2-pentylcyclopropyl]methyl}cyclopropyl]nonadecan-10-amine, N,N-dimethyl-1-[(1S,2R)-2-octylcyclopropyl]hexadecan-8-amine, N,N-dimethyl-[(1R,2S)-2-undecylcyclopropyl]tetradecan-5-amine, N,N-dimethyl-3-{7-[(1S,2R)-2-octylcyclopropyl]heptyl}dodecan-1-amine, 1-[(1R,2S)-2-heptylcyclopropyl]-N,N-dimethyloctadecan-9-amine, 1-[(1S,2R)-2-decylcyclopropyl]-N,N-dimethylpentadecan-6-amine, N,N-dimethyl-1-[(1S,2R)-2-octylcyclopropyl]pentadecan-8-amine, R—N,N-dimethyl-1-[(9Z,12Z)-octadeca-9,12-dien-1-yloxy]-3-(octyloxy)propan-2-amine, S—N,N-dimethyl-1-[(9Z,12Z)-octadeca-9,12-dien-1-yloxy]-3-(octyloxy)propan-2-amine, 1-{2-[(9Z,12Z)-octadeca-9,12-dien-1-yloxy]-1-[(octyloxy)methyl]ethyl}pyrrolidine, (2S)—N,N-dimethyl-1-[(9Z,12Z)-octadeca-9,12-dien-1-yloxy]-3-[(5Z)-oct-5-en-1-yloxy]propan-2-amine, 1-{2-[(9Z,12Z)-octadeca-9,12-dien-1-yloxy]-1-[(octyloxy)methyl]ethyl}azetidine, (2S)-1-(hexyloxy)-N,N-dimethyl-3-[(9Z,12Z)-octadeca-9,12-dien-1-yloxy]propan-2-amine, (2S)-1-(heptyloxy)-N,N-dimethyl-3-[(9Z,12Z)-octadeca-9,12-dien-1-yloxy]propan-2-amine, N,N-dimethyl-1-(nonyloxy)-3-[(9Z,12Z)-octadeca-9,12-dien-1-yloxy]propan-2-amine, N,N-dimethyl-1-[(9Z)-octadec-9-en-1-yloxy]-3-(octyloxy)propan-2-amine; (2S)—N,N-dimethyl-1-[(6Z,9Z,12Z)-octa-deca-6,9,12-trien-1-yloxy]-3-(octyloxy)propan-2-amine, (2S)-1-[(11Z,14Z)-icosa-11,14-dien-1-yloxy]-N,N-dimethyl-3-(pentyloxy)propan-2-amine, (2S)-1-(hexyloxy)-3-[(11Z,14Z)-icosa-11,14-dien-1-yloxy]-N,N-dimethylpropan-2-amine, 1-[(11Z,14Z)-icosa-11,14-dien-1-yloxy]-N,N-dimethyl-3-(octyloxy)propan-2-amine, 1-[(13Z,16Z)-docosa-13,16-dien-1-yloxy]-N,N-dimethyl-3-(octyloxy)propan-2-amine, (2S)-1-[(13Z,16Z)-docosa-13,16-dien-1-yloxy]-3-(hexyloxy)-N,N-dimethylpropan-2-amine, (2S)-1-[(13Z)-docos-13-en-1-yloxy]-3-(hexyloxy)-N,N-dimethylpropan-2-amine, 1-[(13Z)-docos-13-en-1-yloxy]-N,N-dimethyl-3-(octyloxy)propan-2-amine, 1-[(9Z)-hexadec-9-en-1-yloxy]-N,N-dimethyl-3-(octyloxy)propan-2-amine, (2R)—N,N-dimethyl-H(1-metoyloctyl)oxyl-3-[(9Z,12Z)-octadeca-9,12-dien-1-yloxy]propan-2-amine, (2R)-1-[(3,7-dimethyloctyl)oxy]-N,N-dimethyl-3-[(9Z,12Z)-octadeca-9,12-dien-1-yloxy]propan-2-amine, N,N-dimethyl-1-(octyloxy)-3-({8-[(1S,2S)-2-{[(1R,2R)-2-pentyl-cyclopropyl]methyl}cyclopropyl]octyl}oxy)propan-2-amine, N,N-dimethyl-1-{[8-(2-oclylcyclopropyl)octyl]oxy}-3-(octyloxy)propan-2-amine and (11E,20Z,23Z)—N,N-dimethylnonacosa-11,20,2-trien-10-amine or a pharmaceutically acceptable salt or stereoisomer thereof.

In some embodiments, the nanoparticle comprises a lipid-polycation complex. The formation of the lipid-polycation complex may be accomplished by methods known in the art and/or as described in U.S. Pub. No. 20120178702, herein incorporated by reference in its entirety. As a non-limiting example, the polycation may include a cationic peptide or a polypeptide such as, but not limited to, polylysine, polyornithine and/or polyarginine. In some embodiments, the composition may comprise a lipid-polycation complex, which may further include a non-cationic lipid such as, but not limited to, cholesterol or dioleoyl phosphatidyletha-nolamine (DOPE).

In exemplary aspects, the nucleic acid molecules are complexed with the cationic lipid via electrostatic interactions. The nucleic acid molecules are RNA in exemplary instances. For example, the RNA may be a tRNA, rRNA, or mRNA. In exemplary instances, the RNA are mRNA In exemplary aspects, the liposomes are prepared by mixing RNA and the cationic lipid at a RNA:cationic lipid ratio of about 1 to about 10 to about 1 to about 20 (e.g., about 1 to about 19, about 1 to about 18, about 1 to about 17, about 1 to about 16, about 1 to about 15, about 1 to about 14, about 1 to about 13, about 1 to about 12, about 1 to about 11). In exemplary instances, the liposomes are prepared by mixing RNA and the cationic lipid at a RNA: cationic lipid ratio of about 1 to about 15. As used herein, the term "nucleic acid molecule:cationic lipid ratio" is meant a mass ratio, where the mass of the nucleic acid molecule is relative to the mass of the cationic lipid. Also, in exemplary aspects, the term "nucleic acid molecule:cationic lipid ratio" is meant the ratio of the mass of the nucleic acid molecule, e.g., RNA, added to the liposomes comprising cationic lipids during the process of manufacturing the RNA NPs of the present disclosure.

In various aspects, the nucleic acid molecules are RNA molecules, e.g., transfer RNA (tRNA), ribosomal RNA (rRNA), messenger RNA (mRNA). In various aspects, the RNA molecules comprise tRNA, rRNA, mRNA, or a combination thereof. In various aspects, the RNA is total RNA isolated from a cell. In exemplary aspects, the RNA is total RNA isolated from a diseased cell, such as, for example, a tumor cell or a cancer cell. In various aspects, mRNA is in vitro transcribed mRNA. In various instances, the mRNA molecules are produced by in vitro transcription (IVT). Suitable techniques of carrying out IVT are known in the art. In exemplary aspects, an IVT kit is employed. In exemplary aspects, the kit comprises one or more IVT reaction reagents. As used herein, the term "in vitro transcription (IVT) reaction reagent" refers to any molecule, compound, factor, or salt, which functions in an IVT reaction. For example, the kit may comprise prokaryotic phage RNA polymerase and promoter (T7, T3, or SP6) with eukaryotic or prokaryotic extracts to synthesize proteins from exogenous DNA templates. In exemplary aspects, the RNA is in vitro transcribed mRNA, wherein the in vitro transcription template is cDNA made from RNA extracted from a tumor cell. In various aspects, the nanoparticle comprises a mixture of RNA which is RNA isolated from a tumor of a human, optionally, a malignant brain tumor, optionally, a glioblastoma, medulloblastoma, diffuse intrinsic pontine glioma, or a peripheral tumor with metastatic infiltration into the central nervous system. In various aspects, the RNA comprises a sequence encoding a poly(A) tail so that the in vitro transcribed RNA molecule comprises a poly(A) tail at the 3' end. In various aspects, the method of making a nanoparticle comprises additional processing steps, such as, for example, capping the in vitro transcribed RNA molecules. In exemplary instances, the liposome comprises a mixture of RNA molecules, e.g., RNA isolated from cells from a human. In some aspects, the human has a tumor and the mixture of RNA is RNA isolated from the tumor of the human. In exemplary aspects, the human has cancer, optionally, any cancer described herein. Optionally, the tumor from which RNA is isolated is selected from the group consisting of: a glioma, (including, but not limited to, a glioblastoma), a medulloblastoma, a diffuse intrinsic pontine glioma, or a peripheral tumor with metastatic infiltration into the central nervous system (e.g., melanoma or breast cancer). In exemplary aspects, the tumor from which RNA is isolated is a tumor of a cancer, e.g., any of these cancers described herein. In certain aspects, the nucleic acid molecules are expressed by the tumor. In some aspects, the nucleic acid molecules comprise RNA (e.g., mRNA) expressed by the tumor. In some instances, the nucleic acid molecules are prepared by amplifying mRNA from cDNA libraries generated from total RNA isolated from the tumor. See EXAMPLES for further details.

The nucleic acid molecules in some aspects encode a protein not expressed by the tumor and, optionally, not expressed by the subject. In certain instances, the nucleic acid molecules encode a single protein not expressed by the tumor and, optionally, not expressed by the subject. For instance, the nucleic acid molecules are RNA encoding a green fluorescence protein (GFP) or ovalbumin (OVA), as described herein in EXAMPLES. Additional proteins are contemplated and are not limited to being GFP or OVA.

The mRNAs in exemplary aspects encode a protein. Optionally, the protein is selected from the group consisting of: a tumor antigen, a cytokine, or a co-stimulatory molecule. In some aspects, the RNA molecule encodes a protein. The protein is, in some aspects, selected from the group consisting of: a tumor antigen, a co-stimulatory molecule, a cytokine, a growth factor, a lymphokine, (including, e.g., cytokines and growth factors that are effective in inhibiting tumor metastasis, cytokines or growth factors that have been shown to have an antiproliferative effect on at least one cell population. Such cytokines, lymphokines, growth factors, or other hematopoietic factors include, but are not limited to: M-CSF, GM-CSF, TNF, IL-1, IL-2, IL-3, IL-4, IL-5, IL-6, IL-7, IL-8, IL-9, IL-10, IL-11, IL-12, IL-13, IL-14, IL-15, IL-16, IL-17, IL-18, IFN, TNFα, TNF1, TNF2, G-CSF, Meg-CSF, GM-CSF, thrombopoietin, stem cell factor, and erythropoietin. Additional growth factors for use herein include angiogenin, bone morphogenic protein-1, bone morphogenic protein-2, bone morphogenic protein-3, bone morphogenic protein-4, bone morphogenic protein-5, bone morphogenic protein-6, bone morphogenic protein-7, bone morphogenic protein-8, bone morphogenic protein-9, bone morphogenic protein-10, bone morphogenic protein-11, bone morphogenic protein-12, bone morphogenic protein-13, bone morphogenic protein-14, bone morphogenic protein-15, bone morphogenic protein receptor IA, bone morphogenic protein receptor IB, brain derived neurotrophic factor, ciliary neutrophic factor, ciliary neutrophic factor receptor α, cytokine-induced neutrophil chemotactic factor 1, cytokine-induced neutrophil, chemotactic factor 2 α, cytokine-induced neutrophil chemotactic factor 2 β, β endothelial cell growth factor, endothelin 1, epithelial-derived neutrophil attractant, glial cell line-derived neutrophic factor receptor α 1, glial cell line-derived neutrophic factor receptor α 2, growth related protein, growth related protein α, growth related protein β, growth related protein γ, heparin binding epidermal growth factor, hepatocyte growth factor, hepatocyte growth factor receptor, insulin-like growth factor I, insulin-like growth factor receptor, insulin-like growth factor II, insulin-like growth factor binding protein, keratinocyte growth factor, leukemia inhibitory factor, leukemia inhibitory factor receptor α, nerve growth factor nerve growth factor receptor, neurotrophin-3, neurotrophin-4, pre-B cell growth stimulating factor, stem cell factor, stem cell factor receptor, transforming growth factor α, transforming growth factor β, transforming growth factor β1, transforming growth factor β1.2, transforming growth factor β2, transforming growth factor β3, transforming growth factor β5, latent transforming growth factor β1, transforming growth factor β binding protein I, transforming growth factor β binding protein II, transforming growth factor β binding protein III, tumor necrosis factor receptor type I, tumor necrosis factor receptor type II, urokinase-type plasminogen activator receptor, and chimeric proteins and biologically or immunologically active fragments thereof. In exemplary aspects, the tumor antigen is an antigen derived from a viral protein, an antigen derived from point mutations, or an antigen encoded by a cancer-germline gene. In exemplary aspects, the tumor antigen is pp65, p53, KRAS, NRAS, MAGEA, MAGEB, MAGEC, BAGE, GAGE, LAGE/NY-ESO1, SSX, tyrosinase, gp100/pmel17, Melan-A/MART-1, gp75/TRP1, TRP2, CEA, RAGE-1, HER2/NEU, WT1. In exemplary aspects, the co-stimulatory molecule is selected from the group consisting of: CD80 and CD86. In some aspects, the protein is not expressed by a tumor cell or by a human. In exemplary instances, the protein is not related to a tumor antigen or cancer antigen. In some aspects, the protein is non-specific relative to a tumor or cancer. For example, the non-specific protein may be green fluorescence protein (GFP) or ovalbumin (OVA).

In various instances, the RNA molecules are antisense molecules, optionally siRNA, shRNA, miRNA, or any combination thereof. The antisense molecule can be one which mediates RNA interference (RNAi). As known by one of ordinary skill in the art, RNAi is a ubiquitous mechanism of gene regulation in plants and animals in which target mRNAs are degraded in a sequence-specific manner (Sharp, Genes Dev., 15, 485-490 (2001); Hutvagner et al., Curr. Opin. Genet. Dev., 12, 225-232 (2002); Fire et al., Nature, 391, 806-811 (1998); Zamore et al., Cell, 101, 25-33 (2000)). The natural RNA degradation process is initiated by the dsRNA-specific endonuclease Dicer, which promotes cleavage of long dsRNA precursors into double-stranded fragments between 21 and 25 nucleotides long, termed small interfering RNA (siRNA; also known as short interfering RNA) (Zamore, et al., Cell. 101, 25-33 (2000); Elbashir et al., Genes Dev., 15, 188-200 (2001); Hammond et al., Nature, 404, 293-296 (2000); Bernstein et al., Nature, 409, 363-366 (2001)). siRNAs are incorporated into a large protein complex that recognizes and cleaves target mRNAs (Nykanen et al., Cell, 107, 309-321 (2001). It has been reported that introduction of dsRNA into mammalian cells does not result in efficient Dicer-mediated generation of siRNA and therefore does not induce RNAi (Caplen et al., Gene 252, 95-105 (2000); Ui-Tei et al., FEBS Lett, 479, 79-82 (2000)). The requirement for Dicer in maturation of siRNAs in cells can be bypassed by introducing synthetic 21-nucleotide siRNA duplexes, which inhibit expression of transfected and endogenous genes in a variety of mammalian cells (Elbashir et al., Nature, 411: 494-498 (2001)).

In this regard, the RNA molecule in some aspects mediates RNAi and in some aspects is a siRNA molecule specific for inhibiting the expression of a protein. The term "siRNA" as used herein refers to an RNA (or RNA analog) comprising from about 10 to about 50 nucleotides (or nucleotide analogs) which is capable of directing or mediating RNAi. In exemplary embodiments, an siRNA molecule comprises about 15 to about 30 nucleotides (or nucleotide analogs) or about 20 to about 25 nucleotides (or nucleotide analogs), e.g., 21-23 nucleotides (or nucleotide analogs). The siRNA can be double or single stranded, preferably double-stranded.

In alternative aspects, the RNA molecule is alternatively a short hairpin RNA (shRNA) molecule specific for inhibiting the expression of a protein. The term "shRNA" as used herein refers to a molecule of about 20 or more base pairs in which a single-stranded RNA partially contains a palindromic base sequence and forms a double-strand structure therein (i.e., a hairpin structure). An shRNA can be an siRNA (or siRNA analog) which is folded into a hairpin structure. shRNAs typically comprise about 45 to about 60 nucleotides, including the approximately 21 nucleotide antisense and sense portions of the hairpin, optional overhangs on the non-loop side of about 2 to about 6 nucleotides long, and the loop portion that can be, e.g., about 3 to 10 nucleotides long. The shRNA can be chemically synthesized. Alternatively, the shRNA can be produced by linking sense and antisense strands of a DNA sequence in reverse directions and synthesizing RNA in vitro with T7 RNA polymerase using the DNA as a template.

Though not wishing to be bound by any theory or mechanism it is believed that after shRNA is introduced into a cell, the shRNA is degraded into a length of about 20 bases or more (e.g., representatively 21, 22, 23 bases), and causes RNAi, leading to an inhibitory effect. Thus, shRNA elicits RNAi and therefore can be used as an effective component of the disclosure. shRNA may preferably have a 3'-protruding end. The length of the double-stranded portion is not particularly limited, but is preferably about 10 or more nucleotides, and more preferably about 20 or more nucleotides. Here, the 3'-protruding end may be preferably DNA, more preferably DNA of at least 2 nucleotides in length, and even more preferably DNA of 2-4 nucleotides in length.

In exemplary aspects, the antisense molecule is a microRNA (miRNA). As used herein the term "microRNA" refers to a small (e.g., 15-22 nucleotides), non-coding RNA molecule which base pairs with mRNA molecules to silence gene expression via translational repression or target degradation. microRNA and the therapeutic potential thereof are described in the art. See, e.g., Mulligan, *MicroRNA: Expression, Detection, and Therapeutic Strategies*, Nova Science Publishers, Inc., Hauppauge, NY, 2011; Bader and Lammers, "The Therapeutic Potential of microRNAs" *Innovations in Pharmaceutical Technology*, pages 52-55 (March 2011).

In certain instances, the RNA molecule is an antisense molecule, optionally, an siRNA, shRNA, or miRNA, which targets a protein of an immune checkpoint pathway for reduced expression. In various aspects, the protein of the immune checkpoint pathway is CTLA-4, PD-1, PD-L1, PD-L2, B7-H3, B7-H4, TIGIT, LAG3, CD112 TIM3, BTLA, or co-stimulatory receptor: ICOS, OX40, 41BB, or GITR. The protein of the immune-checkpoint pathway in certain instances is CTLA4, PD-1, PD-L1, B7-H3, B7H4, or TIM3. Immune checkpoint signaling pathways are reviewed in Pardoll, Nature Rev Cancer 12(4): 252-264 (2012).

In exemplary embodiments, the NPs of the present disclosure comprise a mixture of RNA molecules. In exemplary aspects, the mixture of RNA molecules is RNA isolated from cells from a human and optionally, the human has a tumor. In some aspects, the mixture of RNA is RNA isolated from the tumor of the human. In exemplary aspects, the human has cancer, optionally, any cancer described herein. Optionally, the tumor from which RNA is isolated is selected from the group consisting of: a glioma, (including, but not limited to, a glioblastoma), a medulloblastoma, a diffuse intrinsic pontine glioma, or a peripheral tumor with metastatic infiltration into the central nervous system (e.g., melanoma or breast cancer). In exemplary aspects, the tumor from which RNA is isolated is a tumor of a cancer, e.g., any of these cancers described herein.

In various aspects, the nucleic acid molecule (e.g., RNA molecule) further comprises a nucleotide sequence encoding a chimeric protein comprising a LAMP protein. In certain aspects, the LAMP protein is a LAMP1, LAMP 2, LAMP3, LAMP4, or LAMP5 protein.

Compositions

The compositions of the presently disclosed methods comprise any of the liposomes described herein. For instance, the composition comprises a homogeneous population of a single type of liposome described herein. Alternatively, the composition comprises a heterogeneous mixture of liposomes that vary in size, zeta potential, amount of cationic lipid, amount of nucleic acid molecules, type of cationic lipid, and/or type of nucleic acid molecules. In exemplary aspects, the composition comprises a heterogeneous mixture of liposomes varying in size, though having a diameter within the range of about 50 nm to about 250 nm in diameter, optionally, about 70 nm to about 200 nm in diameter. In exemplary aspects, the composition comprises an amount of liposomes effective to increase the number of PD-L1+/CD86+ myeloid antigen presenting cells (APCs) in the tumor periphery and/or in reticuloendothelial organs, increase PD-L1 expression by plasmacytoid dendritic cells (pDCs) and CD11c+ myeloid cells, increase Type I interferon release by pDCs, activate T-cell responses, or a combination thereof. Methods of determining the amount of liposomes that are effective to increase the number of PD-L1+/CD86+ myeloid antigen presenting cells (APCs) in the tumor periphery and/or in reticuloendothelial organs, increase PD-L1 expression by plasmacytoid dendritic cells (pDCs) and CD11c+ myeloid cells, increase Type I interferon release by pDCs, or activate T-cell responses are known in the art and include testing a series of compositions ranging in amount of liposomes and administering the compositions to a set of animal models followed by measurement of PD-L1+/CD86+ myeloid antigen presenting cells (APCs) in the tumor periphery and/or in reticuloendothelial organs, measurement of PD-L1/CD86 expression by plasmacytoid dendritic cells (pDCs) and CD11c+ myeloid cells, measurement of Type I interferon release by pDCs, or measurement of T-cell responses. Such measurements are described herein in EXAMPLES. In exemplary aspects, the composition comprises about $10^{10}$ liposomes per mL to about $10^{15}$ liposomes per mL (e.g., about $10^{10}$ liposomes per mL, about $10^{11}$ liposomes per mL, about $10^{12}$ liposomes per mL, about $10^{13}$ liposomes per mL, about $10^{14}$ liposomes per mL. In some aspects, the composition comprises about $10^{12}$ liposomes±10% per mL. In exemplary aspects, the composition is administered in an amount based on the weight of the subject. In exemplary aspects, about 1 to about 10 µL (e.g., about 2 to about 7 µL, about 2, 3, 4, 5, 6, or 7 µL, about 2.5 µL) of a solution comprising about $10^{12}$ liposomes per mL is administered per kg body weight.

In exemplary aspects, the composition of the present disclosure may comprise additional components other than the liposome. In some aspects, the compositions further comprise a pharmaceutically acceptable carrier, excipient or diluent. In exemplary aspects, the composition is a pharmaceutical composition intended for administration to a human. In exemplary aspects, the composition is a sterile composition. The composition, in various aspects, comprises any pharmaceutically acceptable ingredient, including, for example, acidifying agents, additives, adsorbents, aerosol propellants, air displacement agents, alkalizing agents, anticaking agents, anticoagulants, antimicrobial preservatives, antioxidants, antiseptics, bases, binders, buffering agents, chelating agents, coating agents, coloring agents, desiccants, detergents, diluents, disinfectants, disintegrants, dispersing agents, dissolution enhancing agents, dyes, emollients, emulsifying agents, emulsion stabilizers, fillers, film forming agents, flavor enhancers, flavoring agents, flow enhancers, gelling agents, granulating agents, humectants, lubricants, mucoadhesives, ointment bases, ointments, oleaginous vehicles, organic bases, pastille bases, pigments, plasticizers, polishing agents, preservatives, sequestering agents, skin penetrants, solubilizing agents, solvents, stabilizing agents, suppository bases, surface active agents, surfactants, suspending agents, sweetening agents, therapeutic agents, thickening agents, tonicity agents, toxicity agents, viscosity-increasing agents, water-absorbing agents, water-miscible cosolvents, water softeners, or wetting agents. See, e.g., the *Handbook of Pharmaceutical Excipients*, Third Edition, A. H. Kibbe (Pharmaceutical Press, London, U K, 2000), which is incorporated by reference in its entirety. *Remington's Pharmaceutical Sciences*, Sixteenth Edition, E. W. Martin (Mack Publishing Co., Easton, Pa., 1980), which is incorporated by reference in its entirety.

The composition of the present disclosure can be suitable for administration by any acceptable route, including parenteral and subcutaneous. Other routes include intravenous, intradermal, intramuscular, intraperitoneal, intranodal and intrasplenic, for example. In exemplary aspects, when the composition comprises the liposomes (not cells comprising the liposomes), the composition is suitable for systemic (e.g., intravenous) administration. In exemplary aspects, when the composition comprises cells comprising the liposomes (and not liposomes outside of cells), the composition is suitable for intradermal administration. In exemplary aspects, the composition is systemically administered via parenteral administration. In exemplary aspects, the composition is administered via injection or infusion. In exemplary instances, the composition is administered subcutaneously or intravenously or intramuscularly. In some aspects, the composition is administered intravenously.

If the composition is in a form intended for administration to a subject, it can be made to be isotonic with the intended site of administration. For example, if the solution is in a form intended for administration parenterally, it can be isotonic with blood. The composition typically is sterile. In certain embodiments, this may be accomplished by filtration through sterile filtration membranes. In certain embodiments, parenteral compositions generally are placed into a container having a sterile access port, for example, an intravenous solution bag, or vial having a stopper pierceable by a hypodermic injection needle, or a prefilled syringe. In certain embodiments, the composition may be stored either in a ready-to-use form or in a form (e.g., lyophilized) that is reconstituted or diluted prior to administration.

Methods and Additional Steps

The methods of the present disclosure may comprise the above described step(s) alone or in combination with other steps. The methods may comprise repeating any one of the above-described step(s) and/or may comprise additional steps, aside from those described above. For example, the presently disclosed methods may further comprise steps for making or preparing the liposomes or compositions of the present disclosure. For instance, the presently disclosed methods further comprise obtaining a sample of the tumor of the subject, optionally, via a biopsy. The methods also may further comprise isolating total RNA from the cells of the tumor, generating cDNA from the total RNA via reverse transcription, and amplifying mRNA from the cDNA. The presently disclosed methods also in some aspects further comprise mixing the mRNA and the cationic lipid at a RNA:cationic lipid ratio of about 1 to about 10 to about 1 to about 20 (e.g., about 1 to about 19, about 1 to about 18, about 1 to about 17, about 1 to about 16, about 1 to about 15, about 1 to about 14, about 1 to about 13, about 1 to about 12, about 1 to about 11). In exemplary instances, the presently disclosed methods further comprise mixing the mRNA and the cationic lipid at a RNA: cationic lipid ratio of about 1 to about 15.

In exemplary aspects, the method comprises administering an ICI to the subject. Thus, the present disclosure further provides a method of treating a subject with an immune checkpoint inhibitor (ICI)-resistant tumor. In exemplary aspects, the method comprises administering to the subject (i) a composition comprising a liposome comprising a cationic lipid and nucleic acid molecules, and (ii) a PD-L1 inhibitor, wherein the liposome is systemically administered to the subject. The composition and liposome may be any of those described herein. For example, the liposome may comprise DOTAP and the nucleic acid molecules may be a mixture of mRNA expressed by the tumor of the subject. In exemplary aspects, the composition comprising the liposome comprises a heterogeneous mixture of liposomes varied in size, though having a diameter within the range of 50 nm to about 250 nm. In exemplary aspects, the liposomes have a zeta potential of about 30 mV to about 60 mV, optionally, about 40 mV to about 50 mV. In exemplary aspects, the PD-L1 inhibitor is a PD-L1 antibody. PD-L1 inhibitors are known in the art and include but are not limited to being atezolizumab, avelumab, and durvalumab.

The terms "treat", "treating" and "treatment" refer to eliminating, reducing, suppressing or ameliorating, either temporarily or permanently, either partially or completely, a clinical symptom, manifestation or progression of an event, disease or condition associated with the medical condition described herein. As is recognized in the pertinent field, drugs employed as therapeutic agents may reduce the severity of a given disease state, but need not abolish every manifestation of the disease to be regarded as useful therapeutic agents. Similarly, a prophylactically administered treatment need not be completely effective in preventing the onset of a condition in order to constitute a viable prophylactic agent. Simply reducing the impact of a disease (for example, by reducing the number or severity of its symptoms, or by increasing the effectiveness of another treatment, or by producing another beneficial effect), or reducing the likelihood that the disease will occur or worsen in a subject, is sufficient. The term "therapeutically effective amount" refers to an amount of therapeutic agent that is effective to ameliorate or lessen symptoms or signs of disease associated with a disease or disorder. Also, the term "treat," as well as words related thereto, do not necessarily imply 100% or complete treatment. Rather, there are varying degrees of treatment of which one of ordinary skill in the art recognizes as having a potential benefit or therapeutic effect. In this respect, the methods of treating a disease of the present disclosure can provide any amount or any level of treatment. Furthermore, the treatment provided by the method may include treatment of one or more conditions or symptoms or signs of the disease being treated. For instance, the treatment method of the presently disclosure may inhibit one or more symptoms of the disease. Also, the treatment provided by the methods of the present disclosure may encompass slowing the progression of the disease. The term "treat" also encompasses prophylactic treatment of the disease. Accordingly, the treatment provided by the presently disclosed method may delay the onset or reoccurrence/relapse of the disease being prophylactically treated. In exemplary aspects, the method delays the onset of the disease by 1 day, 2 days, 4 days, 6 days, 8 days, 10 days, 15 days, 30 days, two months, 4 months, 6 months, 1 year, 2 years, 4 years, or more. The prophylactic treatment encompasses reducing the risk of the disease being treated. In exemplary aspects, the method reduces the risk of the disease 2-fold, 5-fold, 10-fold, 20-fold, 50-fold, 100-fold, or more.

Immune Checkpoint Inhibitors

As used herein, an "immune checkpoint inhibitor" or "ICI" is any agent (e.g., compound or molecule) that that decreases, blocks, inhibits, abrogates or interferes with the function of a protein of an immune checkpoint pathway. In various aspects, the protein of the immune checkpoint pathway is, for example, CTLA-4, PD-1, PD-L1, PD-L2, B7-H3, B7-H4, TIGIT, LAG3, CD112 TIM3, BTLA, or co-stimulatory receptor: ICOS, OX40, 41BB, or GITR. In various aspects, the ICI is an antibody, antigen-binding antibody fragment, or an antibody protein product, that binds to and inhibits the function of the protein of the immune checkpoint pathway. Suitable ICIs which are antibodies, antigen-binding antibody fragments, or an antibody protein products are known in the art and include, but are not limited to, ipilimumab, nivolumab, pembrolizumab, atezolizumab, avelumab, durvalumab (Wei et al., Cancer Discovery 8: 1069-1086 (2018)). In various aspects, the ICI is a PD-L1 inhibitor. For example, the PD-L1 inhibitor binds to and inhibits the function of PD-L1. In various aspects, the PD-L1 inhibitor is an anti-PD-L1 antibody, antigen binding antibody fragment, or an antibody-like molecule. In various aspects, the ICI is a PD-1 inhibitor. For example, the PD-1 inhibitor binds to and inhibits the function of PD-1, e.g., an anti-PD-1 antibody, antigen binding antibody fragment, or an antibody-like molecule. In various aspects, the PD-1 inhibitor is durvalumab, atezolizumab, or avelumab. In various aspects, the ICI is a PD-L2 inhibitor. For example, the PD-L2 inhibitor binds to and inhibits the function of PD-L2, e.g., an anti-PD-L2 antibody, antigen binding antibody fragment, or an antibody-like molecule.

As used herein, the term "antibody" refers to a protein having a conventional immunoglobulin format, comprising heavy and light chains, and comprising variable and constant regions. For example, an antibody may be an IgG which is a "Y-shaped" structure of two identical pairs of polypeptide chains, each pair having one "light" (typically having a molecular weight of about 25 kDa) and one "heavy" chain (typically having a molecular weight of about 50-70 kDa). An antibody may be cleaved into fragments by enzymes, such as, e.g., papain and pepsin. Papain cleaves an antibody to produce two Fab fragments and a single Fc fragment. Pepsin cleaves an antibody to produce a F(ab')$_2$ fragment and a pFc' fragment. In exemplary aspects, the ICI is an antigen binding antibody fragment, e.g., a Fab, Fc, F(ab')$_2$, or a pFc'. The architecture of antibodies has been exploited to create a growing range of alternative antibody formats that spans a molecular-weight range of at least or about 12-150 kDa and a valency (n) range from monomeric (n=1), dimeric (n=2) and trimeric (n=3) to tetrameric (n=4) and potentially higher; such alternative antibody formats are referred to herein as "antibody-like molecules". Antibody-like molecules can be an antigen binding format based on antibody fragments, e.g., scFvs, Fabs and VHH/VH, which retain full antigen-binding capacity. The smallest antigen-binding fragment that retains its complete antigen binding site is the Fv fragment, which consists entirely of variable (V) regions. A soluble, flexible amino acid peptide linker is used to connect the V regions to a scFv (single chain fragment variable) fragment for stabilization of the molecule, or the constant (C) domains are added to the V regions to generate a Fab fragment [fragment, antigen-binding]. Both scFv and Fab are widely used fragments that can be easily produced in prokaryotic hosts. Other antibody-like molecules include disulfide-bond stabilized scFv (ds-scFv), single chain Fab (scFab), as well as di- and multimeric antibody formats like dia-, tria- and tetra-bodies, or minibodies (miniAbs) that comprise different formats consisting of scFvs linked to oligomerization domains. The smallest fragments are VHH/VH of camelid heavy chain Abs as well as single domain Abs (sdAb). The building block that is most frequently used to create novel antibody formats is the single-chain variable (V)-domain antibody fragment (scFv), which comprises V domains from the heavy and light chain (VH and VL domain) linked by a peptide linker of ~15 amino acid residues. A peptibody or peptide-Fc fusion is yet another antibody-like molecule. The structure of a peptibody consists of a biologically active peptide grafted onto an Fc domain. Peptibodies are well-described in the art. See, e.g., Shimamoto et al., mAbs 4(5): 586-591 (2012). Other antibody-like molecules include a single chain antibody (SCA); a diabody; a triabody; a tetrabody; bispecific or trispecific antibodies, and the like. Bispecific antibodies can be divided into five major classes: BsIgG, appended IgG, BsAb fragments, bispecific fusion proteins and BsAb conjugates. See, e.g., Spiess et al., Molecular Immunology 67(2) Part A: 97-106 (2015). In exemplary aspects, the antibody-like molecule comprises any one of these antibody-like molecules (e.g., scFv, Fab VHH/VH, Fv fragment, ds-scFv, scFab, dimeric antibody, multimeric antibody (e.g., a diabody, triabody, tetrabody), miniAb, peptibody VHH/VH of camelid heavy chain antibody, sdAb, diabody; a triabody; a tetrabody; a bispecific or trispecific antibody, BsIgG, appended IgG, BsAb fragment, bispecific fusion protein, and BsAb conjugate).

As used herein, the term "inhibit" and words stemming therefrom may not be a 100% or complete inhibition or abrogation. Rather, there are varying degrees of inhibition of which one of ordinary skill in the art recognizes as having a potential benefit or therapeutic effect. The ICIs may inhibit the onset or re-occurrence of the disease or a symptom thereof to any amount or level. In exemplary embodiments, the inhibition provided by the methods is at least or about a 10% inhibition (e.g., at least or about a 20% inhibition, at least or about a 30% inhibition, at least or about a 40% inhibition, at least or about a 50% inhibition, at least or about a 60% inhibition, at least or about a 70% inhibition, at least or about a 80% inhibition, at least or about a 90% inhibition, at least or about a 95% inhibition, at least or about a 98% inhibition).

Sensitivity and ICI Resistant Tumors

As used herein "sensitivity" refers to the way a tumor reacts to a drug/compound, e.g., a ICI inhibitor (e.g., PD-L1 inhibitor). In exemplary aspects, "sensitivity" means "responsive to treatment" and the concepts of "sensitivity" and "responsiveness" are positively associated in that a tumor or cancer cell that is responsive to a drug/compound treatment is said to be sensitive to that drug. "Sensitivity" in exemplary instances is defined according to Pelikan, Edward, Glossary of Terms and Symbols used in Pharmacology (Pharmacology and Experimental Therapeutics Department Glossary at Boston University School of Medicine), as the ability of a population, an individual or a tissue, relative to the abilities of others, to respond in a qualitatively normal fashion to a particular drug dose. The smaller the dose required producing an effect, the more sensitive is the responding system. "Sensitivity" may be measured or described quantitatively in terms of the point of intersection of a dose-effect curve with the axis of abscissal values or a line parallel to it; such a point corresponds to the dose just required to produce a given degree of effect. In analogy to this, the "sensitivity" of a measuring system is defined as the lowest input (smallest dose) required producing a given degree of output (effect). In exemplary aspects, "sensitivity" is opposite to "resistant" and the concept of "resistance" is negatively associated with "sensitivity". For example, a tumor that is resistant to a drug treatment is neither sensitive nor responsive to that drug, and that drug is not an effective treatment for that tumor or cancer cell. The increase in sensitivity provided by the methods of the present disclosure may be at least or about a 1% to about a 10% increase (e.g., at least or about a 1% increase, at least or about a 2% increase, at least or about a 3% increase, at least or about a 4% increase, at least or about a 5% increase, at least or about a 6% increase, at least or about a 7% increase, at least or about a 8% increase, at least or about a 9% increase, at least or about a 9.5% increase, at least or about a 9.8% increase, at least or about a 10% increase) relative to a control. The increase in sensitivity provided by the methods of the present disclosure may be at least or about a 10% to greater than about a 95% increase (e.g., at least or about a 10% increase, at least or about a 20% increase, at least or about a 30% increase, at least or about a 40% increase, at least or about a 50% increase, at least or about a 60% increase, at least or about a 70% increase, at least or about a 80% increase, at least or about a 90% increase, at least or about a 95% increase, at least or about a 98% increase, at least or about a 100% increase) relative to a control. In exemplary aspects, the control is cancer or tumor or a subject or a population of subjects that was not treated with the presently disclosed pharmaceutical composition or wherein the subject or population of subjects was treated with a placebo.

Subjects

In exemplary aspects, the subject is a mammal, including, but not limited to, mammals of the order Rodentia, such as mice and hamsters, and mammals of the order Logomorpha, such as rabbits, mammals from the order Carnivora, including Felines (cats) and Canines (dogs), mammals from the order Artiodactyla, including Bovines (cows) and Swines (pigs) or of the order Perssodactyla, including Equines (horses). In some aspects, the mammals are of the order Primates, Ceboids, or Simoids (monkeys) or of the order Anthropoids (humans and apes). In some aspects, the mammal is a human. In some aspects, the human is an adult aged 18 years or older. In some aspects, the human is a child aged 17 years or less.

In exemplary aspects, the subject has a tumor which is resistant or insensitive to treatment with an ICI. In exemplary aspects, the tumor is a tumor of a cancer, e.g., any of these cancers described herein. The tumor may be selected from the group consisting of: a glioma, (including, but not limited to, a glioblastoma), a medulloblastoma, a diffuse intrinsic pontine glioma, or a peripheral tumor with metastatic infiltration into the central nervous system (e.g., melanoma or breast cancer).

Cancer

The cancer treatable by the methods disclosed herein may be any cancer, e.g., any malignant growth or tumor caused by abnormal and uncontrolled cell division that may spread to other parts of the body through the lymphatic system or the blood stream. In some embodiments, the cancer is a cancer in which an integrin and a G protein a subunit are expressed on the surface of the cells.

The cancer in some aspects is one selected from the group consisting of acute lymphocytic cancer, acute myeloid leukemia, alveolar rhabdomyosarcoma, bone cancer, brain cancer, breast cancer, cancer of the anus, anal canal, or anorectum, cancer of the eye, cancer of the intrahepatic bile duct, cancer of the joints, cancer of the neck, gallbladder, or pleura, cancer of the nose, nasal cavity, or middle ear, cancer of the oral cavity, cancer of the vulva, chronic lymphocytic leukemia, chronic myeloid cancer, colon cancer, esophageal cancer, cervical cancer, gastrointestinal carcinoid tumor, Hodgkin lymphoma, hypopharynx cancer, kidney cancer, larynx cancer, liver cancer, lung cancer, malignant mesothelioma, melanoma, multiple myeloma, nasopharynx cancer, non-Hodgkin lymphoma, ovarian cancer, pancreatic cancer, peritoneum, omentum, and mesentery cancer, pharynx cancer, prostate cancer, rectal cancer, renal cancer (e.g., renal cell carcinoma (RCC)), small intestine cancer, soft tissue cancer, stomach cancer, testicular cancer, thyroid cancer, ureter cancer, and urinary bladder cancer. In particular aspects, the cancer is selected from the group consisting of: head and neck, ovarian, cervical, bladder and oesophageal cancers, pancreatic, gastrointestinal cancer, gastric, breast, endometrial and colorectal cancers, hepatocellular carcinoma, glioblastoma, bladder, lung cancer, e.g., non-small cell lung cancer (NSCLC), bronchioloalveolar carcinoma.

Methods of Increasing Activated Plasmacytoid Dendritic Cells (pDCs)

The present disclosure also provides methods of increasing the number of activated plasmacytoid dendritic cells (pDCs) in a subject in need thereof. In exemplary embodiments, the method comprises administering to the subject a composition comprising a liposome comprising a cationic lipid and nucleic acid molecules, wherein the liposome is systemically administered to the subject. In certain instances, the pDCs are PD-L1+/CD86+ pDCs.

The composition and liposome may be any of those described herein. For example, the liposome may comprise DOTAP and the nucleic acid molecules may be a mixture of mRNA expressed by the tumor of the subject. In exemplary aspects, the composition comprising the liposome comprises a heterogeneous mixture of liposomes varied in size, though having a diameter within the range of 50 nm to about 250 nm optionally, about 70 nm to about 200 nm. In exemplary aspects, the liposomes have a zeta potential of about 30 mV to about 60 mV, optionally, about 40 mV to about 50 mV. In exemplary aspects, the nucleic acid molecules are complexed with the cationic lipid via electrostatic interactions. In some instances, in the nucleic acid molecules are RNA. In certain aspects, the liposomes are prepared by mixing RNA and the cationic lipid at a RNA:cationic lipid ratio of about 1 to about 10 to about 1 to about 20, optionally about 1 to about 15. In certain aspects, the composition comprises about 10 liposomes per mL to about $10^{15}$ liposomes per mL, optionally about $10^{12}$ nanoliposomes±10% per mL. In aspects, the composition is systemically administered via parenteral administration. In exemplary aspects, the composition is administered via injection or infusion. In exemplary instances, the composition is administered subcutaneously or intravenously or intramuscularly. In some aspects, the composition is administered intravenously. The subject may be any subject described herein. In some instances, the subject has an immune checkpoint inhibitor (ICI)-resistant tumor.

The presently disclosed methods of increasing activated pDCs in a subject are useful in settings relating to treatment with and preparation of dendritic cell (DC) vaccines. DC vaccines are reviewed in Pyzer et al., Hum Vaccin Immunother 10(11): 3125-3131 (2014). In exemplary aspects, the presently disclosure methods of increasing activated pDCs in a subject can further comprise isolated the pDCs from the subject. Methods of obtaining pDCs from a subject are known in the art and include, for example, leukapheresis. The pDCs thus obtained from the subject may be cultured and primed for antigen presentation. Thus pDCs can be loaded with antigen, for example, by pulsing the cells with an antigenic peptide or with whole tumor cell as a source of antigen. Alternatively or additionally, the pDCs may be primed or activated by culturing with a fusion protein comprising prostatic acid phosphatase (PAP) and GM-CSF. The fusion protein may be the same as the one found in Provenge®. The pDCs once primed may then be administered to the subject from which they were obtained. In exemplary aspects, the pDCs are intradermally or subcutaneously administered to the subject.

Accordingly, the present disclosure also provides methods of treating a subject with a tumor or cancer. In exemplary aspects, the method comprises (i) increasing the number of activated plasmacytoid dendritic cells (pDCs) in the subject in accordance with the presently disclosed method of increasing activated pDCs, (ii) isolating white blood cells (WBCs) from the subject, (iii) isolating dendritic cells (DCs) from the WBCs, (iv) contacting the DCs with a fusion protein comprising prostatic acid phosphatase (PAP) and GM-CSF, and (v) administering the DCs to subject. The present disclosure also provides methods of preparing a dendritic cell vaccine. In exemplary aspects, the method comprises (i) increasing the number of activated plasmacytoid dendritic cells (pDCs) in the subject in accordance with the presently disclosed method of increasing activated pDCs, (ii) isolating white blood cells (WBCs) from the subject, (iii) isolating dendritic cells (DCs) from the WBCs, and (iv) contacting the DCs with a fusion protein comprising prostatic acid phosphatase (PAP) and GM-CSF. In exemplary aspects, the DCs are genetically engineered to express a protein. The protein in some aspects is a tumor antigen. In alternative aspects, the protein is an antigen-presenting molecules, e.g., MHC, fused to a peptide. The WBCs may be isolated by known techniques, including, for example, leukapheresis. Isolation of DCs from WBCs may accomplished through methods known in the art, such as, e.g., fluorescence activated cell sorting (FACS). As used herein, the term prostatic acid phosphatase or PAP refers to a glycoprotein synthesized by the prostate gland and functions as an acid phosphatase, which hydrolyzes phosphate esters in acidic medium. PAP was identified more than 50 years ago as a marker for prostate cancer.

The invention, thus generally described, will be understood more readily by reference to the following example, which is provided by way of illustration and is not intended to limit the invention.

EXAMPLES

Example 1

This example describes the materials and methods used in the experiments described in Example 2.

Experimental Design: Since systemic delivery of RNA-nanoparticles (NPs) has been previously shown to induce activation of APCs, we sought to: 1) assess these cells for expression of regulatory checkpoint ligands; 2) explore the functional capacity of these cells in vitro and in vivo; 3) elucidate immunologic and anti-tumor effects of combination therapy with RNA-NPs and ICIs; 4) identify mechanistic interactions from RNA-NPs and ICIs; and 5) model these effects in a spontaneous large animal canine model. Mice were controlled for age and sex across experiments. Tumor-bearing mice were randomized prior to receiving interventional treatments. Timing of treatments and endpoints were determined based on pre-specified conditions. Animals were vaccinated within 48 hrs of post-tumor implantation to mimic treatment effects of a minimal residual disease state. For analysis of APCs, mice were euthanized within 24 hrs to assess activating effects of RNA-NPs. For analysis of immunologic T cell responses, animals were euthanized after 7-12 days following the last RNA-NP vaccine to allow for T cell priming and trafficking. Animals reaching humane endpoints (i.e. tumor volume size, tumor ulceration) prior to meeting a pre-specified condition were euthanized.

Isolation of RNA. RNA was isolated as previously described[16]. Briefly, total tumor derived RNA from tumor cells (B16F0, B16-F10, LLC, KR158-luc) was isolated from commercially available RNeasy mini kits (Qiagen) per manufacturer's instructions. To generate model RNA templates (GFP, and OVA) for in vitro transcription (IVT), plasmids were linearized and purified with Qiagen PCR MiniElute kit before linearized DNA was transcribed using mMessenger RNA IVT kit (Life technologies, Invitrogen). Final RNA product was cleaned up using RNA Maxi kits (Qiagen).

Cre mRNA (and in some experiments, GFP, luciferase, and OVA-mRNA) was purchased from Trilink Biotechnologies. For generation of personalized mRNA, total RNA was isolated from RNeasy kits (Qiagen), and cDNA libraries were generated by RT-PCR. Using a SMARTScribe Reverse Transcriptase kit (Takara), a reverse transcriptase reaction by PCR was performed on the total tumor RNA in order to generate cDNA libraries. The resulting cDNA was then amplified using Takara Advantage 2 Polymerase mix with T7/SMART and CDS III primers, with the total number of amplification cycles determined by gel electrophoresis. Purification of the cDNA was performed using a Qiagen PCR purification kit per manufacturer's instructions. In order to isolate sufficient mRNA for use in each RNA-nanoparticle vaccine, mMESAGE mMACHINE (Invitrogen) kits with T7 enzyme mix were used to perform overnight in vitro transcription on the cDNA libraries. The resulting mRNA was then purified with a Qiagen RNeasy Maxi kit to obtain the final mRNA product.

Nanoparticles. Nanoparticles were generated as previously described[16]. The cationic lipid DOTAP (powder form) was acquired from Avanti, Polar Lipids Inc. (Alabaster, AL, USA). For preparation, chloroform was added to re-suspend 25-100 mg; chloroform was evaporated off until a thin lipid layer remained. The mixture was re-suspended in 5-20 mL of PBS before being placed in 50° C. water bath for 1-2 hours with intermittent vortexing. Within twenty-four hours, 5-20 mL of PBS was added to the mixture, vortexed and placed in a bath sonicator for 5 minutes before passage through a 0.43 µm and a 0.22 µm syringe filter (PALL Acrodisc syringe filter with Supor membrane). The final NP solution (2.5 g/L) was based on pre-filtration DOTAP concentration (2.5 g/L).

RNA-NP complex preparation. RNA-NPs complexes were prepared as previously described[16]. In vivo: 25 µg of RNA were added to 375 µg of DOTAP (per mouse) in PBS buffer; 200 µL of the RNA-NPs were injected into the tail vein of C57Bl/6 mice. In vitro: 1.67 µg of RNA were added to 25 µg of DOTAP (per $1 \times 10^5$ cells) in PBS buffer. In both cases, the mixture was kept at room temperature (~15-20 minutes) to facilitate complex formation. For studies tracking particle localization, RNA was labelled with Arcturus Turbo Labelling Kit (Thermo Fisher Scientific) before complexation with nanoparticles.

Canine mRNA-NPs. After consent was obtained from the canine's owner, a study-enrolled dog with spontaneously occurring high-grade glioma underwent CT guided core needle biopsy under sedation per UFIACUC #201609430. The total tumor RNA from this biopsy was extracted using a Qiagen RNeasy minikit per manufacturer's instructions and manufactured into a personalized mRNA product as indicated above. Personalized tumor mRNA (0.05 mg/kg) was encapsulated into DOTAP nanoliposomes (0.75 mg/kg) and administered once weekly for 3 weeks. Blood was sequentially drawn for analysis of hematology, serum chemistry, and immunologic response.

ζ Potential and Concentration of Nanoparticles. A Brookhaven ZetaPlus instrument (Brookhaven Instruments Corporation, Holtsville, NY) was used to measure nanoparticle ζ potential by phase analysis light scattering (or PALS), using Smoluchowski model, 5 runs per sample, and 25 cycles per run. A Malvern Panalytical NanoSight NS300 instrument (Malvern Panalytical Ltd., Malvern, UK) was used to calculate particle concentration, using 5 acquisitions per sample and 60 s per acquisition.

Electron Microscopy: DC2.4s were grown on a sterilized Aclar sheet before transfection with RNA-NPs. Within 24 hrs, Aclar sheets were removed from culture, washed and fixed in a mix of 3% paraformaldehyde and 2% glutaraldehyde in 0.1M phosphate buffer for 1 hr. Cells were washed, post-fixed in 1% osmium, dehydrated in ethanol and embedded in resin. Ultrathin sections (70 nm) stained with uranyl acetate and lead citrate were analyzed using a Hitachi H-7600 transmission electron microscope at 80 kV.

Mice: C57BL/6 mice, and B6-GFP mice and OT-I transgenic mice on the C57BL/6 background were purchased from Jackson Laboratories. Animal procedures were approved by the Institutional Animal Care and Use Committee at the University of Florida.

OT-I Transfer: In some experiments, mice receiving OVA RNA-NPs were 'spiked' with a responder T cell population from OT-I transgenic mice (C57Bl/6-Tg(TcraTcrb) 1100Mjb/J, Jackson Laboratory) containing transgenic T cell receptors recognizing OVA peptide epitopes 257-264. Spleens were harvested from OT-I transgenic mice, and underwent RBC lysis before transfer of $0.5-1 \times 10^7$ cells.

Co-culture assays: Cells were harvested from spleens or tumors of RNA-NP treated mice, stained and sorted through a BD Aria II cell sorter into a 50-100% FBS solution. These cells were then cultured with antigen specific T cells for 48 hours at a ratio of 40,000 APCs:400,000 T cells in a 96 well plate.

Pp65 Re-stimulation assay and ELISAs: Splenocytes from mice vaccinated with RNA-NPs were re-suspended in T cell media with IL-2 (1 microgram/mL) at a concentration of $4 \times 10^6$ per mL and were co-cultured with 1 microgram (per peptide) of overlapping pp65 peptide mix (JPT Peptides) for 48 hrs. Soups were harvested at 48 hrs for assessment of interferon-γ by ELISA (ebioscience). Interferon-α detection from serum was also performed via ELISA in mouse (ebioscience) and canine (neoscientific).

CFA vaccination: Complete Freund's Adjuvant (CFA) was emulsified with an equal volume of 100 µg OVA class I peptide (SIINFEKL; American Peptide Company, Inc., CA) in 10% DMSO and administered intradermally (100 µl/mouse).

Dendritic cells and T cells: T cells were ex vivo expanded and activated based on previously published methods[23]. Bone marrow was harvested from naive C57Bl/6 mice and dendritic cells were matured, electroporated, and activated ex vivo based on previously published methods[23]. Human DCs were matured from source donor white blood cells from LifeSouth Community Blood Center (Gainesville, FL) and cultured in AIM V (2% HABS) with GM-CSF and IL-4.

Flow cytometric analysis: Organs (i.e. spleen, liver, bone marrow, lymph nodes) or subcutaneous tumors were harvested from mice within 24 hrs of RNA-NPs injection. Prior to FACS sorting, intracranial tumors were harvested from mice 17 days after treatment with RNA-NPs, washed with PBS and digested in collagenase for 30 minutes at 37 C before staining. Peripheral organs underwent RBC lysis before being washed and stained for surface expression (i.e. CD45, CD11c, CD86, MHC-I, MHCII, F4/80, PDCA-1, CD4, CD8, PD-1 and PD-L1 (Affymetrix, BDBioscience and Biolegend); LIVE/DEAD fixable near IR dead cell stain kit (Invitrogen)). PD-L1 detecting antibody (clone: MIH5) was distinct from PD-L1 blocking antibody (clone: 10F.9G2). Counting beads (Life Technologies) were added to samples to assess absolute counts. Afterwards the cells were sorted with a BD Aria II FACS sorter or fixed and analyzed using a BD Bioscience FACS Calibur, Canto or LSR II.

Immunofluorescence: Organs were suspended overnight in 4% buffered paraformaldehyde solution at 4° C. Tissues were washed with PBS before overnight immersion in 15% sucrose at 4° C., followed by overnight immersion in 30% sucrose at 4° C. Tissues were then embedded in Tissue-Tek OCT (Electron Microscopy Sciences, Hatfield, PA, USA), frozen and stored at −80° C. until sectioning. Sections of 20 µm-thickness were cut on a Leica CM1850 Cryostat (Leica Microsystems, Wetzlar, Germany) and stored at −20° C. until immunohistochemistry (IHC) processing. Immunofluorescence staining was performed as follows: incubation with 1% normal goat serum (NGS) (cat. 01-6201, ThermoFisher Scientific, Waltham, MA, USA) in PBS for 1 hour at room temperature (RT); overnight incubation (4° C.) in 1% NGS and PBS with the primary antibodies:rat anti-PD-L1 (clone MIH6, 1:1000 dilution, cat. ab80276, Abcam, Cambridge, United Kingdom), Armenian hamster anti-mouse CD11c (clone N418, 1:1000 dilution, cat. 14-0114-82, ThermoFisher Scientific). Subsequently, samples were washed (×3) with PBS before incubation (diluted 1:500 for 2 hours at RT) with secondary antibodies:Alexa Fluor 488 goat anti-rat (ThermoFisher Scientific), Alexa Fluor 647 goat anti-hamster (ThermoFisher Scientific). Samples were incubated with 4,6-Diamidino-2-phenylindole dihydrochloride (or DAPI, Sigma Aldrich, St. Louis, MO, USA) for 10 minutes before being washed (×3) with PBS and mounted with Mowiol 4-88 (Sigma Aldrich). Sections were evaluated using an Olympus DSU-IX81 confocal microscope (Olympus, Tokyo, Japan).

Hematology Analysis. Blood was obtained from mice and submitted for comprehensive chemistry and CBC analysis (cat. 61331, IDEXX, North Grafton, MA). EDTA-anticoagulated whole blood samples were analyzed using a flow-based Sysmex XT-2000iV Automated Hemotology Analyzer (Sysmex, Kobe, Japan).

Hematoxylin and Eosin (H&E) Histochemistry. Mouse organs were collected and immersed in 10% formalin-buffered solution overnight at RT. Samples were paraffin processed by a Tissue Tek VIP automatic tissue processor (Sakura Finetek, Torrance, CAm), sectioned at 4 m using a Microm microtome, placed in Superfrost Plus glass slides and H&E (hematoxylin and eosin) stained by UF Molecular Pathology Core (UF, Gainesville, FL). Slides were analyzed by a trained in-house pathologist and by HistoWiz (Histopathology Site, HistoWiz Inc.).

Tumor cells: Tumor cell lines B16-F10, B16F10-OVA, and KR158B-luc were obtained as previously described[16]. B16F0 and LLC were purchased from ATCC. CT-2A tumors were originally generated as previously described[25] and maintained in culture. Culture media utilized to grow tumor cells consisted of DMEM with sodium pyruvate (KR158B-luc and CT-2A were was grown without sodium pyruvate), supplemented with 10% fetal bovine serum (FBS), and 5.5 mL penicillin/streptomycin. Cells were cultured in a 37° C. incubator (5% $CO_2$ levels).

Tumor Implantations. Tumor cells were harvested with trypsin (Gibco) and washed in serum-containing media, before being washed in phosphate-buffered saline (PBS). For subcutaneous tumors, cell pellets were resuspended in the appropriate PBS concentration; viable tumor cells as determined by differential trypan blue dye uptake were counted. Tumors were injected subcutaneously in the flank of C57Bl/6 mice anesthetized with isoflurane. Tumor volumes were measured using calipers assessing the greatest longitudinal (length) and transverse (width) diameters and calculated by the modified ellipsoidal formula (0.5(length× width$^2$)).[26] Mice that did not develop non-OVA transfected B16 tumors were removed from analysis across all experimental groups. Animals were sacrificed for significant tumor ulcerations, or when the tumor grew larger than 2 cm in any one dimension. Animals reaching humane endpoints were dropped/removed from analysis of tumor-volume measurements at subsequent time-points.

Intracranial Tumors. Cell pellets were resuspended in a mixture of PBS:methyl cellulose mixture (at a 1:1 ratio) at 4 million cells/mL before stereotactic intracranial implantation (3 mm deep into the brain at a site 2 mm to the right of the bregma).

Monoclonal antibodies: Interferon-α blocking monoclonal antibodies against the IFNAR1 receptor (clone: MAR1-5A3) were purchased from BioXcell and 250-500 ug (loading dose 500 ug followed by 250 ug twice weekly) were administered in the peritoneum. Anti-PD-L1 (clone: 10F.9G2) and anti-PD-1 monoclonal antibodies (clone: RMP1-14) were purchased from BioXcell and 200-400 μg/dose (loading dose 400 ug followed by 200 ug twice weekly) was administered in the peritoneum of C57Bl/6 mice. PDCA-1 depleting mAbs (clone: 120G8.04) were purchased from Novus Biologicals and 200-250 ug was administered in the peritoneum of C57Bl/6 mice (1 day before RNA-NP administration).

Statistical Analysis: Mann Whitney nonparametric tests were typically used to analyze data from in vivo experiments; however, in experiments with three animals per group, student-t tests were used for analysis of closely clustered data points. Unless otherwise specified in figure legends, mean values in figures were plotted with standard deviations (s.d.). Mann-Whitney tests were used to determine statistical significance between group means from subcutaneous tumor growth volumes; tumor volumes were plotted with standard error of the mean (s.e.m.). Survival data from our murine tumor efficacy studies were analyzed by the Gehan-Breslow-Wilcoxon test. In all experiments, statistical significance was set at the level of $p<0.05$. Sample sizes are included in figure legends. Data analyses were conducted in GraphPad Prism.

Example 2

This example describes that personalized tumor mRNA loaded lipid nanoparticles prime the systemic and intratumoral milieu for response to cancer immunotherapy.

Translation of nanoparticles (NPs) into human clinical trials for patients with refractory cancers have lagged due to unknown biologic reactivities of novel NP designs. To overcome these limitations, simple well-characterized mRNA lipid-NPs have been developed as cancer immunotherapeutic vaccines. While the preponderance of RNA lipid-NPs encoding for tumor-associated antigens or neoepitopes have been designed to target lymphoid organs, they remain encumbered by the profound intratumoral and systemic immunosuppression that may stymie an activated T cell response.

To develop the use of NPs, we sought to assess if systemic localization of untargeted tumor mRNA lipid-NPs (derived from whole transcriptome) (e.g., RNA derived from whole transcriptome encapsulated in lipid nanoparticles) with excess positive charge could prime the peripheral and intratumoral milieu for response to immunotherapy. We developed a personalized RNA-nanoliposomal (tumor derived mRNA complexed into cationic DOTAP nanoliposomes) immunomodulating vaccine with strongly positive zeta potentials for diffuse in vivo localization and enhanced transfection efficiency. (Supporting Information, FIG. 14). From as few as 100-500 cells, we can manufacture personalized RNA-NP (e.g., mRNA-NP) vaccines for patients soon after tumor biopsy. We hypothesized that systemic administration of these personalized mRNA-NPs would prime the peripheral and intratumoral microenvironments with PD-L1+ host-myeloid cells sensitizing immunologically 'cold' tumors for immunotherapeutic response.

Figure 1A:
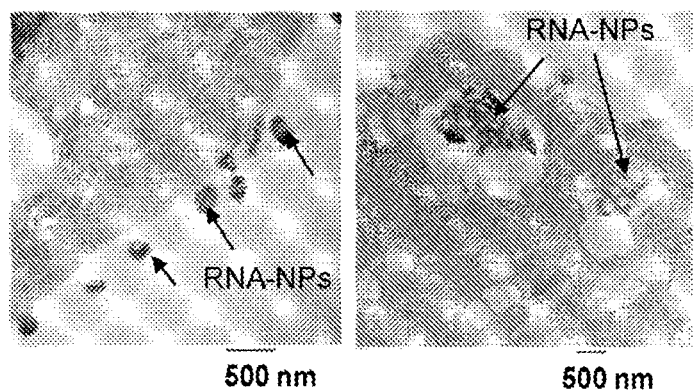
FIG. 1 demonstrates RNA-NPs mediate increased PD-L1 upon activation of myeloid APCs. (A) A cell line of DC2.4s were transfected with RNA-NPs. Cells were harvested within 24 hrs and imaged by TEM. (B) DC2.4 were left untransfected or transfected with NPs alone or GFP RNA-NPs. Cells were harvested within 24 hrs and assessed for surface expression of PD-L1 (**p<0.01, unpaired t test). (C) Peripheral blood mononuclear cells from a donor leukapheresis were ex vivo matured into DCs and left untransfected or transfected with NPs alone or pp65 RNA-NPs and assessed for surface expression of PD-L1 (*p<0.05, unpaired t test). (D-E) Three different batches of nanoliposomes were generated and assessed for concentration and zeta potential over time with serial measurements. (F) Cre encoding mRNA-NPs were administered to transgenic mice with a Cre reporter allele that is loxP-flanked with a STOP cassette preventing Tdtomato transcription and lungs, hearts, livers, spleen and lymph nodes were harvested within twenty-four hours and analyzed for tdtomato expression by immunofluorescent chemistry. (G) FACS plots are displayed for PD-L1 (PE) and CD86 (APC) expression on CD11c+ splenocytes. (H-I) NPs were complexed with OVA mRNA and injected i.v. into C57Bl/6 mice (n=3-4/group) bearing subcutaneous B16-F10 tumors. Spleens, livers, lymph nodes and bone marrow were harvested within 24 hrs for assessment of CD11c cells expressing CD86/PD-L1 (**p<0.0001,p<0.01, unpaired t test). (J) Gating strategy for CD45+ intratumoral and CD45− tumor cells: cells are gated by forward and side scatter (left panel); amongst these, live cells are selected based on live/dead exclusion (middle panel) and CD45+ live cells (top) or CD45− live cells (bottom) are selected for analysis (right panel). (K) FACS plots for PD-L1+CD86+ intratumoral cells are shown from mice receiving either NPs alone (left) or RNA-NPs (right). (L-N) Within 3 weeks of subcutaneous B16-F10 tumor cell (500,000 cells) implantation, RNA-NPs were complexed with OVA mRNA and injected i.v. into C57Bl/6 mice (n=3/group); tumors were harvested within 24 hrs for flow cytometric analysis of CD11c, MHC-I, CD45, CD86 and PD-L1 expression (***p<0.01, *p<0.05, unpaired t test).
Figure 1B:
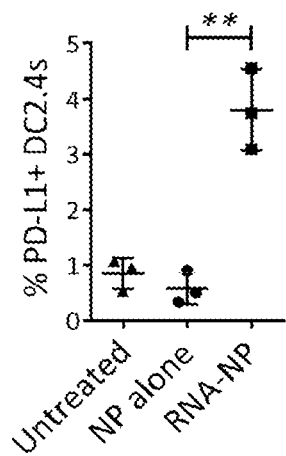
Figure 1C:
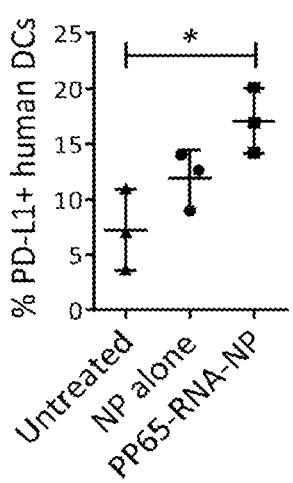
Figure 1D:
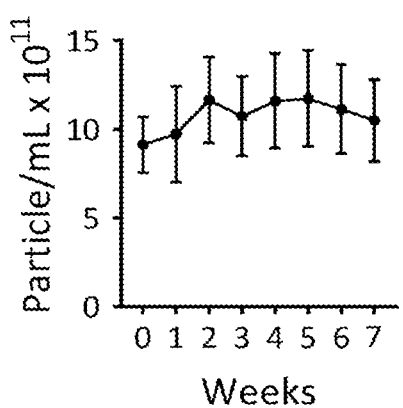
Figure 1E:
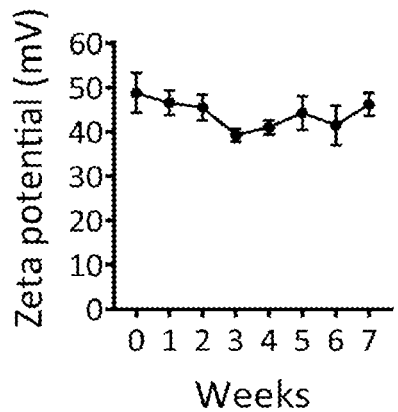
Figure 1F:
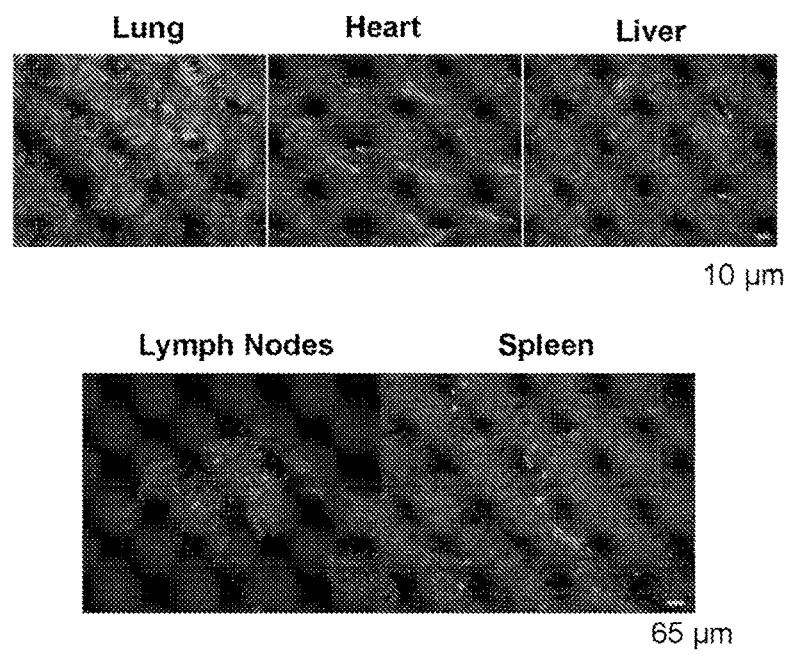
Figure 1G:
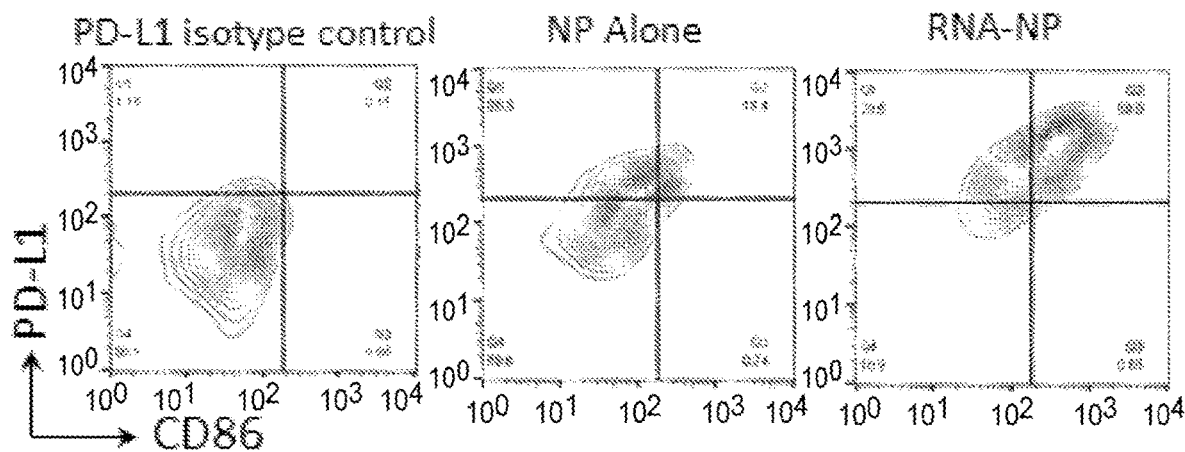
Figure 1H:
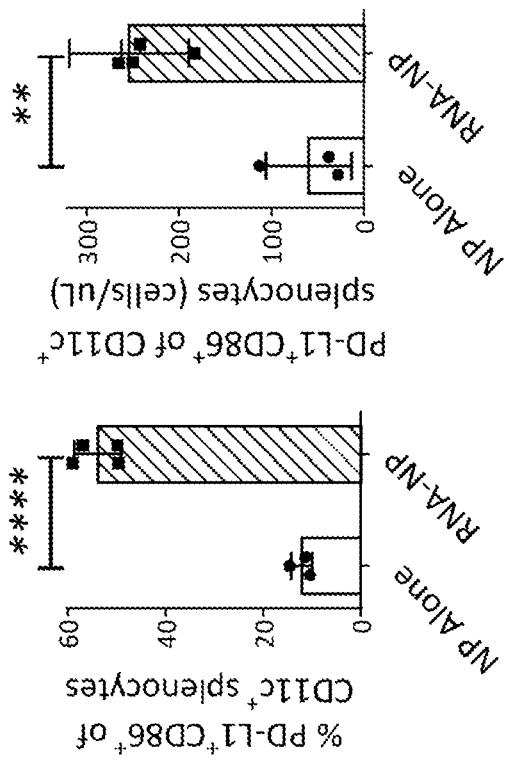
Figure 1I:
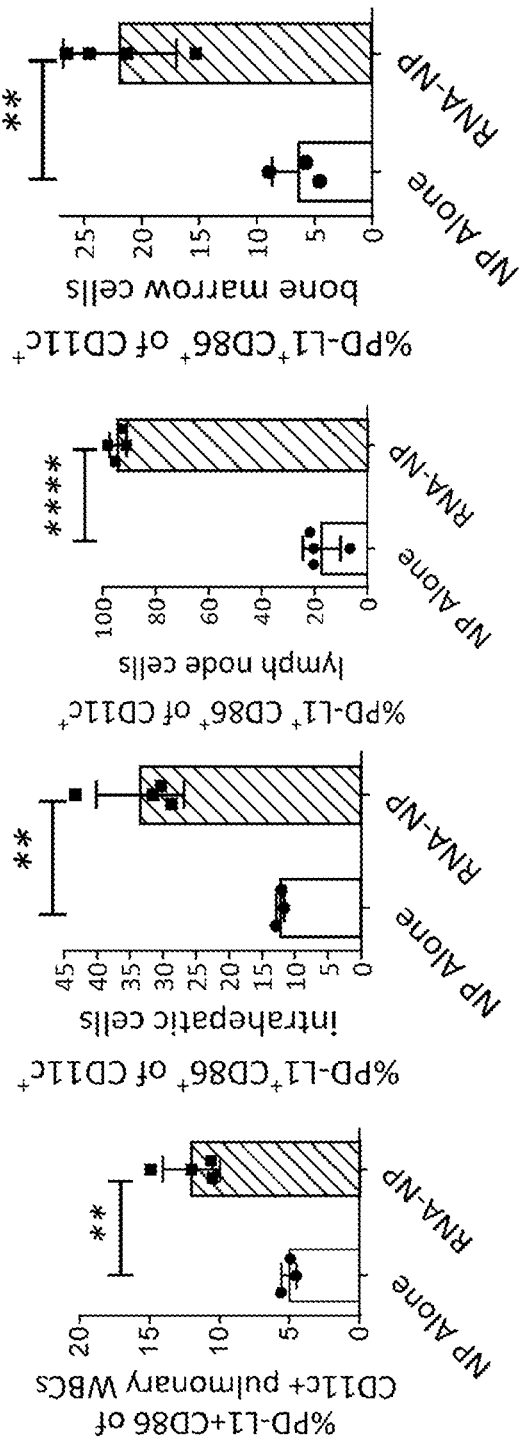
Figure 7A:
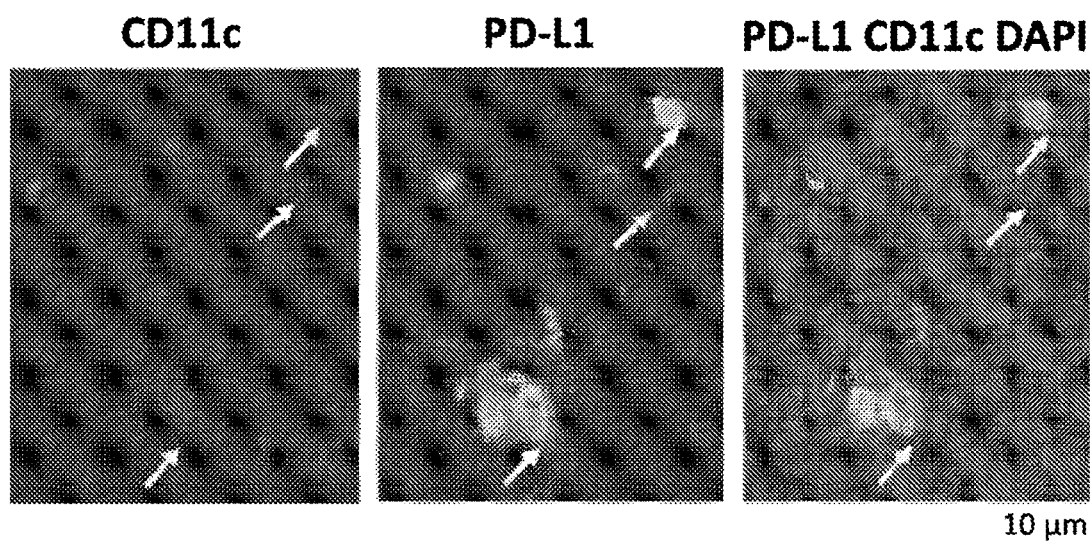
Figure 7B:
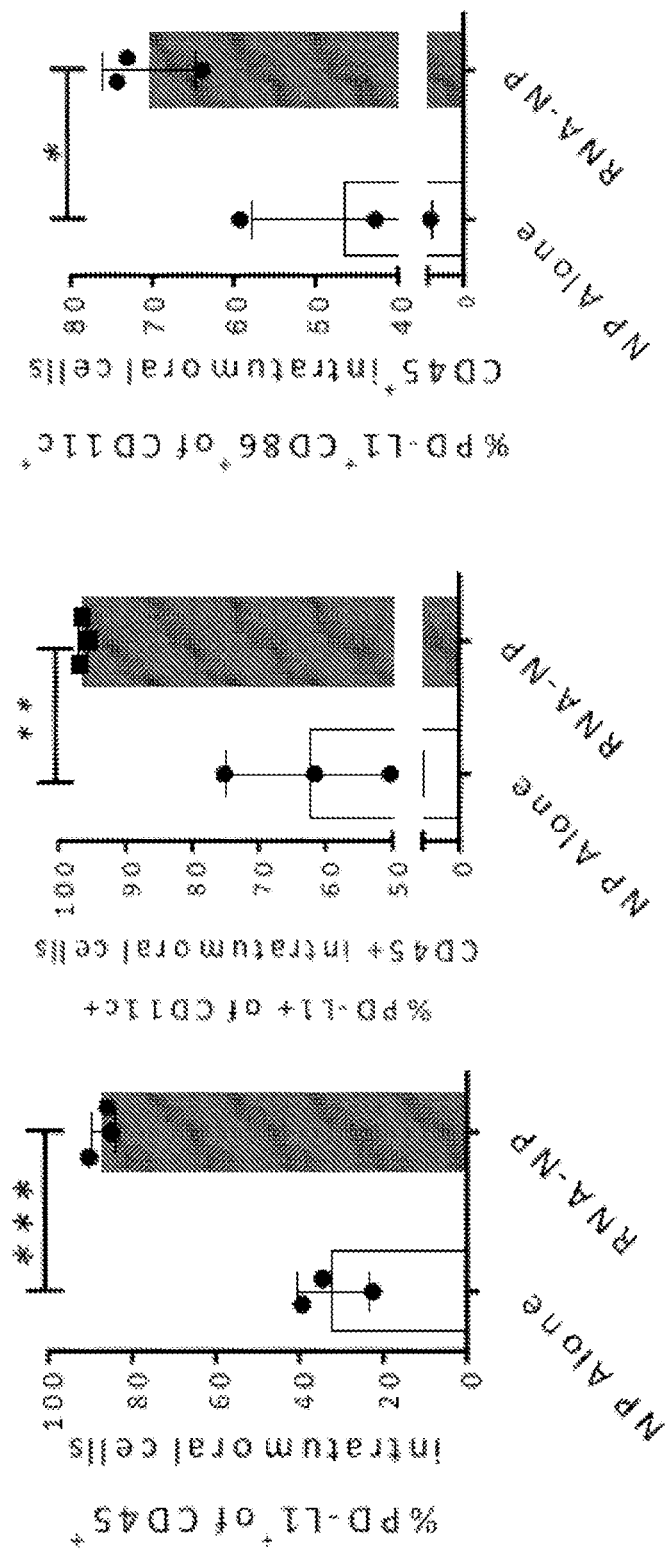
Figure 8A:
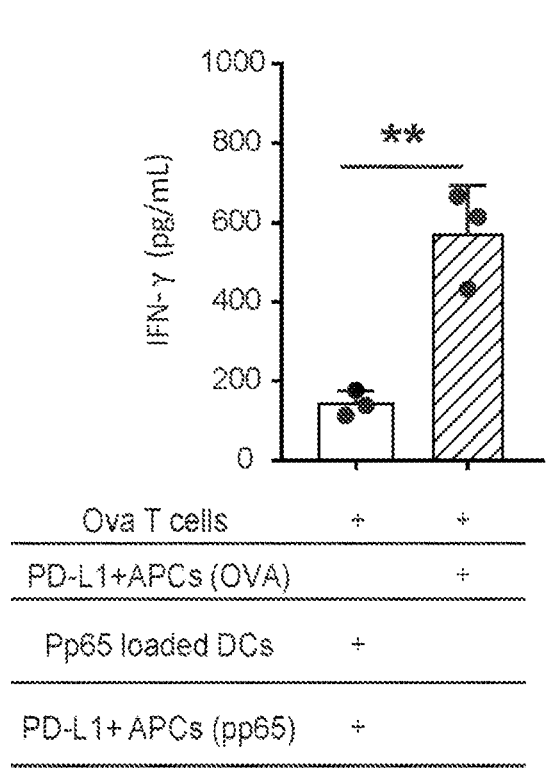

We have previously shown that tumor RNA encapsulated into lipid DOTAP NPs of heterogenous sizes (70-200 nm) can be used in place of dendritic cell vaccines.[16] We sought to visualize RNA-NP transfected dendritic cells (DCs) in vitro by transmission electron microscopy (TEM) and assessed PD-L1 expression post-transfection by flow cytometry. RNA-NPs were visualized outside and inside DCs (after internalization) (FIG. 1A, FIG. 15). Compared to cells treated with NPs alone, GFP RNA-NPs induced a four-fold increase in PD-L1 expression (FIG. 1B). This was confirmed on primary human DCs (FIG. 1C), matured ex vivo from source donor white blood cells, before in vitro transfection with RNA-NPs. These RNA-NPs were composed in excess of positively charged DOTAP liposomes at a concentration of 10$^{12}$ particles/mL (FIG. 1D) with zeta potentials of 40-50 mV (FIG. 1E) (at a ratio of 15 µg liposome to 1 µg of mRNA). Unlike anionic RNA-NPs with an excess of RNA for enhanced localization to the spleen[13], these cationic RNA-NPs (with an excess of positively charged particles) localize nonspecifically to lung, heart, liver, and lymphoid organs (FIG. 1F). We then assessed the effects of RNA-NPs on PD-L1+ activated myeloid cell expression throughout these organs. We vaccinated C57Bl/6 mice with i.v. RNA-NPs; spleens were harvested the next day for assessment of PD-L1 expression. We observed increased co-expression of CD11c and PD-L1 by immunofluorescent microscopy (FIG. 6A). We then confirmed and quantitated these results by flow cytometry. Compared to ovalbumin (OVA) expressing RNA or NPs alone, RNA-NPs elicited a greater than two-fold increase in the percentage of CD11c+ splenocytes expressing PD-L1 (FIG. 1G). We uncovered that the increase in PD-L1 rose concomitantly with prototypical activation markers (i.e. CD86). In animals receiving RNA-NPs, there was a ~four to five-fold increase in the percentage and ~2-fold increase in the absolute number of CD11c+ splenocytes expressing both PD-L1 and CD86 (FIG. 1H). To determine if the activated splenic phenotype (mediated by RNA-NPs) was present elsewhere, we analyzed CD11c+ cells from lungs, livers, lymph nodes and bone marrow of C57Bl/6 mice (within 24 hrs of RNA-NPs). Compared to animals receiving NPs alone, mice receiving OVA RNA-NPs had a ~two-fold increase in PD-L1/CD86 on CD11c+ pulmonary cells, a ~three-fold increase on CD11c+ intrahepatic cells, a ~four-fold increase on CD11c+ lymph node cells and a greater than ~two-fold increase on CD11c+ bone marrow derived cells (FIG. 1I). We then assessed if RNA-NPs could activate myeloid cells in the intratumoral microenvironment. In C57Bl/6 mice bearing established intracranial KR158-luc, RNA-NPs mediated increased co-localization of intratumoral PD-L1 and CD11c expression by immunofluorescent microscopy (FIG. 7A). We then evaluated if these intratumoral changes were present in immunologically 'cold' B16-F10 tumors.[17] We implanted C57Bl/6 mice with flank B16-F10 tumors and evaluated intratumoral cells post-vaccination for expression of PD-L1, CD86, and MHC class expression. We administered OVA RNA-NPs intravenously to animals bearing subcutaneous melanoma, and the next day, harvested tumors for analysis of CD45+ and CD45+CD11c+ cells (after RBC lysis and live/dead exclusion FIG. 1J). There was a ~three-fold increase in PD-L1/CD86 on CD45+ intratumoral cells (FIG. 1K-L), a ~50% increase in PD-L1/CD86 on CD11c+ intratumoral cells (FIG. 7B), and a ~50% increase in MHC-I expression (by mean fluorescence intensity (MFI)) on CD45+ intratumoral cells (FIG. 1M). Interestingly, after RNA-NPs, there was no change in PD-L1 expression on CD45− tumor cells (FIG. 1N) demonstrating these effects are enriched amongst CD45+ and specifically CD11c+ tumor infiltrating cells.

Figure 2A:
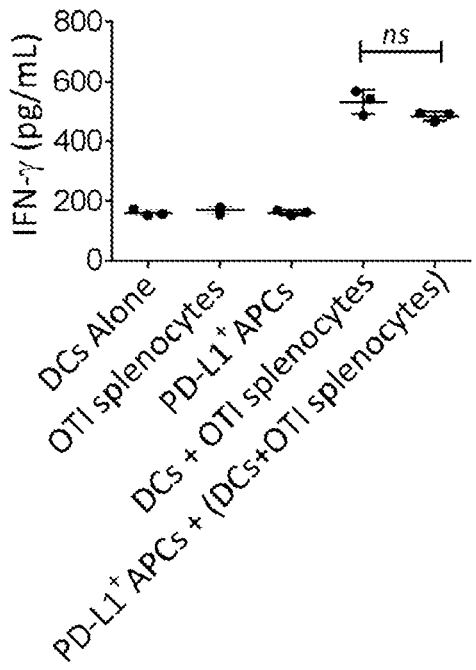
FIG. 2 demonstrates PD-L1+ APCs do not suppress, but mediate induction of antigen specific T cell immunity. (A-B) OVA RNA-NPs were injected into C57Bl/6 mice and spleens were harvested within 24 hrs; spleens were FACS sorted for CD11c+MHCII+CD86+PD-L1+ cells (40,000 cells) which were added to a standard co-culture assay (3 replicates/group) of primary bone marrow derived DCs (40,000 cells) and OT-I derived splenocytes (400,000 cells) followed by serum assessment of interferon-γ by ELISA (*p<0.05, unpaired t test). (C) OVA RNA-NPs were injected into five C57Bl/6 mice and spleens were harvested within 24 hrs; spleens were FACS sorted for CD11c+MHCII+CD86+ PD-L1+ cells which were adoptively transferred to naïve C57Bl/6 mice (n=5/group) 'spiked' with a responder T cell population from OT-I transgenic mice (1×10$^7$ OT-I splenocytes per mouse). (D-E) OVA RNA-NPs were injected into tumor bearing C57Bl/6 mice. Tumors were harvested within 3 weeks, FACS sorted for CD11c+MHCII+CD86+PD-L1+ cells (PD-L1+ APCs) or CD11c+MHCII+CD86+PDL1− cells (PD-L1− APCs) (40,000 cells) which were added to a standard co-culture assay (n=3 replicates/group) of primary bone marrow derived DCs (40,000 cells) and ex vivo activated T cells (400,000 cells). T cell activation was assessed by ELISA for IFN-γ production after 48 hours. (*p<0.05, **p<0.01, unpaired t test). PD-L1+ APCs=CD11c+MHCII+CD86+PD-L1+ splenocytes; DCs=OVA mRNA loaded DCs (murine BM derived); T cells=OVA specific T cells. (F-G) PD-L1 expression by flow cytometry from splenocytes of C57Bl/6 mice (n=3-5/group) vaccinated with i.v. GFP RNA-NPs, CFA-OVA peptide (administered i.d.), NPs alone or i.v. GFP RNA-NPs with anti-PD-L1 mAb or isotype mAb (administered i.p. 24 hrs prior to RNA-NPs) (*p<0.05, Mann-Whitney test). (H) C57Bl/6 mice (n=4-5/group) were vaccinated with pp65 RNA-NPs once weekly (×3) before spleens were harvested for analysis of interferon-γ by ELISAs (from soups of re-stimulated splenocytes with overlapping pp65 peptide pool) and by flow cytometric analysis of percent PD-1+ CD8+ cells (**p<0.01, Mann Whitney test). (I) B16F10-OVA (1,000,000 cells) was implanted subcutaneously in the flanks of C57Bl/6 mice (n=5-9/group), and PD-1 mAbs, PD-L1 mAbs, OVA RNA-NPs or OVA RNA-NP+ PD-L1 mAbs were administered (one day later). OVA RNA-NPs were injected i.v. once weekly (×3) and PD-1/PD-L1 mAbs were injected i.p. twice weekly (until last RNA-NP vaccine). Survival was plotted on a Kaplan-Meier curve (*p<0.05, **p<0.01, Gehan-Breslow-Wilcoxon test).
Figure 2B:
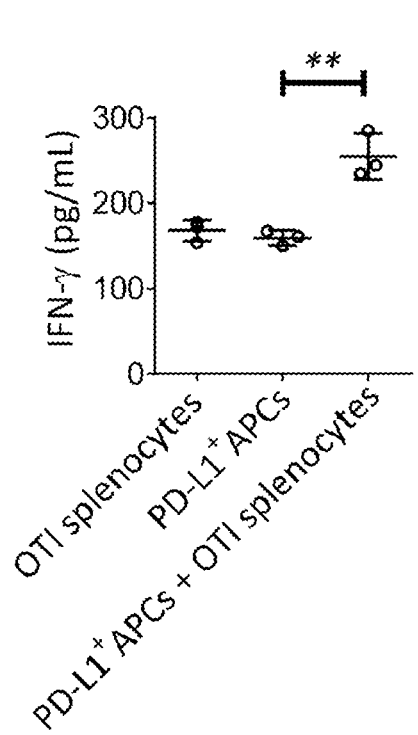
Figure 2C:
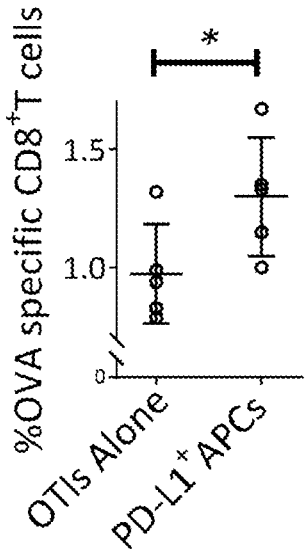
Figure 2F:
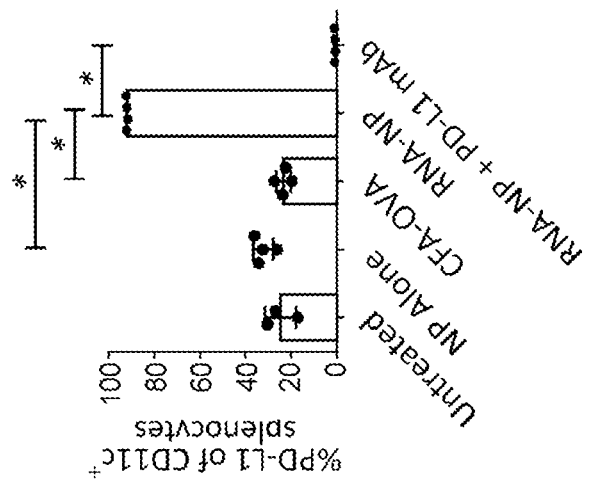
Figure 2E:
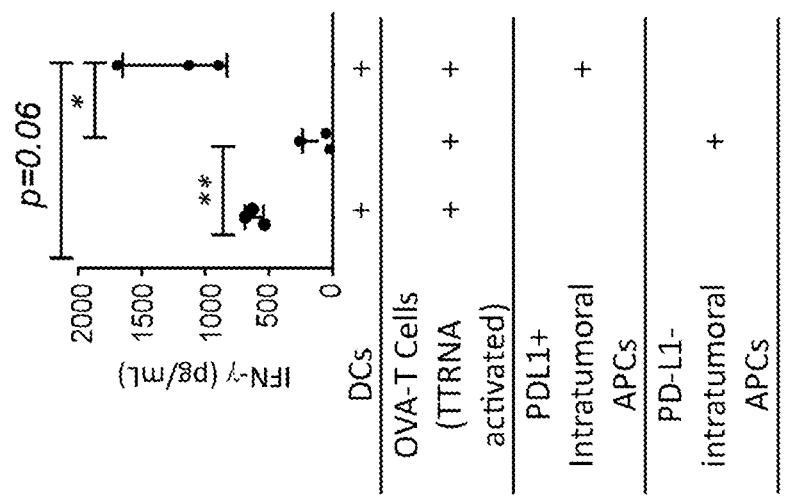
Figure 2D:
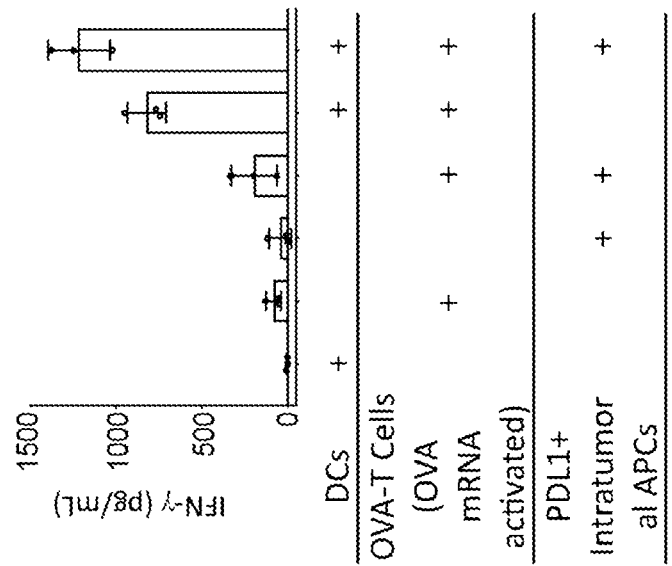
Figure 8B:
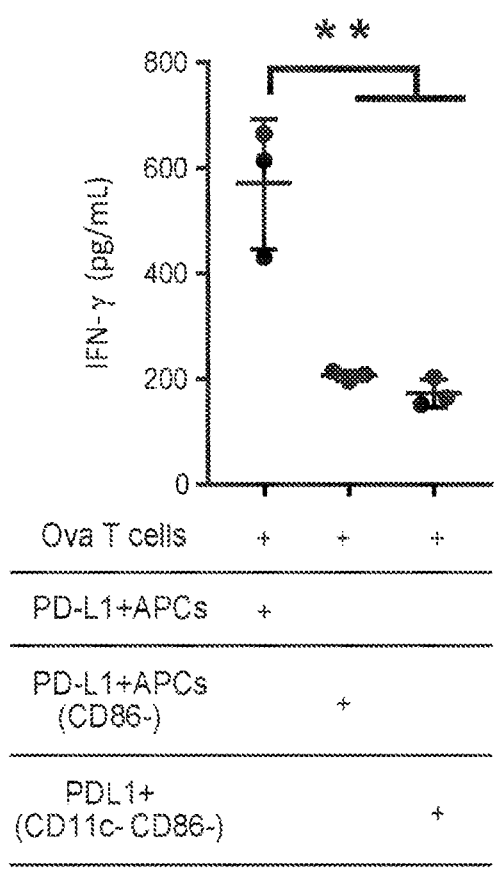

Although increased PD-L1 expression on parenchymal cells is expected to protect normal cells from inflammatory damage, PD-L1 upregulation on myeloid APCs may predispose a regulatory phenotype that confounds the effector phase of the immune response. To determine if the increase in PD-L1 correlated with a suppressor phenotype, we vaccinated naïve C57Bl/6 mice with OVA RNA-NPs, FACS sorted PD-L1+ myeloid APCs within 24 hrs (sorted by expression of PD-L1+, CD11c+, MHCII+, and CD86+) and co-cultured them in vitro with OVA-mRNA pulsed dendritic cells and splenocytes from OT-I transgenic mice. In a co-culture of DCs and OT-I splenocytes, addition of PD-L1+ APCs from mice vaccinated with OVA RNA-NPs did not suppress interferon-γ secretion (FIG. 2A), but rather, mediated increased interferon-γ when co-cultured alone with OT-I splenocytes (FIG. 2B). We show that these PD-L1+ APCs elicit interferon-γ production in an antigen specific manner (FIG. 8A) not achieved by PD-L1+ APCs negative for CD86 expression, or PD-L1+ cells negative for CD11c and CD86 expression (FIG. 8B). Next, we administered these PD-L1+ APCs (from mice vaccinated with OVA RNA-NPs) to naive mice receiving OT-I splenocytes and found a modestly increased percentage of OVA specific CD8+ splenocytes (FIG. 2C). In a separate experiment, we show that PD-L1+ APCs sorted from tumors of mice vaccinated with OVA-RNA-NPs lead to expansion of OVA specific CD8+ cells in the tumor and draining lymph nodes of recipient animals (FIG. 9). These intratumoral PD-L1+ APCs (sorted by expression of PD-L1+, CD11c+, MHCII+, and CD86+) could elicit similar effects to peripherally sorted PD-L1+ APCs. In an in vitro co-culture of OVA-mRNA pulsed dendritic cells and OVA specific T cells, in contrast to PD-L1 negative APCs, PD-L1+ intratumoral APCs (from mice bearing intracranial B16F10-OVA vaccinated with OVA RNA-NPs) did not suppress but enhanced interferon-γ release (FIG. 2D, E). Thus, while RNA-NPs increase systemic and intratumoral expression of PD-L1 on myeloid APCs upon activation, these cells do not suppress but enhance antigen specific T cell responses.

Since PD-L1 was markedly increased on activated CD11c+ myeloid cells, we assessed the effects of RNA-NPs and ICIs on anti-tumor immunity. To validate the activity of murine ICIs, GFP RNA-NPs were administered to naïve C57Bl/6 mice, with or without PD-L1 mAbs, and spleens were harvested the next day. RNA-NPs mediated an increase in PD-L1 on splenic (FIG. 2F) CD11c+ cells, which was not observed following vaccination with peptide vaccines in complete Freund's adjuvant (CFA); however, these effects could be abrogated in animals receiving concomitant PD-L1 mAbs, but not isotype mAbs (FIG. 2G). Next, we explored the immunologic effects of combination therapy; we vaccinated mice with pp65-loaded RNA-NPs once weekly (×3), harvested spleens one week after the last vaccine, and re-stimulated splenocytes with overlapping pp65 peptide pool for assessment of interferon-γ reactivity. While there were comparable levels of interferon-γ between RNA-NPs and RNA-NPs with PD-L1 mAbs, combination therapy elicited a greater than 2-fold increase in the percentage of CD8+ splenocytes expressing PD-1 (FIG. 2H). We then assessed the effects of combination therapy on anti-tumor efficacy. C57Bl/6 mice were implanted with subcutaneous B16F10-OVA and RNA-NPs were administered once weekly (×3). Compared with OVA RNA-NPs or PD-1/PD-L1 mAbs alone, animals receiving combination therapy with OVA RNA-NPs and PD-L1 mAbs had significantly prolonged median overall survival benefits (FIG. 2I). Monotherapy (with either PD-1/PD-L1 mAbs or RNA-NPs) was insufficient to produce long-term survivors, but combination therapy of RNA-NPs and PD-L1 mAbs mediated long-term survivorship in over 60% of the animals (FIG. 2I).

Figure 3A:
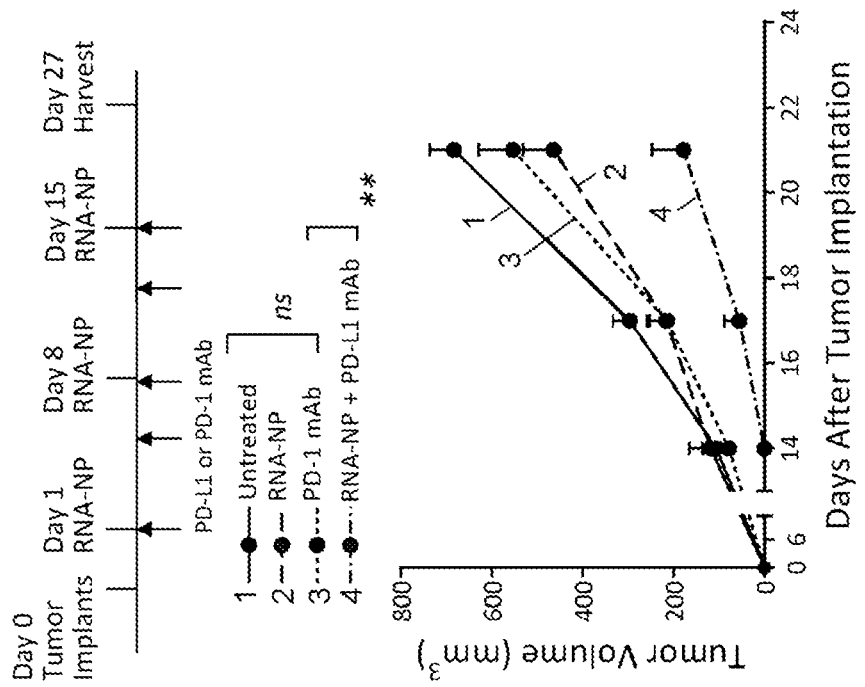
FIG. 3 demonstrates RNA-NPs sensitize poorly immunogenic murine tumor models to ICIs. (A) B16F0 melanomas (50,000 cells) were implanted in the flanks of C57Bl/6 (n=5-7/group), and one day later, PD-L1 mAbs, TTRNA-NPs or TTRNA-NP+PD-L1 mAbs were administered. TTRNA-NPs were injected i.v. once weekly (×3); PD-L1 mAbs were injected i.p. twice weekly (until last RNA-NP vaccine). Time point measurements of tumor volumes were plotted (Day 22 tumor volume: RNA-NP versus RNA-NP+ PD L1 mAb, *p<0.05, Mann-Whitney test). (B) B16F0 melanomas were implanted in the flanks of C57Bl/6 mice (n=5-7/group), and one day later, PD-1 mAbs, PD-L1 mAbs, TTRNA-NPs or TTRNA-NP with PD-L1 mAbs were administered. TTRNA-NPs were injected i.v. once weekly (×3); PD-1 and PD-L1 mAbs were injected i.p. twice weekly (until last RNA-NP vaccine). Early time point measurements of tumor volumes were plotted (Day 21 tumor volumes: PD-1 mAb versus RNA-NP+PD-L1 mAb, **p<0.01, Mann-Whitney test) and (C) on day 27, spleens were harvested for assessment of peripheral PD-1 expression, intratumoral CD45 and intratumoral CD4/8 expression. (*p<0.05, Mann Whitney test). (D) B16-F10 tumors (150,000 cells) were implanted in the flanks of C57Bl/6 (n=5), and one day later, PD-L1 mAbs, TTRNA-NPs or TTRNA-NP+PD-L1 mAbs were administered. TTRNA-NPs were injected i.v. once weekly (×3); PD-L1 mAbs were injected i.p. twice weekly (until last RNA-NP vaccine). Time point measurements of tumor volumes were plotted (*p<0.05, Mann-Whitney test, mean+/−s.e.m.). PD-L1 removed from analysis on days 14-16 after >50% of animals were euthanized. (E) LLC (300,000 cells) was implanted in the flanks of C57Bl/6 (n=7-8/group), and one day later, PD-L1 mAbs, TTRNA-NPs or TTRNA-NP+PD-L1 mAbs were administered. TTRNA-NPs were injected i.v. once weekly (×3); PD-L1 mAbs were injected i.p. twice weekly (until last RNA-NP vaccine). Spleens and tumors were harvested on Day 20 for assessment of PD-1 and CD8 expression (*p<0.05, **p<0.01, Mann Whitney test).
Figure 3B:
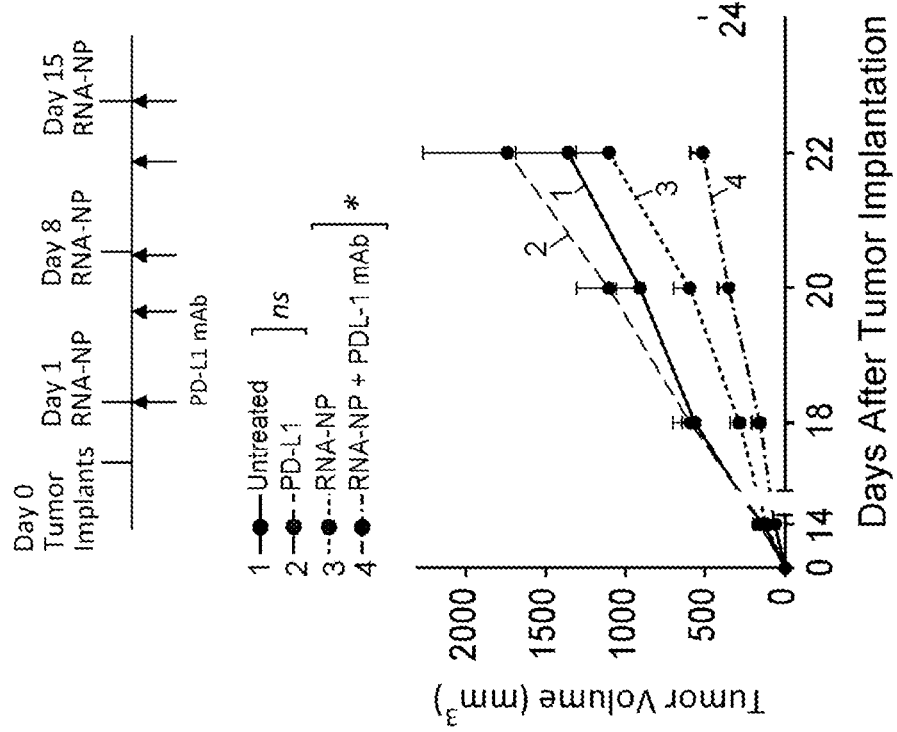
Figure 3C:
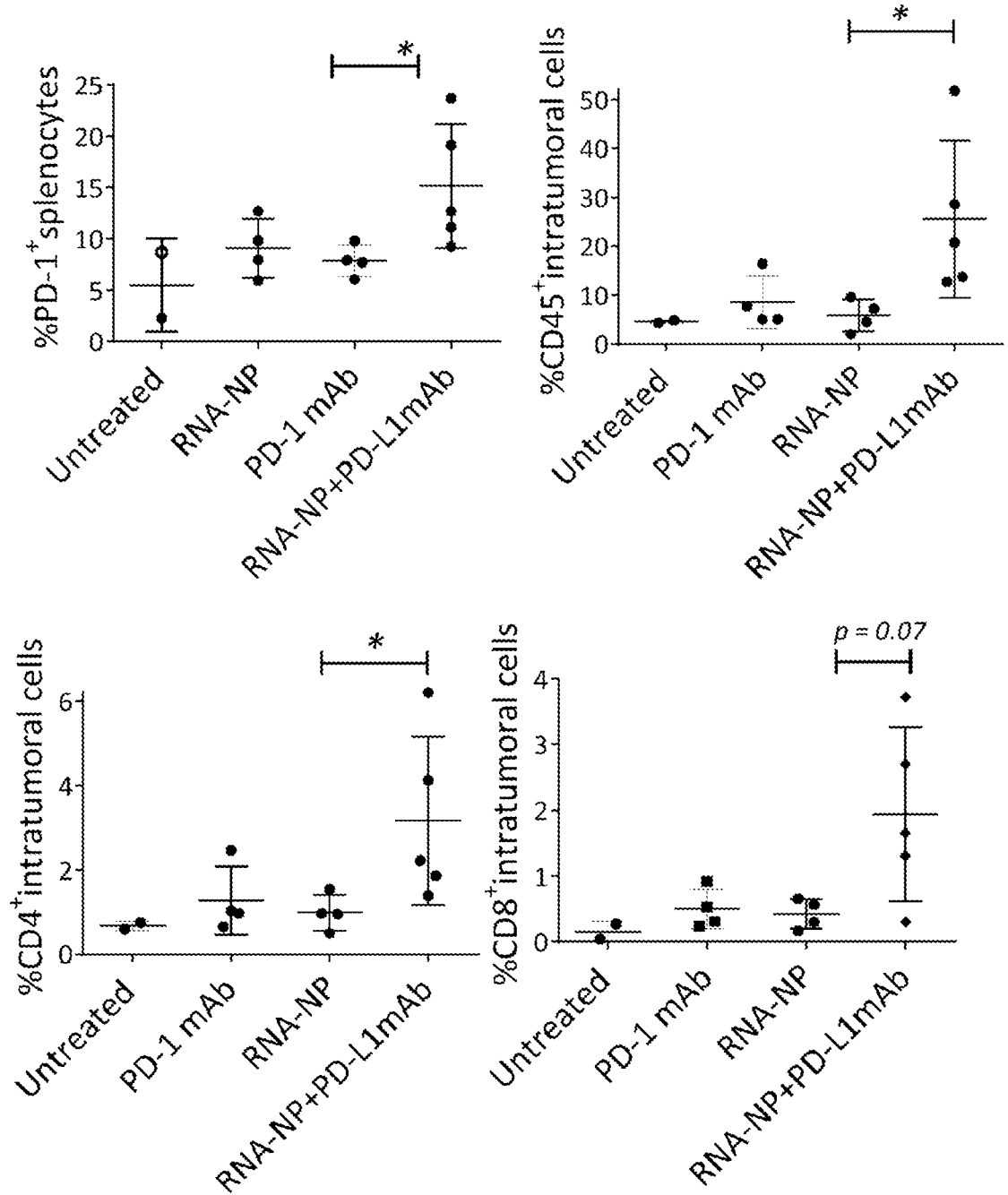
Figure 3D:
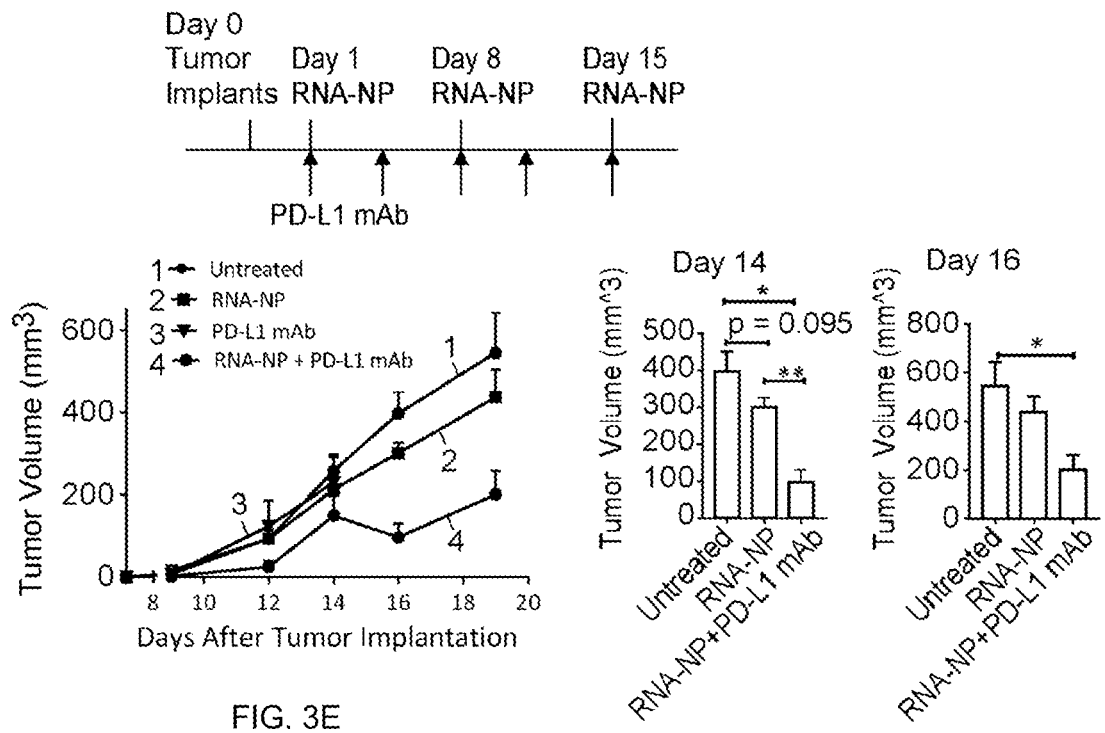
Figure 3E:
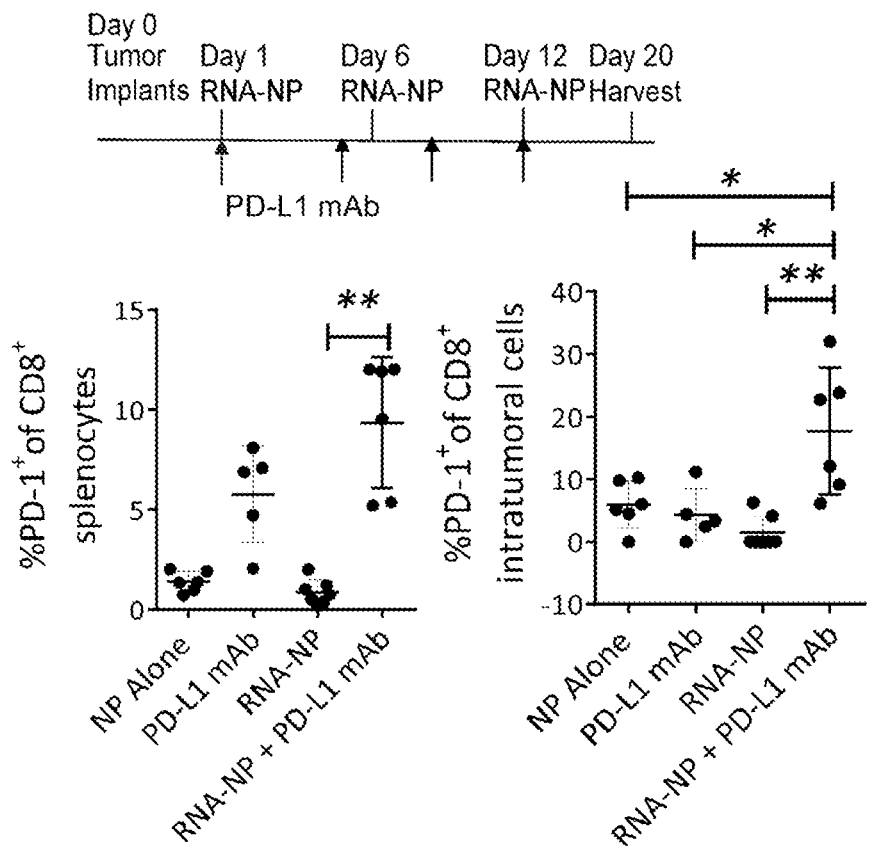

ICIs appear to elicit their activity in immunologically active cancers, but as of yet, have not been fully unlocked in poorly immunogenic malignancies. To determine if RNA-NPs targeting physiologically relevant tumor antigens could sensitize immunologically 'cold' tumors to effects of ICIs, we administered RNA-NPs with PD-L1 mAbs to poorly immunogenic murine models (i.e. B16F0, B16-F10, and Lewis lung carcinoma (LLC)) with downregulated expression of immune-related genes.[17] C57Bl/6 mice were implanted with B16F0 tumors and treated with weekly total tumor derived RNA (TTRNA)-NPs (×3) with twice weekly anti-PD-L1 mAbs (until last TTRNA-NP vaccine). While monotherapy with PD-L1 mAbs did not confer benefit, in combination with TTRNA-NPs, there was synergistic anti-tumor efficacy (FIG. 3A). We also compared the anti-tumor effects of combination therapy versus anti-PD-1 monotherapy. Although monotherapy with PD-1 mAbs did not elicit therapeutic benefit, combination RNA-NPs with PD-L1 mAbs elicited significant suppression of tumor growth (FIG. 3B). On day 27, spleens and tumors were harvested from surviving animals. Compared to PD-1 mAbs or RNA-NPs alone, animals receiving TTRNA-NPs with PD-L1 mAbs had increased PD-1+ splenocytes, and increased CD45, CD4 and a trend toward increased CD8+ tumor infiltrating lymphocytes (TILs) (FIG. 3C). These synergistic effects and sensitization to PD-L1 inhibition from TTRNA-NPs were also shown in other poorly immunologic murine tumor models. TTRNA-NPs sensitized response to PD-L1 mAbs in a B16-F10 model (FIG. 3D); and in C57Bl/6 mice implanted with LLC, TTRNA-NPs elicited a moderately enhanced response to ICIs (FIG. 10) with strong biologic activity (FIG. 3E). In animals implanted with LLC, only combination therapy elicited a significant increase (four-fold) in intratumoral PD-1+CD8+ cells (FIG. 3E).

Figure 4A:
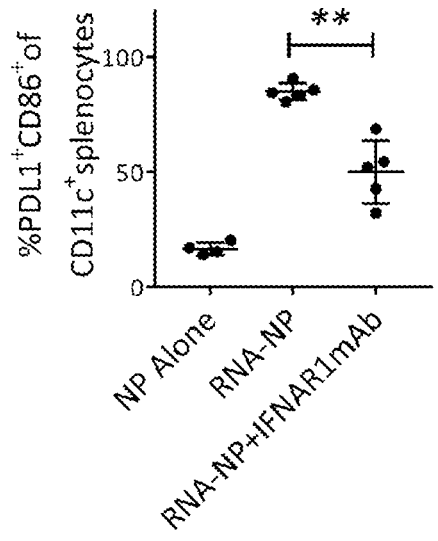
FIG. 4 demonstrates Type I interferon drives synergistic activity from RNA-NP and ICIs. (A-B) NPs alone, GFP RNA-NPs, or GFP RNA-NPs with IFNAR1 blocking antibodies (500 ug administered i.p) were administered systemically into naïve C57Bl/6 mice (n=4-5/group), and spleens were harvested within 24 hrs for flow cytometric analysis of CD86, PD-L1 and CD11c expression (C) RNA-NPs were administered to naïve C57Bl/6 mice (n=4-5/group) and spleens were harvested within 24 hrs for assessment of F4/80 expression. (D-E) NPs alone, luciferase RNA-NPs, or luciferase RNA-NPs with PDCA-1 blocking antibodies (200 ug administered i.p) were administered systemically into naïve C57Bl/6 mice (n=4/group). Within twenty-four hours, serum was collected for interferon-α detection by ELISA and spleens were harvested for flow cytometric analysis of PDCA-1, MHCII, CD86 and PD-L1 expression. (F) B16F10-OVA melanomas (1,000,000 cells) were implanted in the flanks of C57Bl/6 (n=7-8), and one day later, all mice received 1×10^7 splenocytes obtained from OT-I mice. Animals were left unvaccinated or received treatment with PD-L1 mAbs, OVA RNA-NPs or OVA RNA-NP+PD-L1 mAbs with or without concomitant IFNAR1 mAbs. PD-L1 and IFNAR1 mAbs were administered twice weekly and RNA-NPs were administered on day 1. Early time point measurements of tumor volumes were plotted (Day 22 tumor volumes: RNA-NP+PD-L1 mAb versus RNA-NP+ PD-L1 mAb+IFNAR1 mAb, **p<0.01, Mann-Whitney test). (G) Spleens were harvested from all groups on Day 25 for assessment of PD-1 expression on CD8+ splenocytes.
Figure 4B:
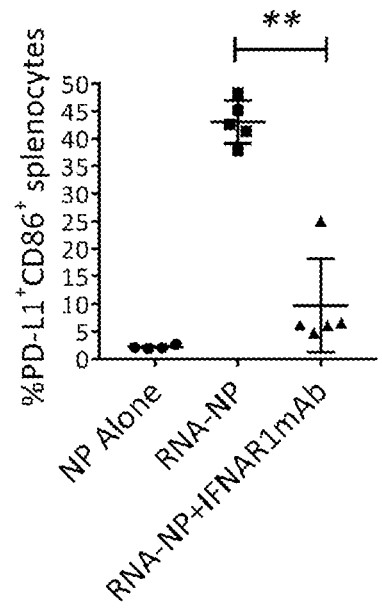
Figure 4C:
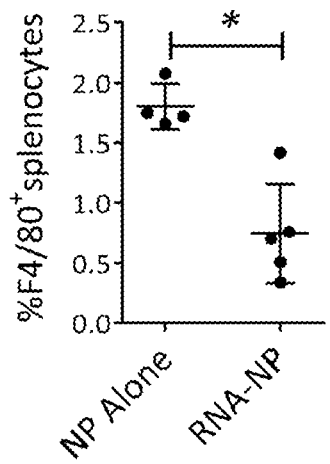
Figure 4D:
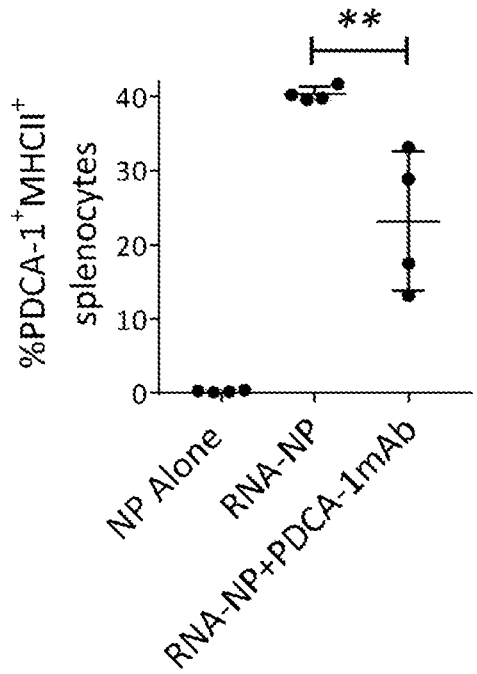
Figure 4D:
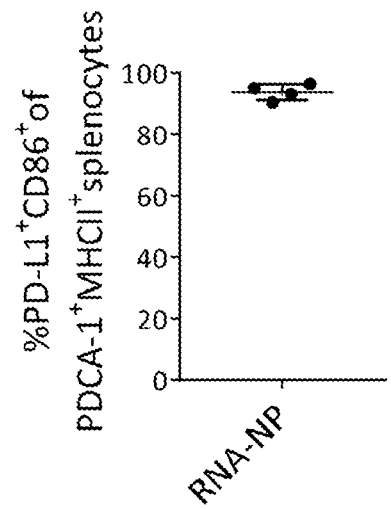
Figure 4E:
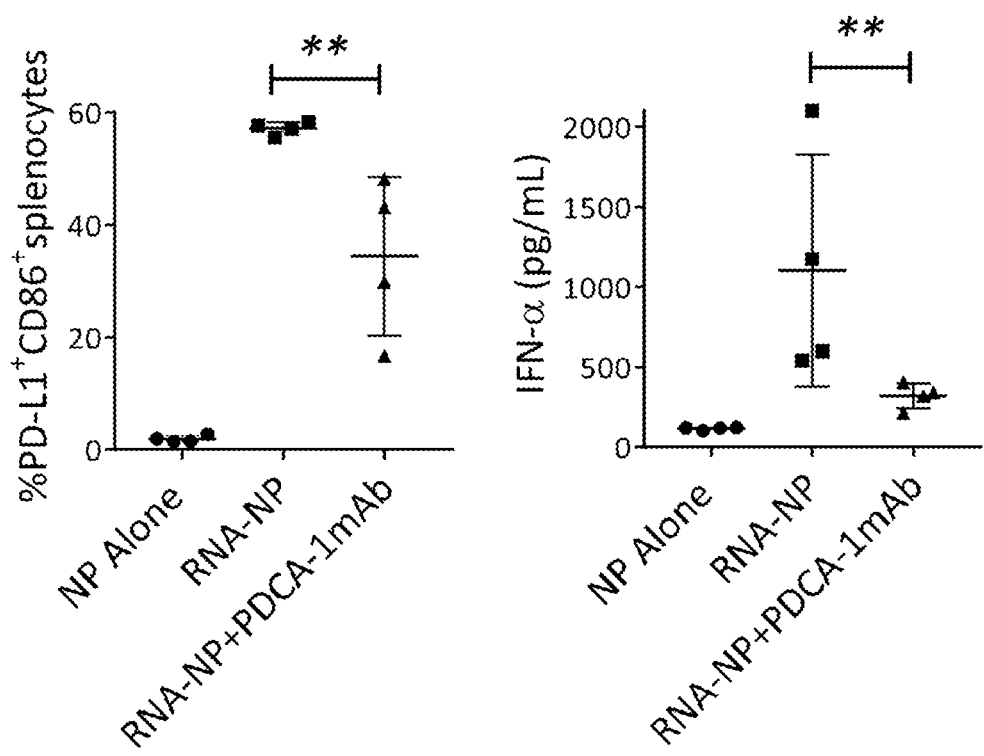
Figure 4F:
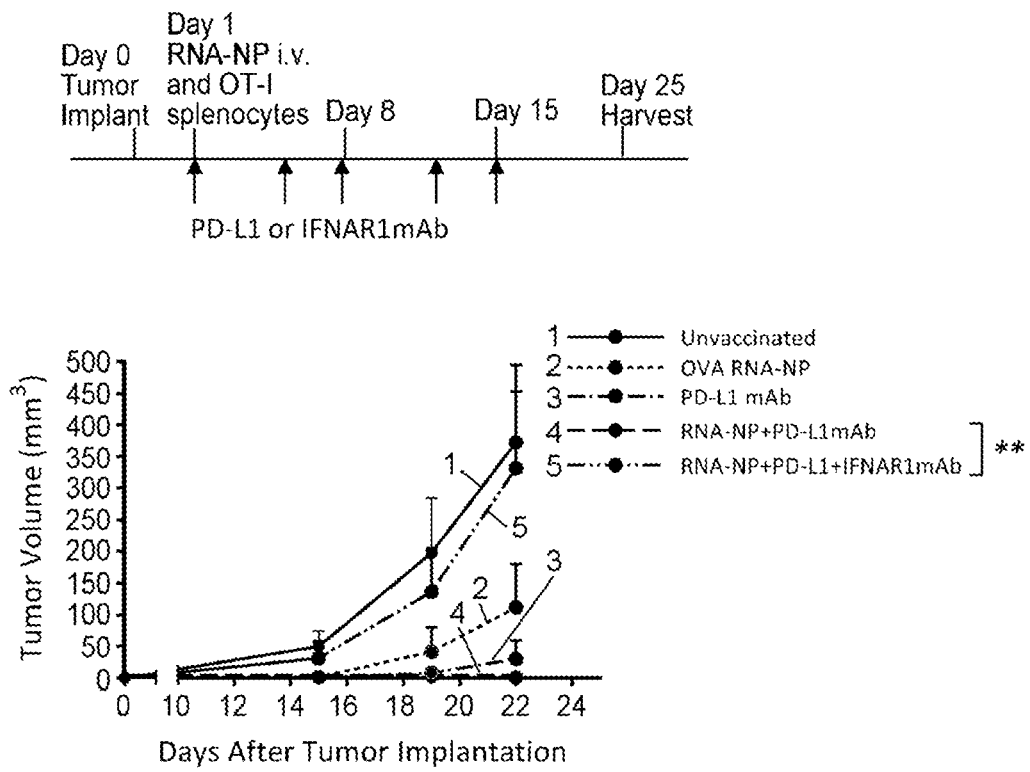
Figure 4G:
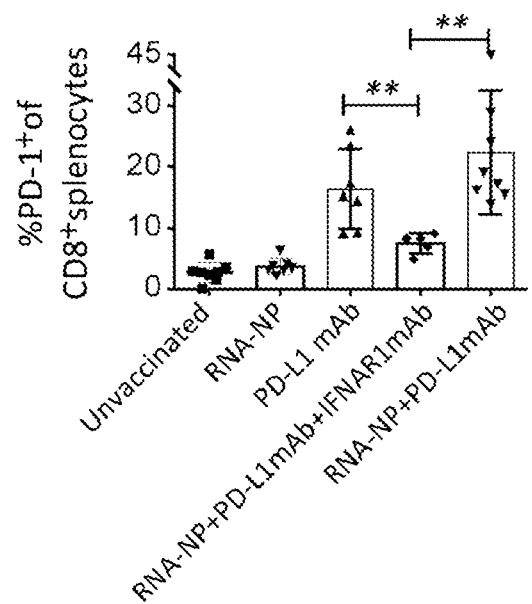
Figures 16A, 16B:
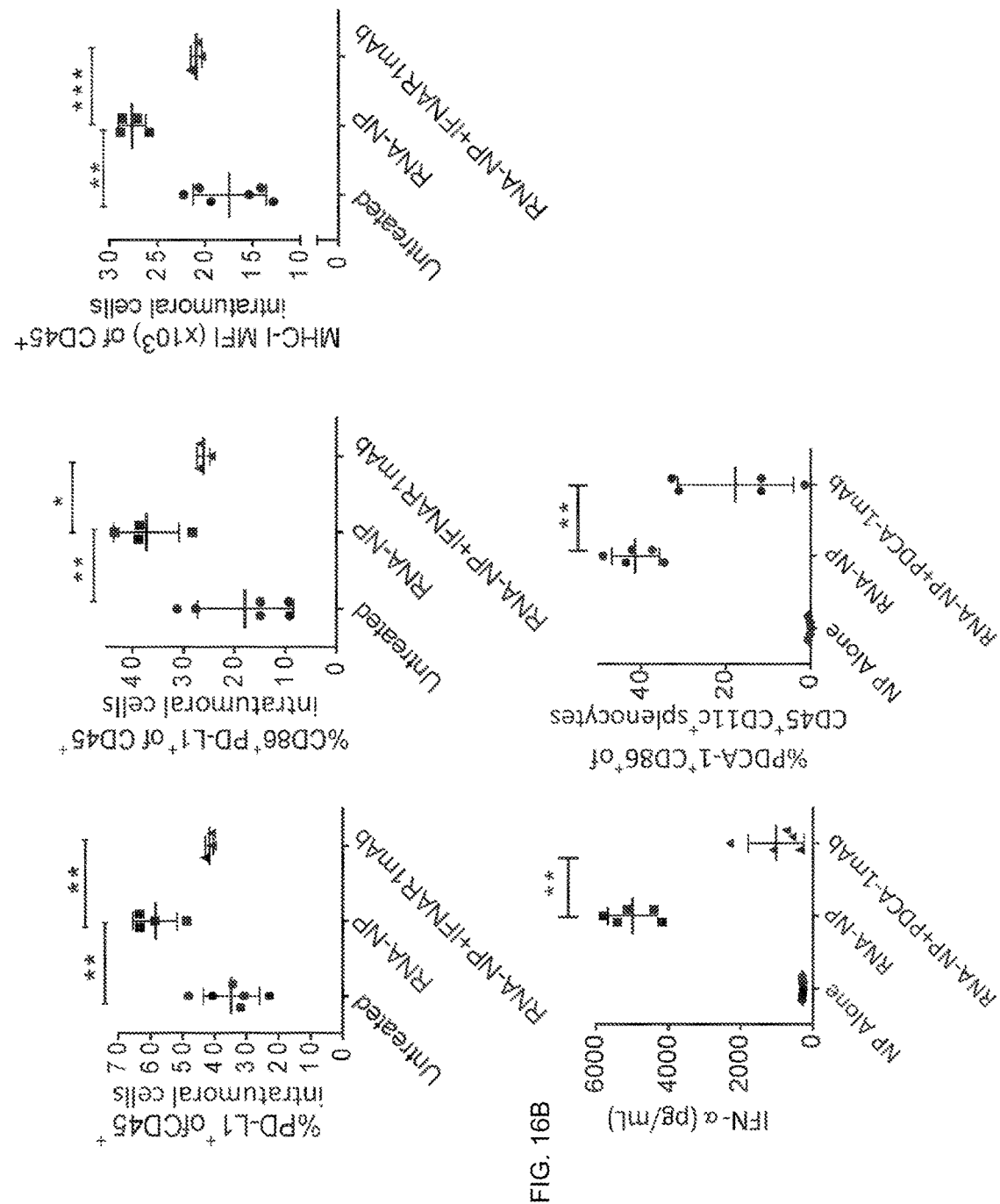

We have previously shown that anti-tumor activity from RNA-NPs is dependent on type I interferon.[16] In animals receiving concomitant RNA-NPs with interferon-α blocking antibodies that disrupt receptor signaling (IFNAR1 mAbs), anti-tumor efficacy was abrogated.[16] We sought to assess if type I interferon was also responsible for increased PD-L1 expression and synergistic effects from RNA-NPs and ICIs. We administered RNA-NPs with IFNAR1 mAbs to tumor-bearing and non-tumor-bearing C57Bl/6 mice, and harvested spleens and tumors within 24 hrs for assessment of CD11c, CD86, and PD-L1. RNA-NPs mediated an increase in CD86/PD-L1 on CD11c+ splenocytes that was significantly decreased by co-administration of IFNAR1 mAbs (FIG. 4A, FIG. 16A). However, these effects were not limited to CD11c+ cells; after RNA-NPs, there was a ~20-fold increase in the percentage of PD-L1+CD86+ splenocytes that was nearly abrogated after co-administration of IFNAR1 mAbs (FIG. 4B). Subsequently, we assessed other myeloid cell populations including macrophages and plasmacytoid DCs (pDCs). While macrophages were not increased (FIG. 4C), the percentage of MHCII+ and PDCA-1+ cells were considerably increased (FIG. 4D). These cells were nearly uniformly positive for co-expression of PD-L1/CD86, and could be significantly decreased by co-administration of PDCA-1 mAbs (FIG. 4D). Administration of PDCA-1 depleting mAbs (prior to RNA-NPs) decreased the percentage of PD-L1+CD86+ splenocytes and nearly abrogated the surge in interferon-α in non-tumor-bearing and tumor-bearing mice (FIG. 4E, FIG. 16B), suggesting pDCs to be the predominant cell type responsible for the type I IFN response elicited by RNA-NPs. (FIG. 4E). In C57Bl/6 mice bearing subcutaneous B16F10-OVA, concomitant administration of IFNAR1 mAbs abrogated the anti-tumor efficacy (FIG. 4F) and the PD-1+CD8+ signature (FIG. 4G) from both PD-L1 mAbs alone and combination RNA-NPs with PD-L1 mAbs. In summary, systemic RNA-NPs localize to reticuloendothelial organs activating both pDCs and CD11c+ myeloid cells. Type I interferon release from pDCs mediates increased PD-L1 expression, and in the presence of ICIs, leads to enhanced T cell activity (characterized by CD8+PD-1+ expression) and synergistic anti-tumor efficacy.

Since RNA-NPs mediate response through type I interferons, and systemic interferon-α can be toxic in human trials, we evaluated the safety of RNA-NPs in acute and chronic toxicity studies in C57Bl/6 mice (FIGS. 17 and 18; Tables 1 and 2).

TABLE 1

Acute Toxicity from Three Untreated and
Three RNA NP Treated C57Bl/6 mice
(30 d post initial vaccine) based on end-organ histology

| | |
|---|---|
| Spleen | No significant histopathologic alteration. No architectural or cytologic differences. |
| Brain | The cytoarchitecture is preserved. Lamination is intact. No reactive gliosis or increased inflammation including microglia |
| Liver | Histologic features in the observed sections are within normal limits. Diffuse hepatocellular vacuolation seen in the liver sections of all animals may be regarded as a normal finding. Foci of inflammation and occasional necrosis observed in hepatic sections from one treated and untreated animal are minimal, not widely distributed when present, and are presumed to be nonspecific |
| Lung | In the observed sections, the histologic features are within normal limits. There is no evidence necrosis, inflammation, or pneumocyte hyperplasia |
| Heart | No evidence of acute or chronic inflammation, reactive cellular hypertrophy, or fibrosis |
| Kidney | No evidence of glomerulosclerosis, arteriopathy, interstitial fibrosis or significant interstitial acute or chronic inflammation |

TABLE 2

Chronic Toxicity from Three Untreated and
Three RNA NP Treated C57Bl/6 mice
(30 d post initial vaccine) based on end-organ histology

| | |
|---|---|
| Spleen | No significant histopathologic alteration. No architectural or cytologic differences. |
| Brain | The cytoarchitecture is preserved. Lamination is intact. No reactive gliosis or increased inflammation including microglia |
| Liver | Histologic features in the observed sections are within normal limits. Diffuse hepatocellular vacuolation seen in the liver sections of all animals may be regarded as a normal finding. Foci of inflammation and occasional necrosis observed in hepatic sections from two treated animals are minimal, not widely distributed when present, and are presumed to be nonspecific. Mild focal hepatic necrosis and hepatitis is frequently observed in inbred mouse strains, with investigation typically revealing no infectious etiology |
| Lung | In the observed sections, the histologic features are within normal limits. There is no evidence necrosis, inflammation, or pneumocyte hyperplasia |
| Heart | No evidence of acute or chronic inflammation, reactive cellular hypertrophy, or fibrosis |
| Kidney | No evidence of glomerulosclerosis, arteriopathy, interstitial fibrosis or significant interstitial acute or chronic inflammation |

Figure 5A:
Figure 5B:
Figure 5C:
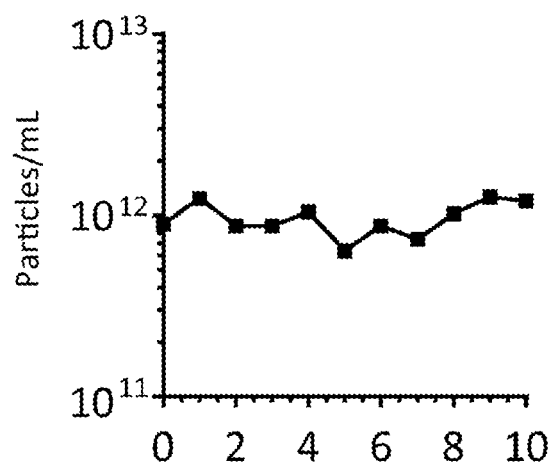
Figure 5D:
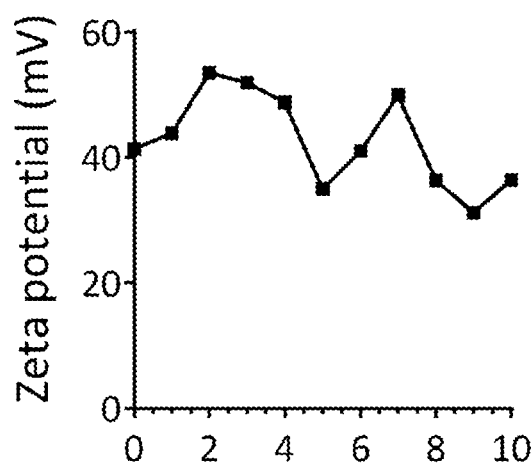
Figure 5E:
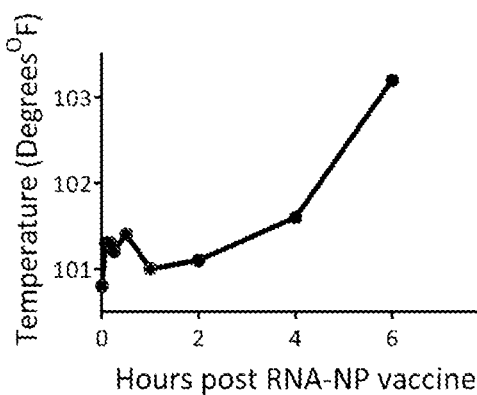
Figure 5F:
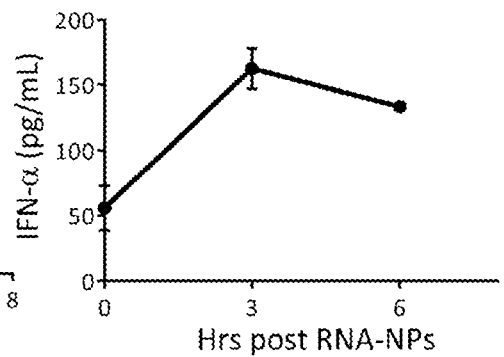
Figure 5G:
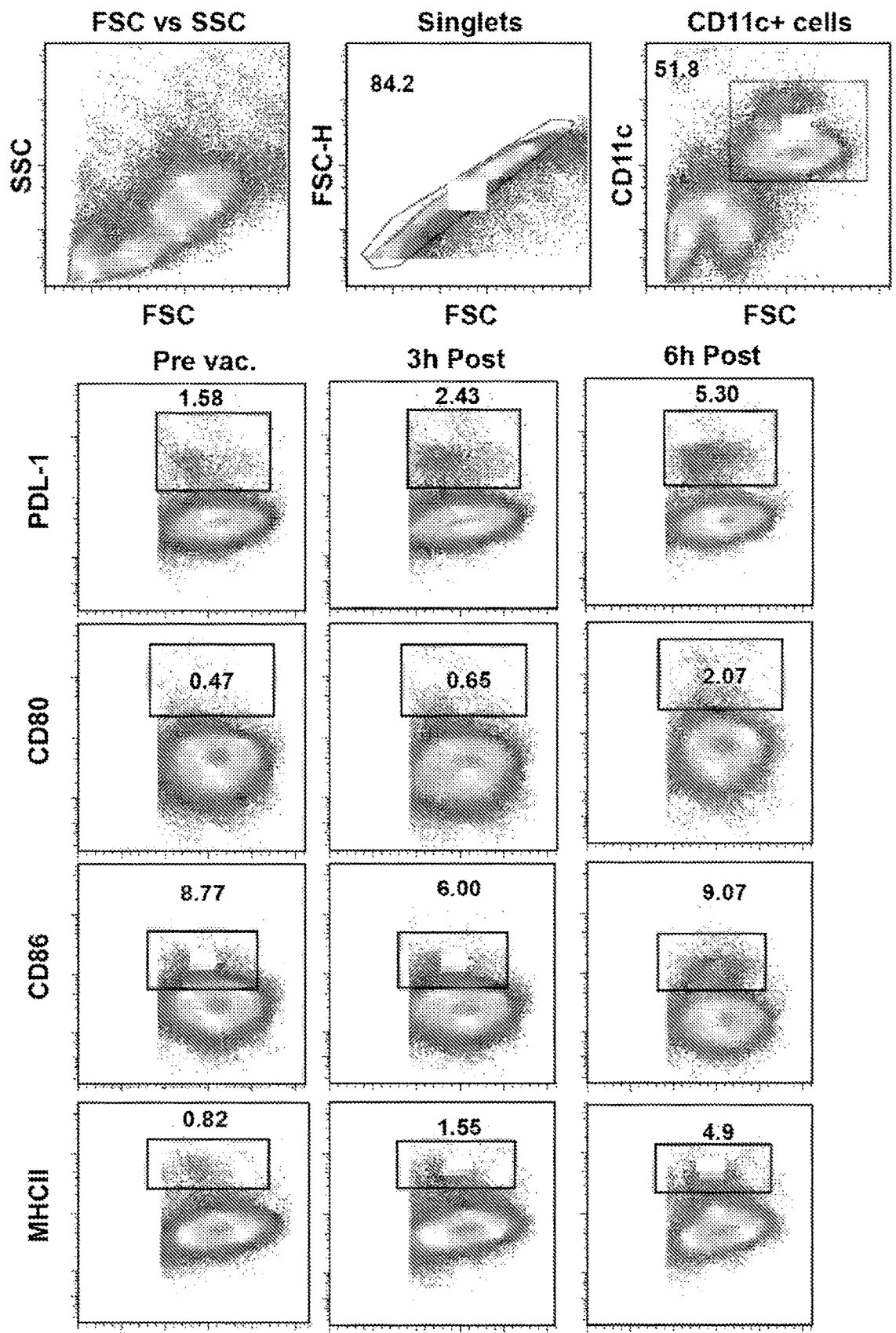
Figure 5H:
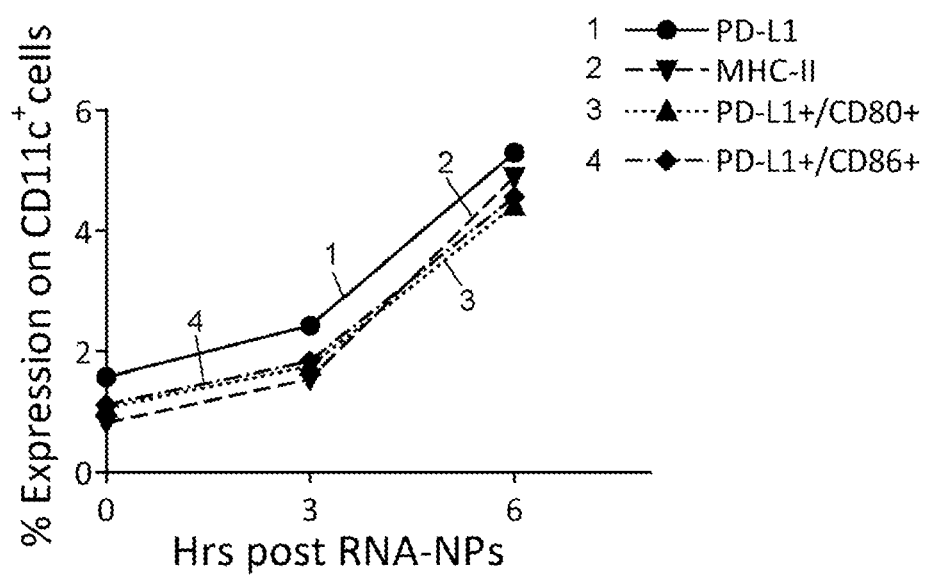
Figure 5I:
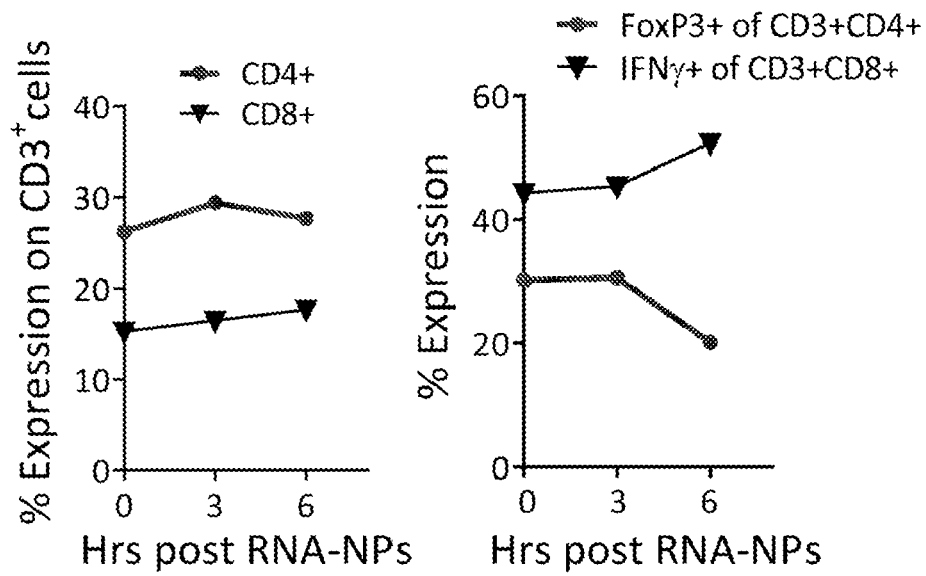

In these studies, RNA-NPs appeared safe based on CBCs/differentials, chemistries, organ function tests, and end-organ histology (FIGS. 17 and 18). We then evaluated the safety and activity of personalized tumor mRNA-NPs in a spontaneous client-owned canine. A 9 year old spayed female boxer was diagnosed with malignant glioma by MRI (FIG. 5A) and subsequently by histopathology after presenting with seizure activity; she subsequently enrolled on trial to receive RNA-NPs per UFIACUC #201609430. The tumor was biopsied, and total RNA was extracted for generation of a cDNA library. We amplified mRNA from this library and complexed it with nanoliposomes. The nanoparticles (1.375 mg of RNA encapsulated in 20.6 mg of DOTAP liposomes) were administered intravenously by i.v. push over 5 minutes (FIG. 5B). These RNA-NPs were composed in excess of positively charged DOTAP liposomes at a concentration of ~$10^{12}$ particles/mL (FIG. 5C) with zeta potentials of ~40-50 mV (FIG. 5D). The patient received RNA-NPs beginning two weeks after her biopsy. Aside from low-grade fevers (normal temperature range for canines: 100-102° F.) that spiked 6 hrs post-vaccination on the initial day (FIG. 5E), personalized mRNA-NPs were well tolerated with stable blood counts, differentials, renal and liver function tests (FIG. 11). RNA-NPs elicited an increase in serum interferon-α that peaked at 2 hrs (FIG. 5F). RNA-NPs also elicited an increase in PD-L1, CD80, CD86 and MHCII on CD11c+ peripheral blood cells in the first 6 h postvaccination (FIG. 5G-H, gating strategy shown in FIG. 5G); demonstrating activation of peripheral myeloid cells with concomitant PD-L1 expression. We then assessed CD3+ lymphoid populations. While percentages of CD4 and CD8+ cells remained relatively unchanged, IFNγ+CD8+ cells increased and regulatory FOXP3+CD4+ cells decreased in the first few hours postvaccination (FIG. 5I). After receiving weekly RNA-NPs (×3), the canine had a steady course. Postvaccination MRI was consistent with either progression or pseudoprogression (Supporting Information, Figure S12); however, the canine was stable at the time, which may be more consistent with pseudoprogression from an immunotherapeutic response. Ultimately, the canine progressed over time as would be expected for a malignant glioma without definitive surgical resection or radiotherapy. Although these results need to be validated in larger canine data sets, these data suggest safety and activity of personalized mRNA-NPs in a spontaneous canine disease model in a patient that did not receive any other anti-tumoral therapeutic interventions.

Cancer immunotherapy holds the promise of targeting tumors with exquisite specificity, but remains limited by the local and systemic regulatory microenvironments pervasive in refractory malignancies.[2-4, 18-20] Re-shaping the systemic/intratumoral immunologic microenvironments to maximize effective immunotherapy hinges on breaking peripheral tolerance and overcoming immunosuppression.[12, 21-22] ICIs have shown tremendous promise in overcoming some of these immunoregulatory hurdles but appear dependent on activated PD-1+CD8+ T cells[5,7]. Recently, the work by Tang et al. demonstrated that PD-L1 expression on myeloid cells, and not tumor cells were critical for effects of ICIs.[7] To To identify which myeloid populations were requisite for mediating responsiveness to PD-L1 mAbs, macrophages, myeloid-derived suppressor cells (MDSCs), and phagocytes were selectively depleted, but neither population was essential; alternatively, PD-L1 blockade on APCs potentiated IFN-γ release from T cells.[7] These results suggest that PD-L1 blockade on APCs enhances their ability to activate T cells.[7]

Although PD-L1 is a regulatory ligand expressed on inhibitory immune cell populations, PD-L1 upregulation on APCs may represent an early activation marker that can be preferentially exploited with ICIs.[5,21,23] PD-L1 blockade may allow APCs (i.e., dendritic cells) to survive longer with enhanced intrinsic functions perpetuating their role as activators of antigen-specific T cell immunity. In this context, early PD-L1 blockade may enhance survival of RNA-NP induced PD-L1+ APCs, increasing presentation to naïve T cells, and augmenting numbers of activated TILs. Alternatively, PD-L1 blockade may enhance intrinsic functions of PD-L1+ APCs through increased cytokine secretion (i.e., IL-12) polarizing Th1 type cells and augmenting CD4 help for antigen-specific CD8+ T cells. These effects may be distinct from other synergistic immunotherapeutic combinations (i.e., CAR-T cells and ICIs), which are predicated on maintaining the survival/cytotoxicity of activated T cells (through either receptor PD-1 or ligand PD-L1 inhibition).

While ICIs targeting exhaustion markers (i.e., PD-1) can increase persistence and therapeutic efficacy of chimeric antigen receptor modified (CAR) modified T cells, CAR-T technologies remain limited by (1) the complexity of cell therapy, (2) off-target effects from surface antigen targeting (i.e., CD19, HER2, IL-13ra, EGFR), (3) antigen loss (i.e., CD19 loss in B cell malignancies), and (4) profound intratumoral immune suppression. Personalized mRNA-NPs overcome these challenges. They bypass the need for leukapheresis/complex cellular processing and can be expeditiously generated after a patient's biopsy. Through MHC class presentation of whole tumor transcriptome, RNA-NPs allow APCs to activate TCRs against a cohort of tumor-specific epitopes for maximal tumor-specific immunity and minimal off-target effects. Unlike CAR-T cells, they recruit multiple arms of the immune system (i.e., innate and adaptive), remodeling the systemic and intratumoral immune milieu, which remains a potent barrier for vaccine, cellular, and checkpoint inhibiting immunotherapies.

In summary, the systemic and intratumoral milieu for sensitization to immunotherapy. These RNA-NPs break tolerance to induce a myeloid and lymphoid phenotype requisite for ICI activity. They activate systemic and intratumoral immunity within 24 hrs eliciting significant increases in the percentage of PD-L1+CD86+ myeloid cells in systemic organs (i.e. spleen, bone marrow, liver) and within the tumor microenvironment. Concomitant administration of anti-PD-L1 mAbs with RNA-NPs increases the percentage of peripheral/intratumoral PD-1+CD8+ cells elicit synergistic antitumor activity in immunologically "cold" tumor models resistant to ICI monotherapy. These results underscore that RNA-NPs may reprogram systemic immunity in part by unmasking the PD-L1 axis on activated myeloid cells for synergy with immune checkpoint blockade. While activity of ICIs appears dependent on activated PD-L1+ myeloid cells, limiting effectiveness of ICIs to malignancies enriched in these populations, we show that tumor mRNA-nanoparticles increase PD-L1 upon activation of murine and canine myeloid cells priming systemic and intratumoral immunity for response to immunotherapy. This evidence establishes a role for RNA-NPs as both potent antigen-specific vaccines and immune modulators of host response.

REFERENCES

The following references are cited throughout according to the numbering scheme below. Additionally, data presented herein are also available as Sayour et al., Nano Lett. 2018, 18, 6195-6206, which is incorporated herein by reference.

1. Filley, A. C.; Henriquez, M.; Dey, M., *Oncotarget* 2017, 8 (53), 91779-91794.
2. Brahmer et al., *The New England journal of medicine* 2012, 366 (26), 2455-65.
3. Borghaei et al., *The New England journal of medicine* 2015, 373 (17), 1627-39.
4. Topalian et al., *The New England journal of medicine* 2012, 366 (26), 2443-54.
5. Gros et al., *The Journal of clinical investigation* 2014, 124 (5), 2246-59.
6. Badoual et al., *Cancer research* 2013, 73 (1), 128-38.
7. Tang et al., *The Journal of clinical investigation* 2018, 128 (2), 580-588.

8. Rosenberg et al., *Proceedings of the National Academy of Sciences of the United States of America* 2004, 101 Suppl 2, 14639-45.
9. Hinrichs, C. S.; Rosenberg, S. A., *Immunological reviews* 2014, 257 (1), 56-71.
10. Rosenberg, S. A., *Science translational medicine* 2012, 4 (127), 127ps8.
11. Weller et al., *The lancet oncology* 2017, 18 (10), 1373-1385.
12. van der Burg et al., *Nat Rev Cancer* 2016, 16 (4), 219-33.
13. Kranz et al., *Nature* 2016.
14. Broos et al., *Mol Ther Nucleic Acids* 2016, 5 (6), e326.
15. Oberli et al., *Nano Lett* 2017, 17 (3), 1326-1335.
16. Sayour et al., *Oncoimmunology* 2016, e1256527.
17. Lechner et al., *J Immunother* 2013, 36 (9), 477-89.
18. Sonabend et al., *Journal of neuro-oncology* 2012, 108 (1), 1-10.
19. Ansell et al., *The New England journal of medicine* 2015, 372 (4), 311-9.
20. Zaretsky et al., *The New England journal of medicine* 2016, 375 (9), 819-29.
21. Bloch et al., *Clinical cancer research: an official journal of the American Association for Cancer Research* 2013, 19 (12), 3165-75.
22. Zitvogel et al., *Nature reviews. Immunology* 2006, 6 (10), 715-27.
23. Flores et al., *Oncoimmunology* 2015, 4 (3), e994374.
24. Jensen et al., *BMC medical imaging* 2008, 8, 16.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range and each endpoint, unless otherwise indicated herein, and each separate value and endpoint is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed:

1. A method of treating a subject with an immune checkpoint inhibitor (ICI)-resistant tumor, comprising administering to the subject (i) a composition comprising a liposome comprising a cationic lipid and mRNA complexed with the cationic lipid via electrostatic interactions, and (ii) an ICI, wherein the liposome is systemically administered to the subject and the composition does not comprise cells, and wherein the mRNA does not encode a tumor antigen.

2. The method of claim 1, wherein the ICI is a PD-L1 inhibitor.

3. The method of claim 2, wherein the PD-L1 inhibitor is a PD-L1 antibody.

4. The method of claim 1, wherein the cationic lipid is DOTAP.

5. The method of claim 4, wherein the liposome has a zeta potential of about 30 mV to about 60 mV.

6. The method of claim 1, wherein the liposome is about 50 nm to about 250 nm in diameter.

7. The method of claim 1, wherein the mRNA encodes a protein not expressed by the tumor.

8. The method of claim 1, wherein the mRNA does not target a protein of an immune checkpoint pathway.

9. The method of claim 8, wherein the mRNA does not encode a protein selected from the group consisting of: a cytokine, a co-stimulatory molecule, a growth factor, and a lymphokine.

10. The method of claim 9 wherein the protein is not a human protein.

11. The method of claim 1, wherein the mRNA does not encode a protein selected from the group consisting of: a cytokine, a co-stimulatory molecule, a growth factor, and a lymphokine.

12. The method of claim 1 wherein the protein is not a human protein.

13. The method of claim 1, wherein the liposome is administered intramuscularly.

* * * * *